(12) United States Patent
Brooks et al.

(10) Patent No.: US 6,928,358 B2
(45) Date of Patent: Aug. 9, 2005

(54) PTO-LOGIC CONFIGURATION SYSTEM

(75) Inventors: David B. Brooks, Fort Wayne, IN (US); John F. Rotz, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 281 days.

(21) Appl. No.: 10/439,089

(22) Filed: May 15, 2003

(65) Prior Publication Data

US 2004/0230346 A1 Nov. 18, 2004

(51) Int. Cl.$^7$ ............................................. G06F 17/00
(52) U.S. Cl. .............................. 701/99; 701/1; 701/29; 701/36; 701/51; 710/3; 710/64
(58) Field of Search ............................... 701/1, 99, 29, 701/36, 51; 710/3, 64, 315

(56) References Cited

U.S. PATENT DOCUMENTS 6,324,592 B1 * 11/2001 Hindman ........................ 710/3
6,718,425 B1 * 4/2004 Pajakowski et al. ......... 710/315
2003/0216847 A1 * 11/2003 Bellinger ....................... 701/51
2004/0039504 A1 * 2/2004 Coffee et al. .................. 701/35

* cited by examiner

Primary Examiner—Thomas G. Black
Assistant Examiner—Ronnie Mancho
(74) Attorney, Agent, or Firm—Jeffrey P. Calfa; Dennis Kelly Sullivan; Susan L. Lukasik

(57) ABSTRACT

The present invention is a PTO-logic-configuration system for enabling the custom configuration of at least a portion of the PTO-control/monitoring logic for a PTO-monitoring/control computer through the utilization of standardized PTO-control specific software elements, data types, and/or data values. A PTO-logic-configuration system according to the present invention comprises PTO-logic-configuration software and prescribed methods of utilizing the PTO-logic-configuration software to configure PTO-monitoring/control logic according to which the PTO-monitoring/control computer will operate. A PTO-logic-configuration system according to the present invention also includes operating instructions for the PTO-logic-configuration system and means for enabling communication of operating instructions for the PTO-logic-configuration system to a user of the system.

42 Claims, 28 Drawing Sheets

| PTO- RELATED PARAMETERS |
|---|
| ENGINE SPEED |
| PARK-BRAKE STATUS |
| IGNITION-SWITCH STATUS |
| TRANSMISSION GEAR-SELECTION |
| COMPRESSED-AIR-SYSTEM PRESSURE |
| VEHICLE SPEED |
| PTO-SWITCH STATUS |
| SIGNAL STATUSES |
| CLUTCH-PEDAL STATUS |
| SERVICE BRAKE-PEDAL STATUS |
| MASTER-SWITCH STATUS |
| ENGINE OPERATING-STATE |

FIG. 2A

| KEY PTO-RELATED PARAMETER VALUES |
|---|
| PARK-BRAKE STATUS = SET |
| PARK-BRAKE STATUS = RELEASED |
| IGNITION-SWITCH STATUS = RUN |
| IGNITION-SWITCH STATUS = OFF |
| TRANSMISSION GEAR-SELECTION = NEUTRAL |
| TRANSMISSION GEAR-SELECTION = NOT NEUTRAL |
| COMPRESSED-AIR-SYSTEM PRESSURE < MINIMUM ENGAGEMENT-APPROPRIATE AIR PRESSURE |
| COMPRESSED-AIR-SYSTEM PRESSURE > MINIMUM ENGAGEMENT-APPROPRIATE AIR PRESSURE |
| PTO-SWITCH STATUS = OFF |
| PTO-SWITCH STATUS = ON |
| SIGNAL STATUSES = GOOD |
| SIGNAL STATUSES = BAD |
| VEHICLE SPEED > MAXIMUM ENGAGEMENT-APPROPRIATE VEHICLE SPEED |
| VEHICLE SPEED < MAXIMUM ENGAGEMENT-APPROPRIATE VEHICLE SPEED |
| ENGINE SPEED > MAXIMUM ENGAGEMENT-APPROPRIATE ENGINE SPEED |
| ENGINE SPEED < MAXIMUM ENGAGEMENT-APPROPRIATE ENGINE SPEED |
| CLUTCH-PEDAL STATUS = DEPRESSED |
| CLUTCH-PEDAL STATUS = NOT DEPRESSED |
| SERVICE BRAKE-PEDAL STATUS = DEPRESSED |
| SERVICE BRAKE-PEDAL STATUS = NOT DEPRESSED |
| MASTER-SWITCH STATUS = ON |
| MASTER-SWITCH STATUS = OFF |
| ENGINE OPERATING-STATE = RUNNING |
| ENGINE OPERATING-STATE = NOT RUNNING |

FIG. 2B

| PTO- RELATED EVENTS |
|---|
| TRANSMISSION IS TAKEN OUT OF NEUTRAL |
| PARK-BRAKE IS RELEASED |
| ENGAGEMENT-TRANSITION TIME LIMIT EXPIRES |
| ENGINE IS TURNED OFF |
| ENGINE TIME LIMIT EXPIRES |
| MASTER SWITCH IS TURNED OFF |

FIG. 2C

CONFIGURE PTO LOGIC

| | ENGAGEMENT REQUIREMENTS | AUTO DISENGAGE | AUTO REENGAGE | ALARM |
|---|---|---|---|---|
| PARK-BRAKE STATUS = SET | ☒ | ☐ | ☐ | ☐ |
| PARK-BRAKE STATUS = RELEASED | ☐ | ☐ | ☐ | ☐ |
| IGNITION-SWITCH STATUS = ON | ☒ | ☐ | ☐ | ☐ |
| IGNITION-SWITCH STATUS = OFF | ☐ | ☐ | ☐ | ☐ |
| TRANSMISSION GEAR-SELECTION = NEUTRAL | ☐ | ☐ | ☐ | ☐ |
| TRANSMISSION GEAR-SELECTION = NOT NEUTRAL | ☒ | ☐ | ☐ | ☐ |
| VEHICLE SPEED < MAXIMUM ENGAGEMENT-APPROPRIATE VEHICLE SPEED | ☐ | ☐ | ☐ | ☐ |
| VEHICLE SPEED > MAXIMUM ENGAGEMENT-APPROPRIATE VEHICLE SPEED | ☐ | ☒ | ☒ | ☒ |
| ENGINE TIME LIMIT EXPIRES | ☐ | ☒ | ☐ | ☒ |

MORE: F1

FIG. 6

ADD PTO-ENGAGEMENT-SUSTENANCE REQUIREMENTS

NEW REQUIREMENT-_____

CURRENT REQUIREMENTS
- PARK-BRAKE STATUS = SET
- TRANSMISSION GEAR-SELECTION = NEUTRAL
- IGNITION-SWITCH STATUSES = RUN
- COMPRESSED-AIR-SYSTRM PRESSURE > MINIMUM ENGAGEMENT-APPROPRIATE AIR PRESSURE

INPUT CODES
PARK-BRAKE STATUS = SET: PBSSET
PARK-BRAKE STATUS = RELEASED: PBSREL
IGNITION-SWITCH STATUS = RUN: IGNRUN
IGNITION-SWITCH STATUS = OFF: IGNOFF
TRANSMISSION GEAR-SELECTION = NEUTRAL: TRGNEUT
TRANSMISSION GEAR-SELECTION = NOT NEUTRAL: TRGNNEUT
PTO-SWITCH STATUS = ON: PTO+
PTO-SWICTH STATUS = ON: PTO-
SIGNAL-STATUSES = GOOD: SGNL+
SIGNAL-STATUSES = BAD: SGNL-
CLUTCH-PEDAL STATUS = DEPRESSED: CLTCHDEP
CLUTCH-PEDAL STATUS = NOT DEPRESSED: CLTCHNDEP
SERVICE BRAKE-PEDAL STATUS = DEPRESSED: SBRKDEP
SERVICE BRAKE-PEDAL STATUS = NOT DEPRESSED: SBRKNDEP
MASTER-SWITCH STATUS = ON: MSTRSW+
MASTER-SWITCH STATUS = OFF: MSTRSW-
ENGINE OPERATING-STATE = RUNNING: ENGRUN
ENGINE OPERATING-STATE = NOT RUNNING: ENGOFF
VEHICLE SPEED>MAXIMUM ENGAGEMENT-APPROPRIATE VEHICLE SPEED: VSEXC
VEHICLE SPEED<MAXIMUM ENGAGEMENT-APPROPRIATE VEHICLE SPEED: VSACC
ENGINE SPEED>MAXIMUM ENGAGEMENT-APPROPRIATE ENGINE SPEED: ESEXC
ENGINE SPEED<MAXIMUM ENGAGEMENT-APPROPRIATE ENGINE SPEED: ESACC
VEHICLE SPEED<MAXIMUM ENGAGEMENT-APPROPRIATE VEHICLE SPEED: ESACC

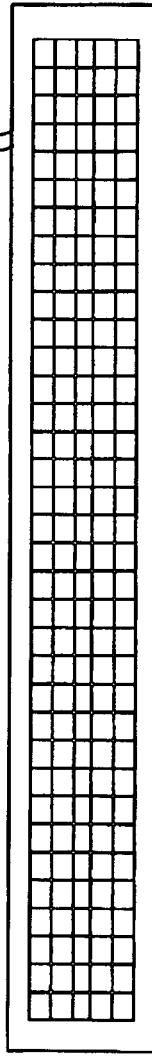

FIG. 7c

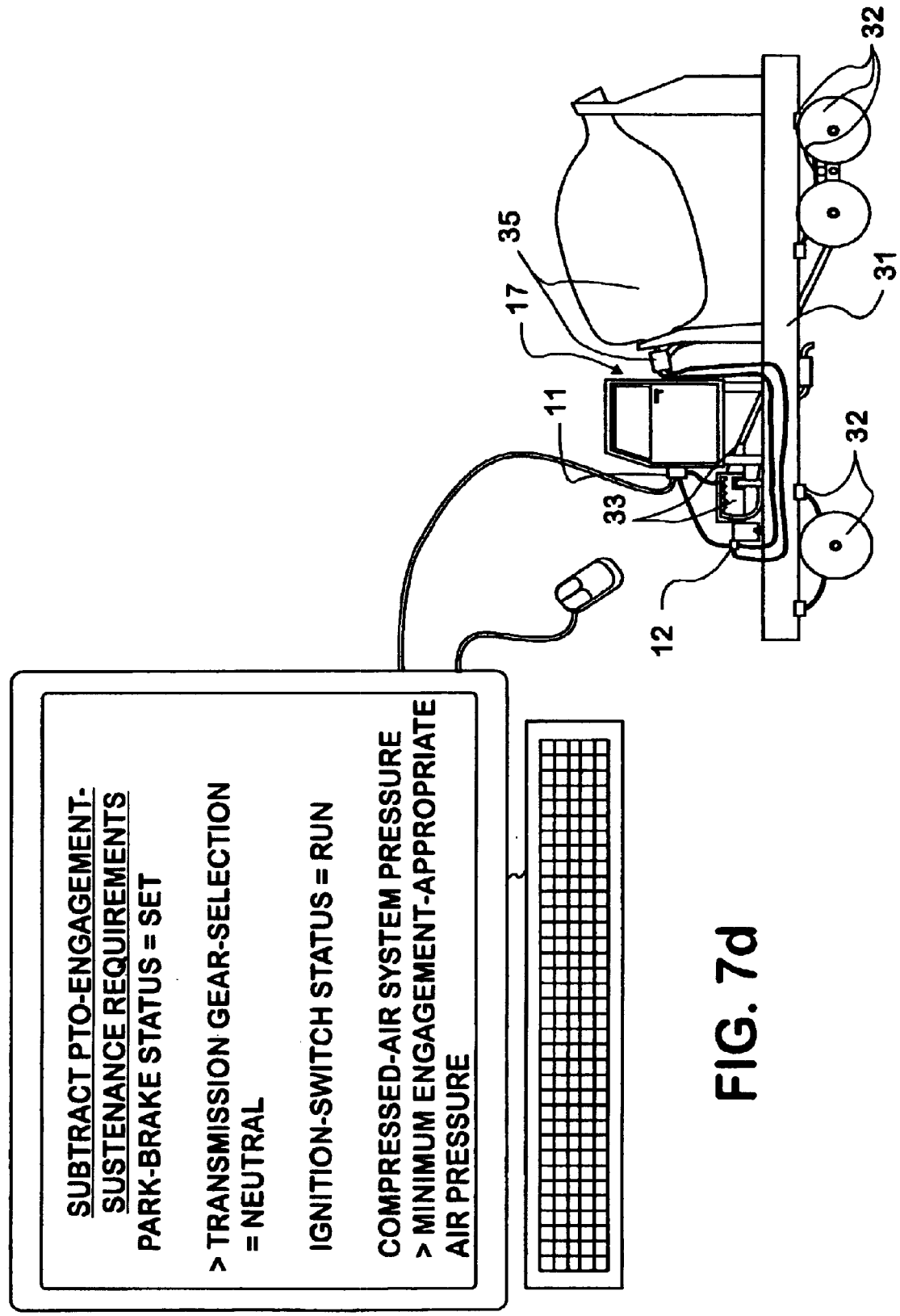

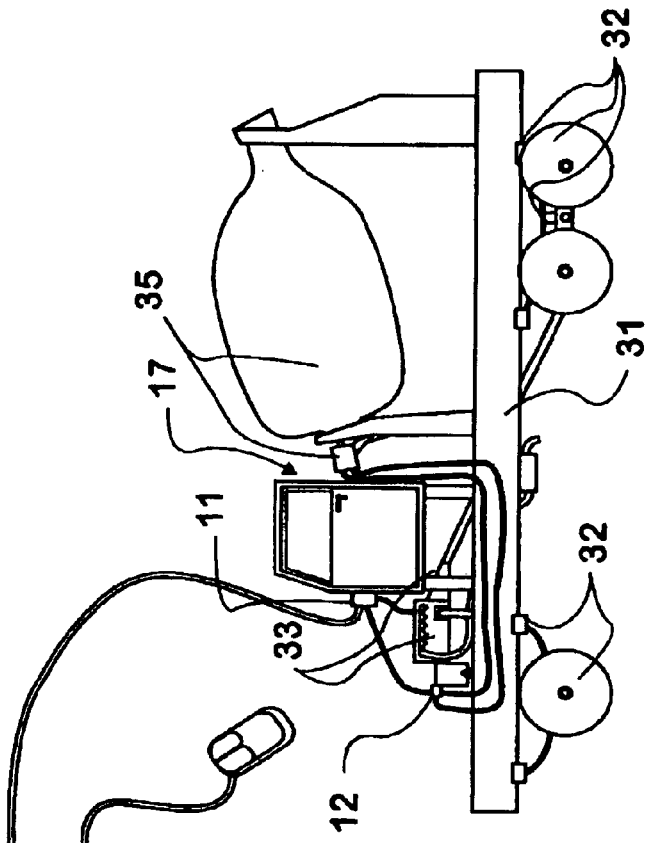
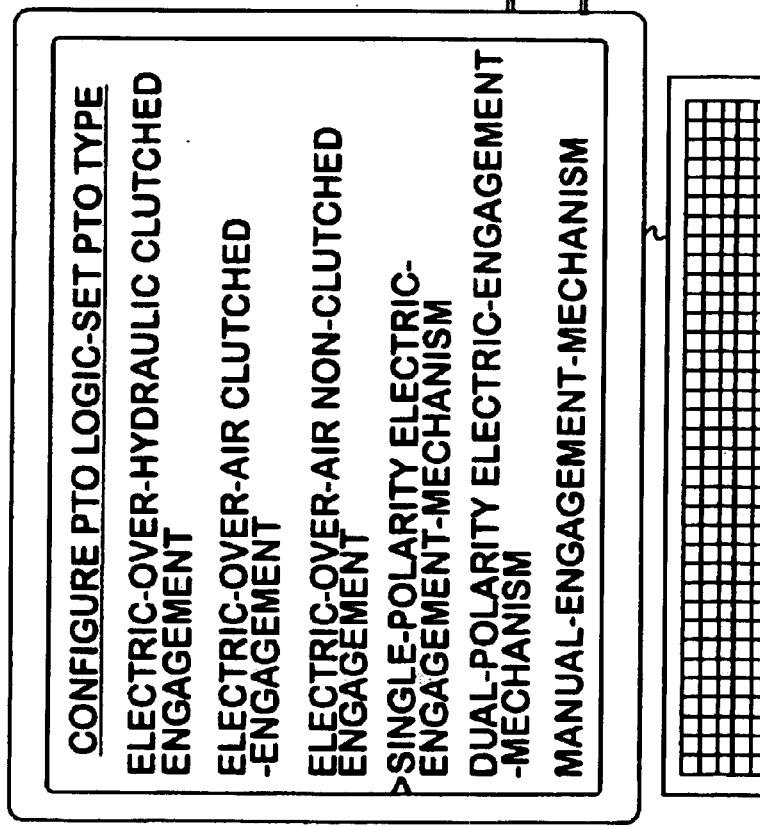
FIG. 9b

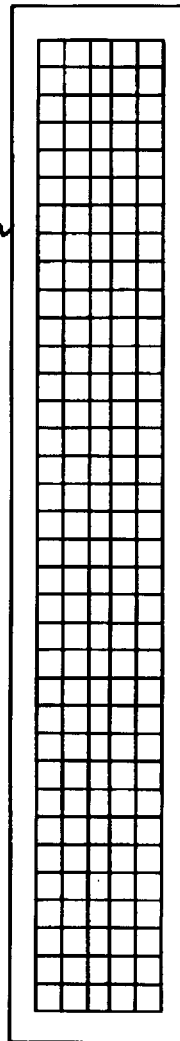

FIG. 11

CONFIGURE PTO LOGIC

PTO_ENG_REQ_PK_BRK_STAT = SET
PTO_ALRM_COMPELLER_PK_BRK_STAT = REF
PTO_ENG_INHIBIT_IGN_SWITCH_STATUS = OFF
PTO_ALRM_COMPELLER_IGN_SWITCH_STATUS = OFF
PTO_ENG_REQ_TRASMSN_GR_SELECT = NEUTRAL
PTO_DISENG_COMPELLER_TRNSMSN_GR_SELECT = NOT-NEUTRAL
PTO_ALRM_COMPELLER_TRNSMSN_GR_SELECT = NOT-NEUTRAL
PTO_ENG_REQ_SIGNAL_STATUSES = GOOD
PTO_ALRM_COMPELLER_SIGNAL_STATUSES = BAD
PTO_ENG_REQ_CLTCH_PDL_STATUS = DEP
PTO_ENG_REQ_SERVICE_BRK_PDL_STATUS = DEP

MORE ⇨

CONFIGURE PTO LOGIC

INHIBIT ENGAGEMENT OF PTO UNIT WHEN PARK-BRAKE STATUS = RELEASED ☒

GENERATE PTO ALARM WHEN PARK-BRAKE STATUS = RELEASED ☐

INHIBIT ENGAGEMENT OF PTO UNIT WHEN IGNITION-SWITCH STATUS = OFF ☒

GENERATE PTO ALARM WHEN IGNITION-SWITCH STATUS = OFF ☐

DISENGAGE PTO UNIT WHEN ENGINE SPEED > MAXIMUM ENGAGEMENT-APPROPRIATE ENGINE SPEED ☒

DISENGAGE PTO UNIT WHEN TRANSMISSION GEAR SELECTION = NOT NEUTRAL ☐

GENERATE PTO ALARM WHEN TRANSMISSION GEAR SELECTION = NOT NEUTRAL ☒

INHIBIT ENGAGEMENT OF PTO UNIT WHEN SIGNAL STATUSES = BAD ☐

GENERATE PTO ALARM WHEN SIGNAL STATUSES = BAD ☐

INHIBIT ENGAGEMENT OF PTO UNIT WHEN CLUTCH-PEDAL STATUS = NOT DEPRESSED ☐

INHIBIT ENGAGEMENT OF PTO UNIT WHEN SERVICE BRAKE-PEDAL STATUS = NOT DEPRESSED

MORE ⇨

FIG. 12

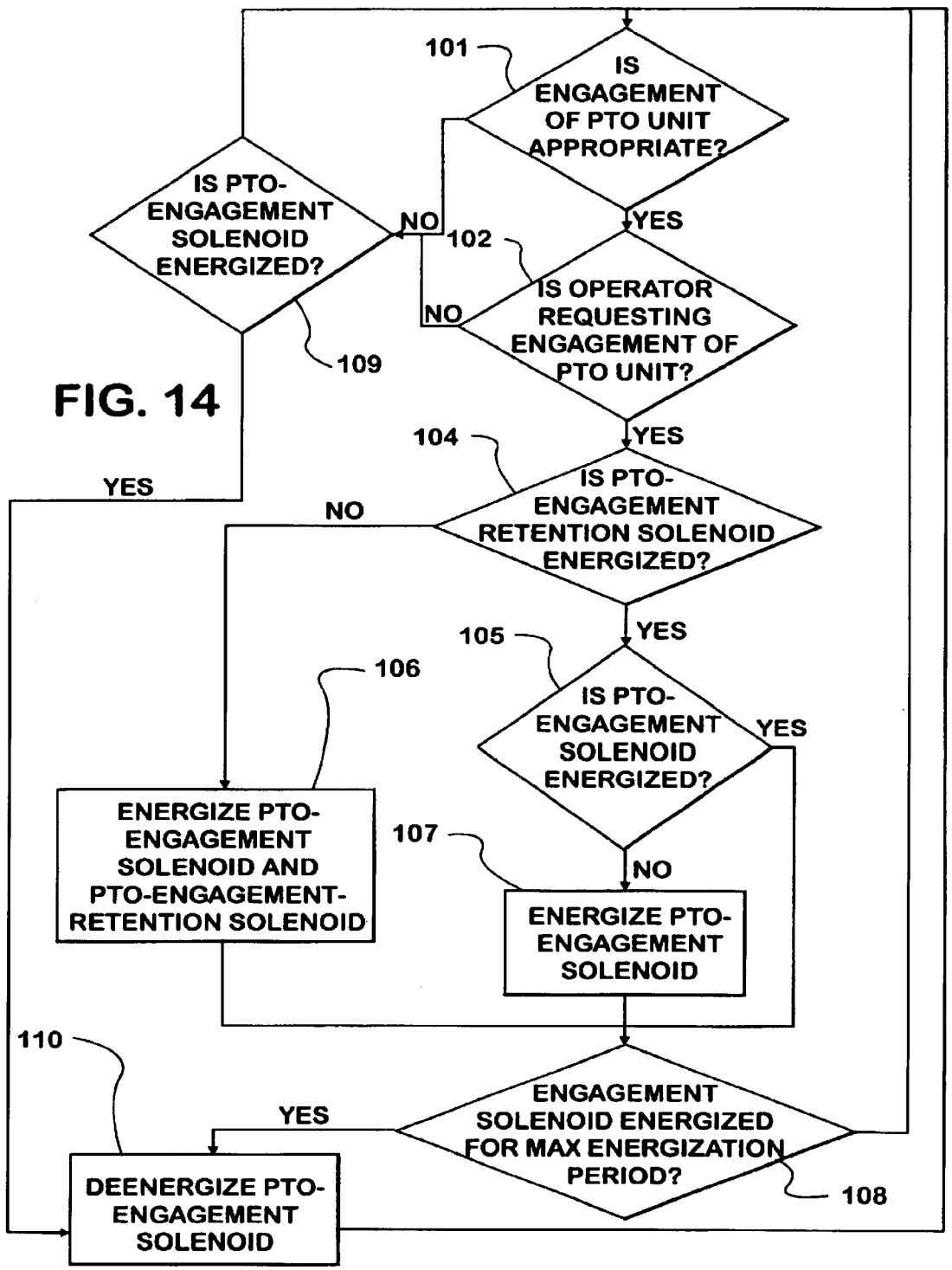

EXAMPLE APPLICATION-SPECIFIC BASELINE PTO-ENGAGEMENT LOGIC

SINGLE-POLARITY ELECTRIC-ENGAGEMENT-MECHANISM TYPE PTO UNIT

PTO-ENGAGEMENT REQUIREMENTS:   ENGINE SPEED < 1000 RPM
TRANSMISSION GEAR SELECTION = NOT NEUTRAL
VEHICLE SPEED < 5 MPH

ELECTRIC-OVER-HYDRAULIC CLUTCHED-ENGAGEMENT TYPE PTO UNIT

PTO-ENGAGEMENT REQUIREMENTS:   ENGINE SPEED < 1000 RPM
VEHICLE SPEED < 5 MPH

ELECTRIC-OVER-AIR CLUTCHED-ENGAGEMENT TYPE PTO UNIT

PTO-ENGAGEMENT REQUIREMENTS:   COMPRESSED-AIR-SYSTEM PRESSURE > 90 PSI
ENGINE SPEED < 1000 RPM
VEHICLE SPEED < 3 MPH

ELECTRIC-OVER-AIR NON-CLUTCHED-ENGAGEMENT TYPE PTO UNIT

PTO-ENGAGEMENT REQUIREMENTS:   COMPRESSED-AIR-SYSTEM PRESSURE > 90 PSI
ENGINE SPEED < 1000 RPM
VEHICLE SPEED < 3 MPH

FIG. 15

EXAMPLE APPLICATION-SPECIFIC BASELINE PTO-ALARM LOGIC

SINGLE-POLARITY ELECTRIC-ENGAGEMENT-MECHANISM TYPE PTO UNIT

PTO-DISENGAGEMENT COMPELLERS:  ENGINE SPEED > 1400 RPM
  VEHICLE SPEED < 5 MPH

ELECTRIC-OVER-HYDRAULIC CLUTCHED-ENGAGEMENT TYPE PTO UNIT

PTO-DISENGAGEMENT COMPELLERS:  ENGINE SPEED > 1800 RPM

ELECTRIC-OVER-AIR CLUTCHED-ENGAGEMENT TYPE PTO UNIT

PTO-DISENGAGEMENT COMPELLERS:  COMPRESSED-AIR-SYSTEM PRESSURE 80 PSI
  ENGINE SPEED > 1800 RPM

ELECTRIC-OVER-AIR NON-CLUTCHED-ENGAGEMENT TYPE PTO UNIT

PTO-DISENGAGEMENT COMPELLERS:  COMPRESSED-AIR-SYSTEM PRESSURE 80 PSI
  ENGINE SPEED > 1800 RPM

FIG. 16

PTO-LOGIC CONFIGURATION SYSTEM

BACKGROUND OF THE INVENTION

The present invention relates to power-take-off (PTO) units of vehicles and computer monitoring and/or control thereof.

DRAWINGS

Other objects and advantages of the invention will become more apparent upon perusal of the detailed description thereof and upon inspection of the drawings in which:

FIG. 2a is a list of PTO-related parameters.

FIG. 2b is a list of key PTO-related parameter values.

FIG. 2c is a list of PTO-related events.

FIG. 3b is an illustration of a stage of operation of the embodiment of the PTO-logic-configuration system, the operation of which is illustrated in FIG. 3a, at which the user is presented with the option to choose a type of PTO-engagement-requirement to set the value of.

FIG. 6 illustrates a stage of operation of a fourth embodiment of PTO-logic-configuration software at which the user is presented with the option to add/subtract various key PTO-related parameters and PTO-related events to/from the PTO-monitoring/control logic.

Figure 7A:
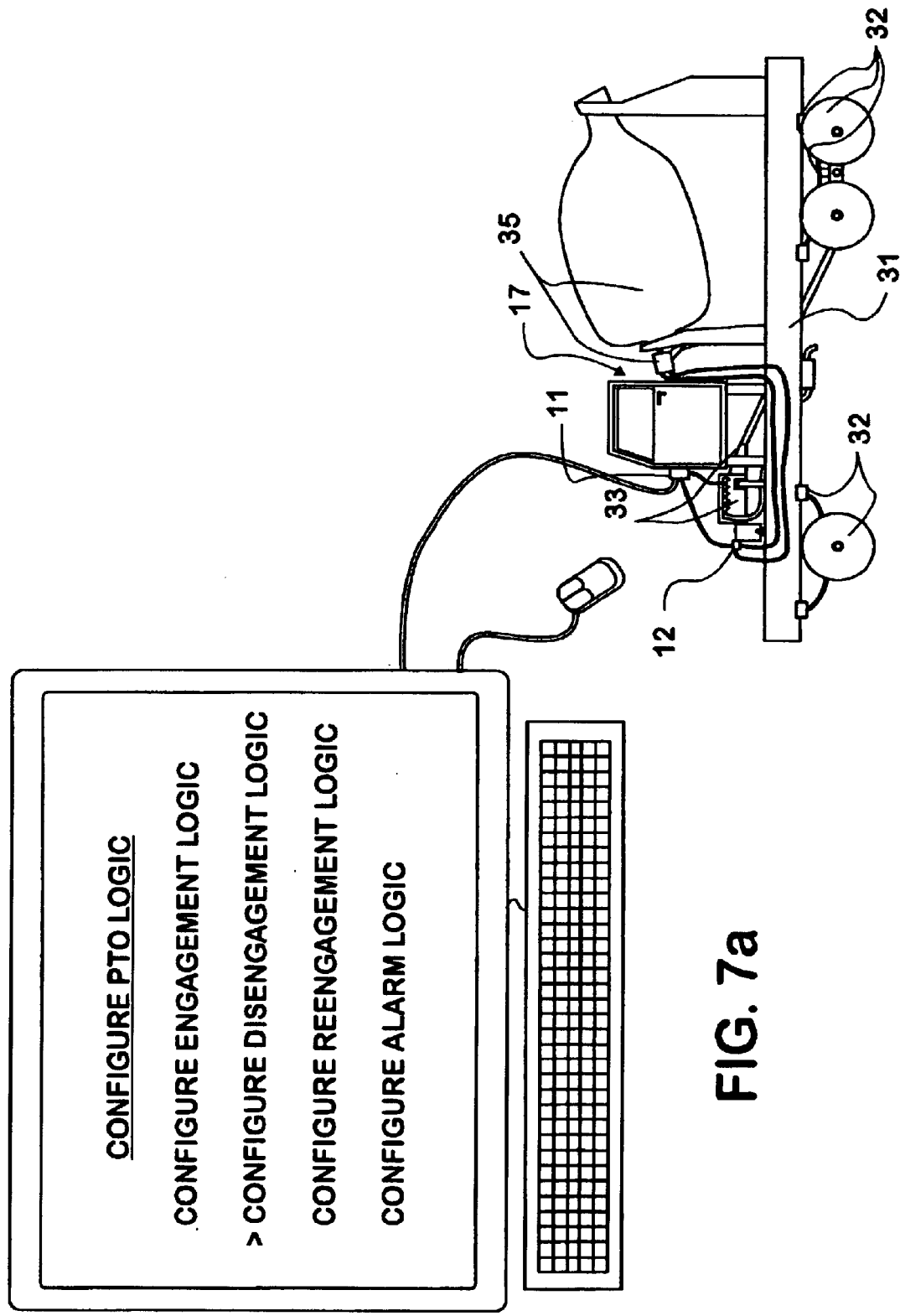
FIG. 7a illustrates a stage of operation of a fifth embodiment of PTO-logic-configuration system at which the user is presented with the option to navigate to different stages of operation at which the user may configure particular elements of the PTO-monitoring/control logic.
Figure 7B:
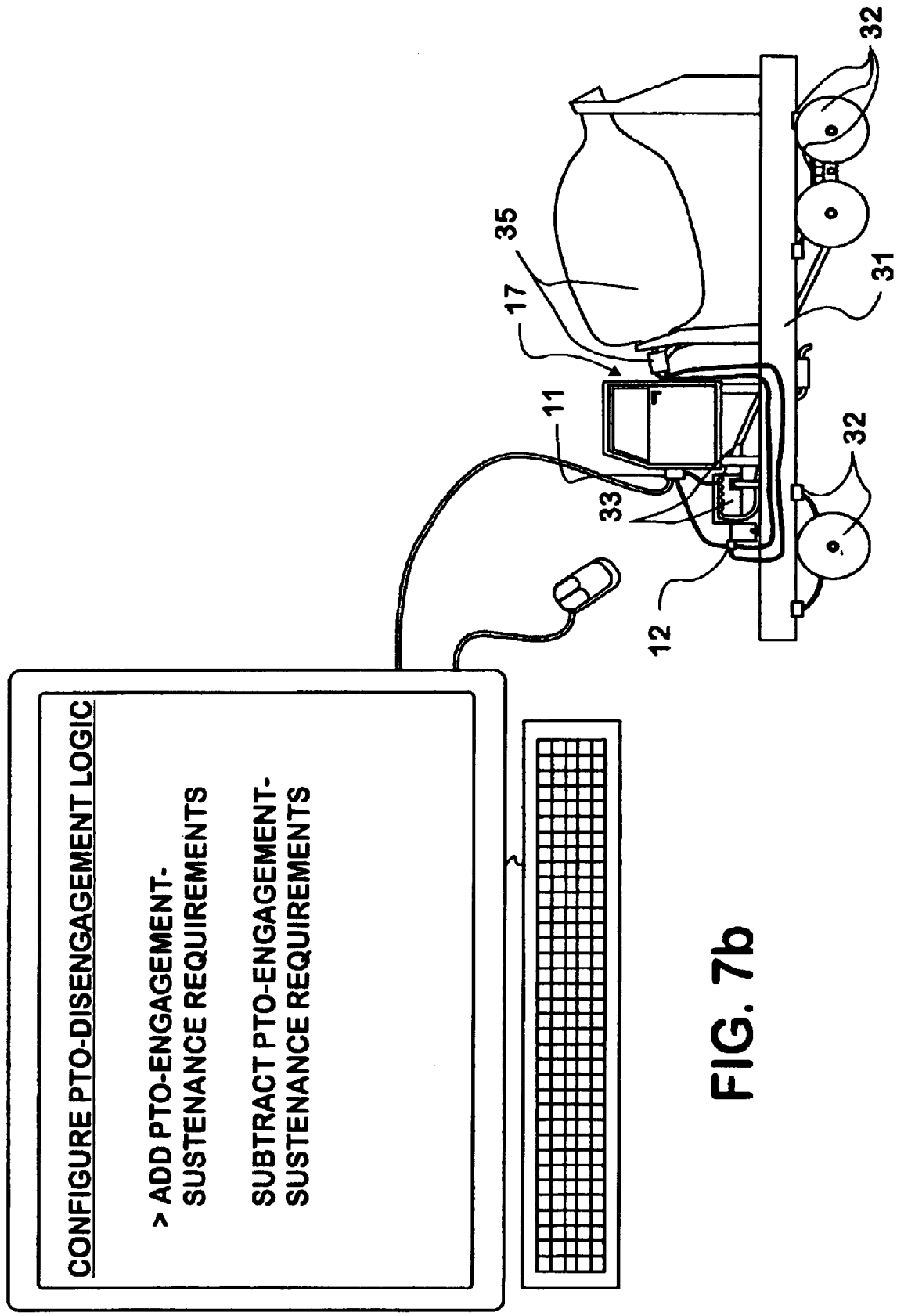

FIG. 7b illustrates a stage of operation of the PTO-logic-configuration system, the operation of which is illustrated in FIG. 7a, at which the user is presented with the option to navigate either to a stage of operation at which they may add PTO-engagement-sustenance requirements to the PTO-monitoring/control logic or to a stage of operation at which they may subtract PTO-engagement-sustenance requirements from the PTO-monitoring/control logic.

FIG. 7c illustrates a stage of operation of the PTO-logic-configuration system, the operation of which is illustrated in FIGS. 7a and 7b, at which the user is enabled to add PTO-engagement-sustenance requirements to the PTO-monitoring/control logic.

FIG. 7d illustrates a stage of operation of the PTO-logic-configuration system, the operation of which is illustrated in FIGS. 7a, 7b, and 7c, at which the user is enabled to subtract PTO-engagement-sustenance requirements from the PTO-monitoring/control logic.

Figure 8:
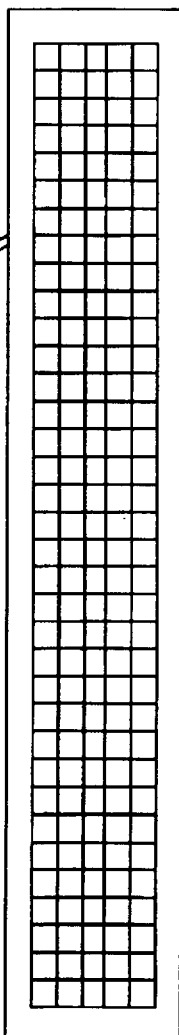

FIG. 8 illustrates a stage of operation of a sixth embodiment of a PTO-logic-configuration system at which the user is presented with the option to add/subtract key PTO-related parameters or PTO-related events to/from the PTO-monitoring/control logic.

Figure 9A:
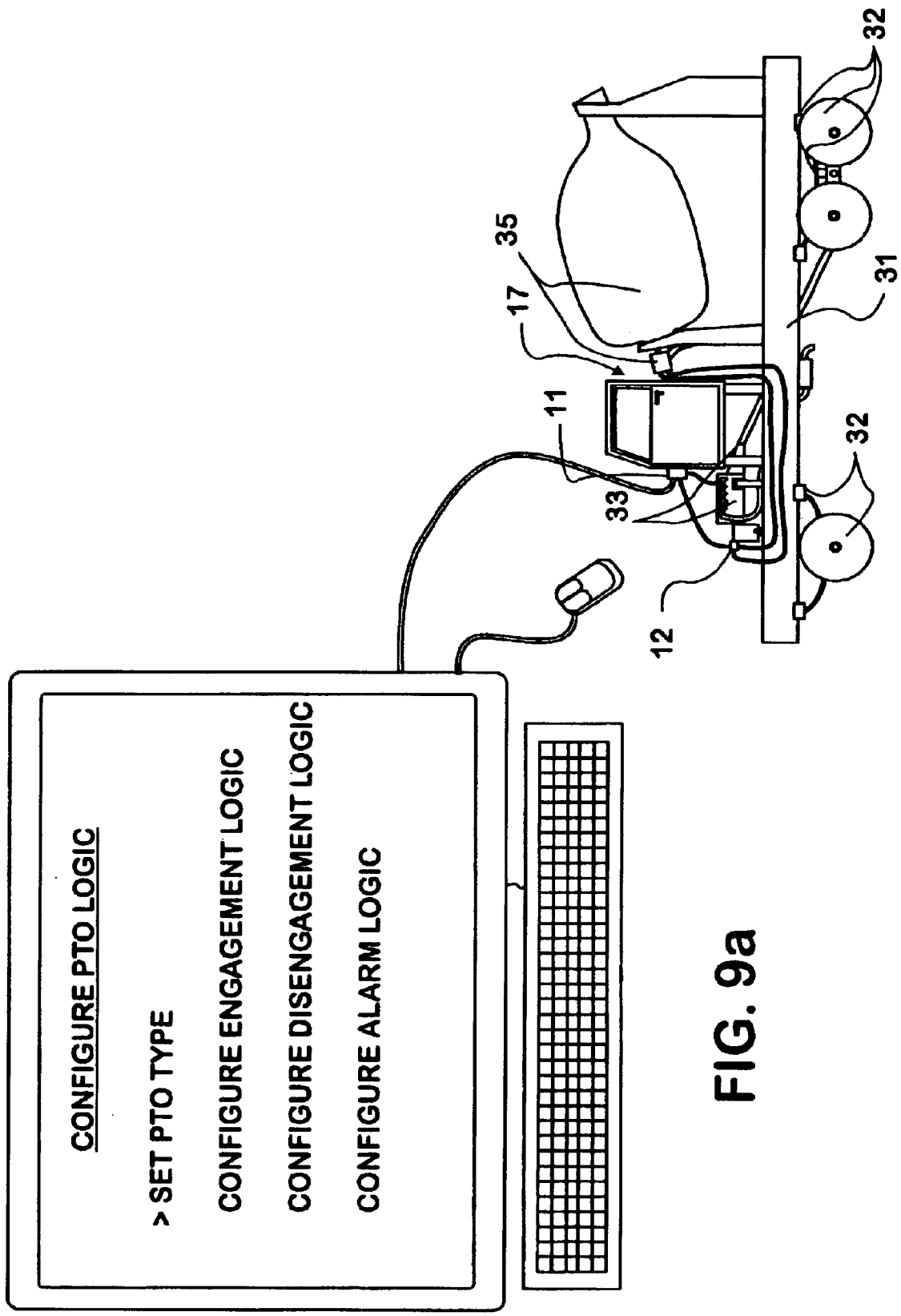

FIG. 9a illustrates a stage of operation of a seventh embodiment of a PTO-logic-configuration system at which the user is presented with the options to navigate to different stages of operation at which they may configure various elements of the PTO-monitoring/control computer including the option to navigate to a stage of operation at which the user may integrate a application-specific PTO-monitoring/control algorithm into the PTO-monitoring/control logic by "setting the PTO type".

FIG. 9b illustrates a stage of operation of the PTO-logic-configuration system, the operation of which is illustrated in FIG. 9a, at which the user is enabled to integrate one of six different application-specific PTO-monitoring/control algorithm elements into the PTO-monitoring/control logic by selecting the type of PTO-unit for use with which that particular application-specific PTO-monitoring/control algorithm element is configured.

Figure 10:
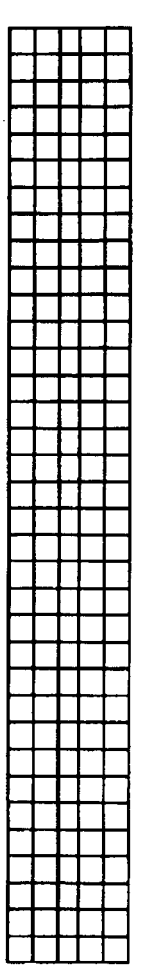

FIG. 10 illustrates a stage of operation of an eighth embodiment of a PTO-logic-configuration system at which the user is enabled to add PTO-engagement requirements to the PTO-monitoring/control logic through the use of communication-system-centric codes.

FIG. 11 illustrates a stage of operation of a ninth embodiment of the present invention at which the user is enabled to add/subtract PTO-engagement requirements, PTO-alarm compellers, PTO-engagement-inhibitors, or PTO-disengagement compellers to/from the PTO-monitoring/control logic.

FIG. 12 illustrates a stage of operation of a tenth embodiment of a PTO-logic-configuration system at which the user is effectively enabled to add/subtract PTO-engagement inhibitors, PTO-alarm compellers, or PTO-disengagement compellers to/from the PTO-monitoring/control logic by adding/subtracting conditioned actions to the PTO-monitoring/control computer's repertoire.

Figure 13A:
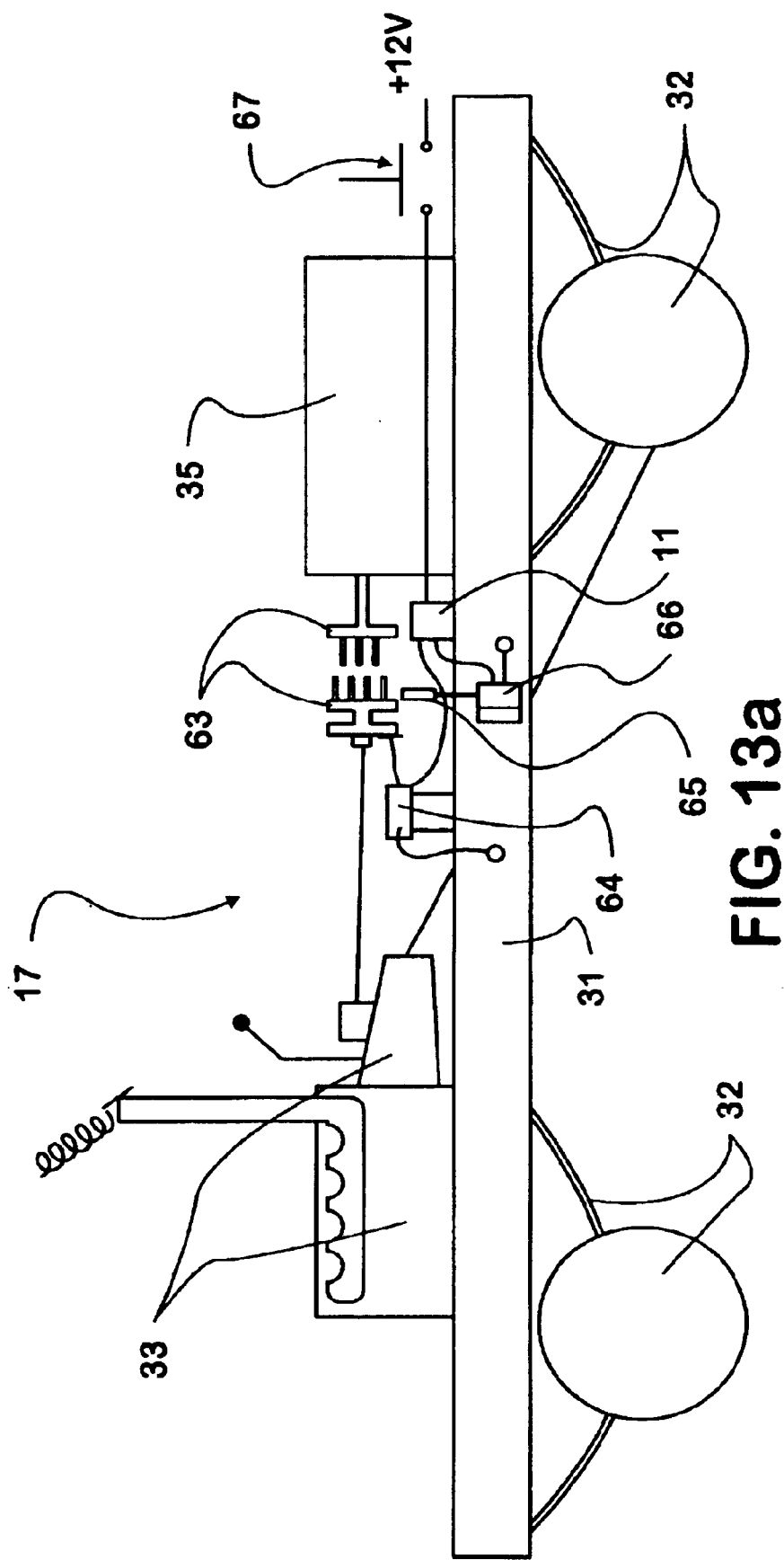

FIG. 13a is a schematic illustration of a vehicle with a single-polarity electric-engagement-mechanism type PTO unit that is in an un-engaged state.

Figure 13B:
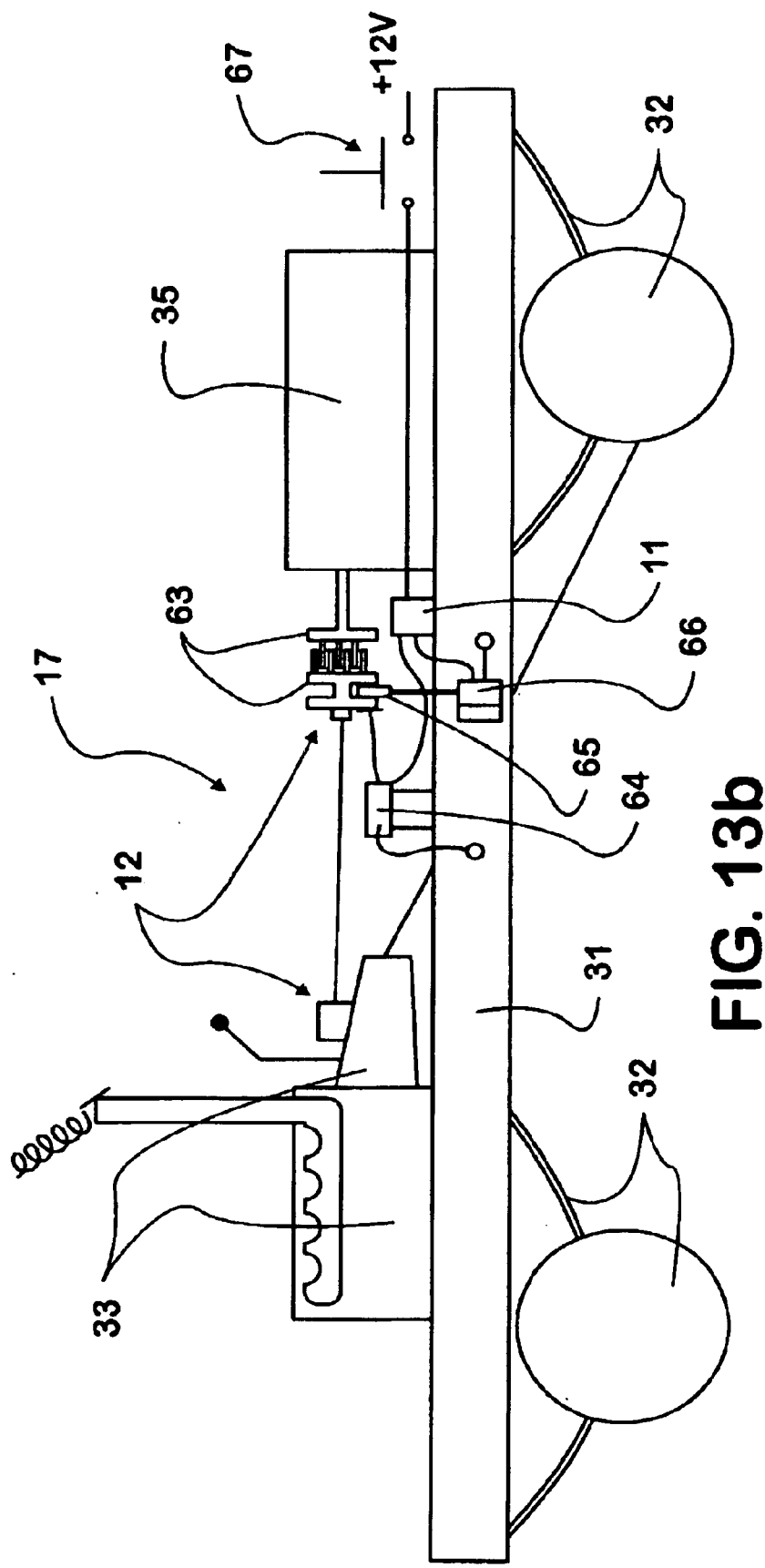

FIG. 13b is a schematic illustration of the vehicle illustrated in FIG. 13a with the PTO unit in an engaged state.

FIG. 14 is a flow chart that illustrates one embodiment of a application-specific PTO-engagement procedure for a single-polarity electric-engagement-mechanism type PTO unit.

FIG. 15 lists examples of application-specific baseline PTO-engagement logic identified by the type of PTO unit for use with which they are tailored.

FIG. 16 lists examples of application-specific automatic PTO-disengagement logic identified by the type of PTO unit for use with which they are tailored.

DETAILS OF INVENTION

Figure 1:
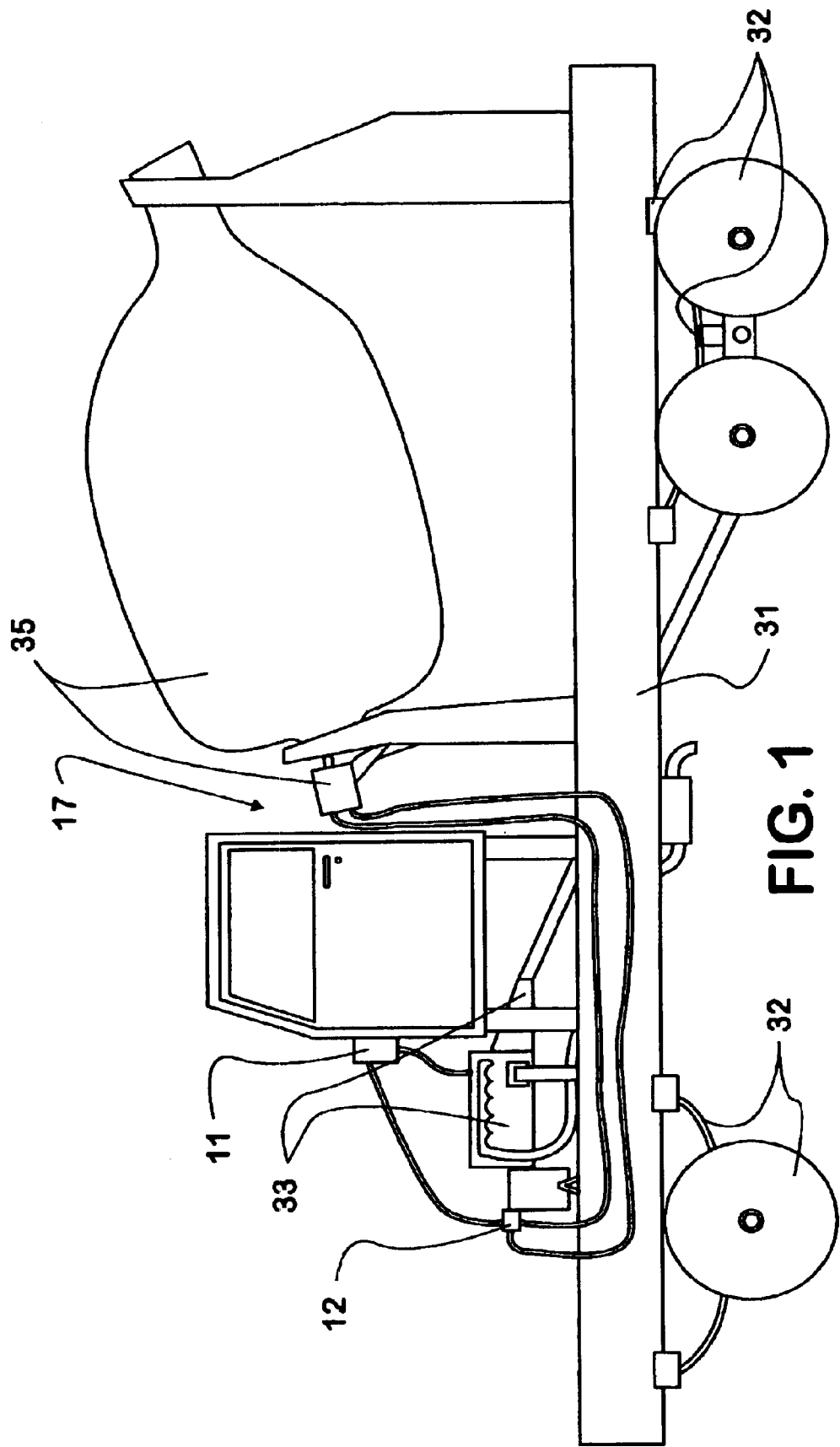
FIG. 1 is a side elevation of a vehicle that has a utility system, a PTO unit for selectively tapping power from the vehicle's powertrain to drive the utility system, and a PTO-monitoring/control computer for monitoring/controlling various aspects of operation of the PTO unit and the vehicle.

The present invention is a PTO-logic-configuration system for enabling a user thereof to quickly and easily configure PTO-monitoring/control logic according to which monitoring and/or control of a PTO unit 12 of a vehicle 17 will be executed by a PTO-monitoring/control computer 11 of the vehicle 17. As can be seen in FIGS. 1, 13a, and 13b, a vehicle 17 typically comprises one or more frame structures 31 that are of rigid and strong construction, to which a majority of other components of the vehicle 17 are directly and/or indirectly engaged and from which those other components of the vehicle 17 derive support. A suspension system 32 is engaged to and supports the frame structures 31 above the ground and, further, provides the vehicle 17 with a relatively low resistance to movement along the ground. A powertrain 33 of the vehicle 17 comprises a motor or engine that produces power that drives one or more ground-engaging components 34 of the suspension system in order to motivate the vehicle 17 along the ground. Many vehicles 17 comprise a PTO unit 12, the function of which is to selectively tap power from the powertrain 33 and drive a utility system 35 mounted to the vehicle 17. Appropriate monitoring and control of a PTO unit 12 of a vehicle 17 can generally be defined in terms of very structured algorithms and is an exacting science that is primarily dependent on the operational states of various systems of the vehicle 17. Accordingly, monitoring and control of a PTO-unit 12 of a vehicle 17 lends itself to execution by a PTO-monitoring/control computer 11 that is apprised of the operational state of the PTO unit 12 and other systems of the vehicle 17 through communicative linkage to sensors and/or control circuits of the vehicle 17. FIG. 1, shows a vehicle 17 according to the present invention with a utility system 35 that can be selectively driven through a PTO unit 12 of the vehicle 17. The vehicle 17 shown in FIG. 1 further comprises a PTO-monitoring/control computer 11. The vehicle 17 also comprises a vehicle monitoring network that comprises sensors and/or control circuits of the vehicle 17 that are communicatively linked to the PTO-monitoring/control computer 11 in such a manner to apprise the PTO-monitoring/control computer 11 of various aspects of the operating state of the vehicle 17 including various aspects of the operating state of the PTO unit 12 of the vehicle 17.

A large percentage of vehicles 17 that have utility systems 35 that can be selectively driven by the powertrain 33 of the vehicle 17 through a PTO unit 12 have a custom configuration and, as a result, the PTO-monitoring/control logic according to which the PTO-monitoring/control computer 11 operates must also have a custom configuration. The uniqueness of most vehicles 17 with PTO units 12 and utility systems 35 that are driven thereby stems from them being constructed with a unique combination and interaction of relatively standard components. The present invention is a PTO-logic-configuration system for enabling the custom configuration of at least a portion of the PTO-control/monitoring logic for a PTO-monitoring/control computer 11 through the utilization of standardized PTO-control specific software elements, data types, and/or data values.

A PTO-logic-configuration system according to the present invention comprises PTO-logic-configuration software and prescribed methods of utilizing the PTO-logic-configuration software to configure PTO-monitoring/control logic according to which the PTO-monitoring/control computer 11 will operate. A PTO-logic-configuration system according to the present invention also includes operating instructions for the PTO-logic-configuration system and means for enabling communication of operating instructions for the PTO-logic-configuration system to a user of the system. Operating instructions for the PTO-logic-configuration system would include information necessary to utilize the PTO-logic-configuration system to its fullest potential. Operating instructions would include such things as explanations of steps of prescribed methods of utilizing the PTO-logic-configuration software, lists of user-understandable data-type identifiers and data values for which the PTO-logic-configuration system includes corresponding prescribed communication protocols and software elements, and explanations of the actual prescribed communication protocols corresponding to any such user-understandable data-type identifiers and data values. The operating instructions for the PTO-logic-configuration system would also include lists of any types of PTO-control specific software elements available to the user for integration into the PTO-monitoring/control logic according to which the PTO-monitoring/control computer 11 will operate, and explanations of any prescribed methods for integrating any such PTO-control specific software elements into the PTO-monitoring/control logic according to which the PTO-monitoring/control computer 11 will operate. It should also be understood that the operating instructions for a PTO-logic-configuration system according to the present invention can be explicit and/or inherent. An example of a situation where operating instructions are inherent is a PTO-logic-configuration system that causes a man/machine interface such as a display screen to provide menus of human-understandable descriptive action identifiers, menu titles, data type identifiers and/or data value identifiers that the user may select to effect execution of a desired action by a computer. In such a PTO-logic-configuration system, the descriptive items of the menus often provide the user with sufficient information to understand the options of operation of the PTO-logic-configuration system that are available to them and how to partake of those options and thereby constitute operating instructions for the system. The means for enabling communication of the operating instructions for the PTO-logic-configuration system to the user may take on many different forms. In some embodiments of the present invention the means for enabling communication of the operating instructions to the user of the PTO-logic-configuration system includes portions of the PTO-logic-configuration software that cause the communication of some or all of the operating instructions to the user through a man/machine interface such as a display screen or speaker. In fact, in some embodiments of the present invention the means for enabling communication of the operating instructions to the user will be entirely constituted by portions of the PTO-logic-configuration software that enable communication of the operating instructions to the user through a man/machine interface such as a display screen or a speaker. In some embodiments of the present invention the means for enabling communication of the operating instructions to the user will include one or more support items that are separate from the PTO-logic-configuration software and that have some part or all of the operating instructions encoded in them in such a form that the user may readily retrieve the operating instructions in human-understandable form. Support items that include such operating instructions may include one or more of printed publications, videotapes, audiotapes, cds, dvds, and computer disks and/or any other item commonly used to store information for retrieval by a user. In some embodiments of the present invention the means for enabling communication of the operating instructions to the user may be distributed between parts of the PTO-logic-configuration software itself and one or more support items.

There are a number of different manners and channels through which the user may interact with the PTO-monitoring/control computer when utilizing the PTO-logic-configuration system of the present invention to configure the PTO-monitoring/control logic according to which the PTO-monitoring/control computer will operate. In some cases the vehicle 17 itself includes a machine/machine interface that is communicatively linked to the PTO-monitoring/control computer. Such a man/machine interface of the vehicle may include one or more of such devices as a keypad, a display screen, a touch screen, a computer mouse, a track ball, a speaker, a microphone and any other type of device commonly used to enable communication between a user and a computer. In some cases interaction between the PTO-monitoring/control computer 11 and the user during utilization of the PTO-logic-configuration system of the present invention to configure the PTO-monitoring/control logic will be effected through an off-board computer 46 such as a PC or diagnostic service tool temporarily communicatively linked to the PTO-monitoring/control computer 11. When in use, the PTO-logic-configuration software of the present invention may be located in computer memory of the PTO-monitoring/control computer, it may be located in the computer memory of an off-board computer, or it may be distributed between the computer memory of the PTO-monitoring/control computer and one or more off-board computers. It should be understood that the computer memory of a given computer is to be understood to include any temporary memory to which the computer's processor has access to including such computer memory as that of a floppy disc, tape, or cd loaded into the computer. In some cases a PTO-monitoring/control computer program that comprises some pre-constructed PTO-monitoring/control logic and that also comprises one or more of the software elements of the PTO-logic-configuration software of the PTO-logic-configuration system of the present invention may be loaded in computer memory of the PTO-monitoring/control computer. A PTO-logic-configuration system according to the present invention may be constructed and utilized in such a manner that the PTO-monitoring/control logic located in computer memory of the PTO-monitoring/control computer 11 is altered in real time as the user of the PTO-logic-configuration system alters the PTO-monitoring/control logic. Alternatively, in some embodiments, a PTO-logic-configuration system according to the present invention may be constructed to enable the user to utilize an off-board computer to upload the PTO-monitoring/control logic from the PTO-monitoring/control computer 11, to utilize PTO-logic-configuration software which is resident in computer memory of the off-board computer to reconfigure that PTO-monitoring/control logic and to subsequently download the reconfigured PTO-monitoring/control logic into computer memory of the PTO-monitoring/control computer 11. In still other embodiments, a PTO-logic-configuration system according to the present invention will be configured in such a manner that a user may operate an off-board computer, utilizing PTO-logic-configuration software of the present invention, to configure a set of PTO-monitoring/control logic within the computer memory of the off-board computer, without having previously uploaded any PTO-monitoring/control logic from the PTO-monitoring/control computer 11, and thereafter download the PTO-monitoring/control logic into computer memory of the PTO-monitoring/control computer 11.

In many cases the PTO-monitoring/control logic according to which a PTO-monitoring/control computer 11 will operate may only need to be configured once. In some cases however, events will transpire that will make it desirable to reconfigure the PTO-monitoring/control logic according to which the PTO-monitoring/control computer operates 11. For instance the configuration of the vehicle 17 and/or the PTO unit 12 thereof may be changed, in which case it would be desirable to reconfigure the PTO-monitoring/control logic according to which the PTO-monitoring/control computer 11 operates. Also, in some cases it might be necessary to utilize trial and error to find the optimum PTO-monitoring/control logic for a given vehicle 17 and PTO unit 12 thereof, in which case it would obviously be necessary to reconfigure the PTO-monitoring/control logic one or more times. Some embodiments of PTO-logic-configuration systems according to the present invention allow for infinite reconfiguration of the PTO-monitoring/control logic because they are constructed in such a manner to enable the user to ultimately cause storage of the PTO-monitoring/control logic in reconfigurable memory of the PTO-monitoring/control computer 11.

During operation of a given vehicle 17, the steps that a PTO-monitoring/control computer 11 executes when monitoring/controlling a PTO unit 12 are primarily dependent upon the value of PTO-related parameters of the vehicle 17, which are variables of operation of the vehicle 17 that have a significant effect upon appropriate control of the PTO unit 12. FIG. 2a lists parameters that are PTO-related parameters for many common configurations of vehicles 17 with PTO units 12. As was described above, a PTO-monitoring/control computer 11 of a vehicle 17 receives, from a vehicle-monitoring network, various signals that correspond to the values of various variables of operation of the vehicle 17. The vehicle-monitoring network of a vehicle 17 may have many different forms. In the first commercial implementation of the present invention, the PTO-logic-configuration system is particularly adapted for use in configuring the PTO-monitoring/control logic according to which the PTO-monitoring/control computer 11 of a vehicle 17 that has a vehicle-monitoring network like the one disclosed in U.S. Pat. No. 6,263,269 assigned to International Truck and Engine Corporation, which patent is incorporated herein by reference. The PTO-logic-configuration system of the present invention enables the user to communicate data to the PTO-monitoring/control computer 11 that will effect operation of the PTO-monitoring/control computer 11 according to the user's chosen PTO-monitoring/control logic. One thing that the user must communicate to the PTO-monitoring/control computer 11 in order to effect implementation of the user's chosen PTO-monitoring/control logic is PTO-related parameters of the vehicle 17 that are elements of the PTO-monitoring/control logic. The PTO-monitoring/control computer 11 and the user have a different understanding of what a given variable of operation of the vehicle 17 is, however. For instance, to the user, "Engine Speed" is the number of revolutions of the output shaft of the engine each minute, whereas to the PTO-monitoring/control computer 11, "Engine Speed" is a particular one of the signals received from its vehicle-monitoring network. Ultimately, a user must communicate any PTO-related parameters that are part of the PTO-monitoring/control logic in terms that will be corresponded by the PTO-monitoring/control computer 11 to a correct signal received from its vehicle-monitoring network. In some embodiments of the present invention the PTO-logic-configuration system comprises a predetermined list of PTO-related parameters and special provisions for the communication of each of those PTO-related parameters from the user to the PTO-monitoring/control computer 11 as elements of the PTO-monitoring/control logic. In such embodiments, the special provisions of the PTO-logic-configuration system for the communication of each PTO-related parameter of the predetermined list thereof to the PTO-monitoring/control computer 11 as an element of the PTO-monitoring/control logic include parameter-translating elements of the PTO-logic-configuration software for communication of each of the PTO-related parameters of the predetermined list thereof from the user of the PTO-logic-configuration system to the PTO-monitoring/control computer 11 as elements of the PTO-monitoring/control logic. In such embodiments, the operating instructions of the PTO-logic-configuration system comprise a listing of the predetermined list of PTO-related parameters for which the PTO-logic-configuration software has parameter-translating elements for the communication of. In these embodiments, the parameter-translating elements of the PTO-logic-configuration software for the communication of each of the PTO-related parameters to the PTO-monitoring/control computer 11 as an element of the PTO-monitoring/control logic also include prescribed methods of utilizing the PTO-logic-configuration software to communicate each PTO-related parameter of the predetermined list thereof to the PTO-monitoring/control computer 11 as an element of the PTO-monitoring/control logic and the operating instructions of the PTO-logic-configuration system comprise an explanation of those prescribed methods. It should be understood that the special provisions and corresponding prescribed methods that a PTO-logic-configuration system according to the present invention may have for the communication of predetermined PTO-related parameters to the PTO-monitoring/control computer 11 as part of the PTO-monitoring/control logic may include the communication of the predetermined PTO-related parameters to an off-board computer which subsequently transmits the predetermined PTO-related parameters to the PTO-monitoring/control computer 11 in a form appropriate for use by the PTO-monitoring/control computer 11.

The special provisions for communicating PTO-related parameters to the PTO-monitoring/control computer 11 may take many different forms. In some embodiments of the present invention, the operating instructions for the PTO-logic-configuration system will include a listing of a human understandable identifier for a PTO-related parameter value correlated with a computer code and instructions that, if the user wants to communicate that PTO-related parameter as part of the PTO-monitoring/control logic, they should enter the correlated computer code at a particular stage of operation of the PTO-logic-configuration system. In other embodiments of the invention the PTO-logic-configuration software may be such that the operating instructions for communicating PTO-related parameters as part of PTO-monitoring/control logic 11 are inherent to the configuration process. For instance, the PTO-logic-configuration software may, during the configuration process, cause a man/machine interface such as a display screen to display a list of human-readable PTO-related parameters from which the user may select utilizing conventional methods in order to effect integration of a particular one of the listed PTO-related parameters into the PTO-monitoring/control logic. Such conventional methods through which the user may be enabled to select a displayed PTO-related parameter include, but are not limited to, touching the portion of the display screen on which a particular PTO-related parameter is displayed, using a mouse or track ball to move a cursor to the portion of the display screen on which the PTO-related parameter is displayed and selecting the PTO-related parameter, and toggling through a displayed list of PTO-related parameters using up-arrow and down-arrow keys and subsequently actuating an enter key.

The parameter-translating elements of the PTO-logic-configuration software are functional to, when the user executes the prescribed method of utilizing the PTO-logic-configuration software to communicate a particular PTO-related parameter to the PTO-monitoring/control computer 11 as an element of the PTO-monitoring/control logic, cause the storage, in computer memory of the PTO-monitoring/control computer 11, of data that will serve to identify, for the PTO-monitoring/control computer 11, the appropriate signal from the vehicle-monitoring/network. For example, the PTO-related parameter that is "engine speed" to the user may be understandable to the PTO-monitoring/control computer 11 as being the signal that is received through input terminal number 3 of the PTO-monitoring/control computer 11. In such a case, parameter-translating elements of the PTO-logic-configuration software for communication of the "engine speed" PTO-related parameter from the user to the PTO-monitoring/control computer 11 as an element of the PTO-monitoring/control logic would respond to the user executing a prescribed method of communicating the "engine speed" PTO-related parameter from the user to the PTO-monitoring/control computer 11 as an element of the PTO-monitoring/control logic, by causing the storage, in computer memory of the PTO-monitoring/control computer 11, of data that identifies, for the PTO-monitoring/control computer 11, the signal from input terminal number 3 of the PTO-monitoring/control computer 11. It is anticipated that a person of ordinary skill in the art who has reviewed this disclosure and associated drawings would be enabled to utilize well-known information-system construction techniques to engineer myriad different combinations of prescribed methods of a user communicating a PTO-related parameter and cooperating software elements of the PTO-logic-configuration software that respond by causing the storage, in computer memory of the PTO-monitoring/control computer 11, of data that identifies, for the PTO-monitoring/control computer 11, a signal received from the vehicle-monitoring network that corresponds to the PTO-related parameter communicated by the user. Accordingly, exhaustive discussion of the construction of software elements of PTO-logic-configuration software that constitute parameter-translating elements for communication of PTO-related parameters and corresponding prescribed methods of utilizing those parameter-translating elements will not be provided in this disclosure.

In addition to there existing vehicle parameters that commonly affect proper monitoring/control of a PTO unit 12 of a vehicle 17, there exist certain values of those PTO-related parameters that are particularly important to the control of PTO units 12 of vehicles 17 and that may be considered to be key PTO-related parameter values. FIG. 2b lists a number of key PTO-related parameter values upon the existence or absence of which it is commonly appropriate to condition operation of a PTO unit 12. A user may wish to integrate one or more key PTO-related parameter values into the PTO-monitoring/control logic so that various actions of the PTO-monitoring/control computer 11 will be dependent upon those key PTO-related parameter values. In order to integrate a key PTO-related parameter value into the PTO-monitoring/control logic, the user must communicate that key PTO-related parameter value to the PTO-monitoring/control computer 11 as an element of the PTO-monitoring/control logic. The PTO-monitoring/control computer 11 and the user have a different understanding of, what a given key PTO-related parameter value of the vehicle 17 is, however. For instance a key PTO-related parameter value that is "Park Brake Status=Set" to the user is, to the PTO-monitoring/control computer 11, a particular value of a particular signal received from its vehicle monitoring network. Ultimately, a user must communicate any key PTO-related parameter values that are to be elements of the PTO-monitoring/control logic in terms that will be corresponded by the PTO-monitoring/control computer 11 to a correct value of a correct signal received from its vehicle-monitoring network. In some embodiments, the PTO-logic-configuration system of the present invention includes a predetermined list of key PTO-related parameter values and special provisions for the communication of those key PTO-related parameter values from the user to the PTO-monitoring/control computer 11 as elements of the PTO-monitoring/control logic. In such embodiments, the special provisions for the communication of the key PTO-related parameter values to the PTO-monitoring/control computer 11 as elements of the PTO-monitoring/control logic include parameter-value-translating elements in the PTO-logic-configuration software for communication of those key PTO-related parameter values from the user of the PTO-logic-configuration system to the PTO-monitoring/control computer 11 as elements of the PTO-monitoring/control logic. In these embodiments, the special provisions for the communication of the key PTO-related parameter values to the PTO-monitoring/control computer 11 as elements of the PTO-monitoring/control logic also include prescribed methods of utilizing the PTO-logic-configuration software to communicate key PTO-related parameter values to the PTO-monitoring/control computer 11 as elements of the PTO-monitoring/control logic. Additionally, in these embodiments, the operating instructions of the PTO-logic-configuration system comprise a listing of the predetermined list of key PTO-related parameter values and means for enabling the explicit or inherent communication to the user of the prescribed methods of utilizing the PTO-logic-configuration software to communicate the key PTO-related parameter values to the PTO-monitoring/control computer 11 as elements of the PTO-monitoring/control logic. It should be understood that the special provisions and corresponding prescribed methods that a PTO-logic-configuration system according to the present invention may have for the communication of key PTO-related parameter values to the PTO-monitoring/control computer 11 as part of the PTO-monitoring/control logic may include the communication of the key PTO-related parameter values to an off-board computer which subsequently transmits the key PTO-related parameter values to the PTO-monitoring/control computer 11 in a form appropriate for use by the PTO-monitoring/control computer 11.

The special provisions for communicating key PTO-related parameter values to the PTO-monitoring/control computer 11 as elements of PTO-monitoring/control logic may take many different forms. In some embodiments of the present invention, the operating instructions for the PTO-logic-configuration system will include a listing of a human understandable identifier for a key PTO-related parameter value correlated with a computer code and instructions that, if the user wants to communicate that key PTO-related parameter value to the PTO-monitoring/control computer 11 as part of the PTO-monitoring/control logic, they should enter the correlated computer code at a certain stage of operation of the PTO-logic-configuration system. In other embodiments of the invention the configuration of the PTO-logic-configuration software may be such that the operating instructions for the user's communication of key PTO-related parameter values to the PTO-monitoring/control computer 11 as elements of the PTO-monitoring/control logic are inherent to the configuration process. For instance, the PTO-logic-configuration software may, during the configuration process, cause a man/machine interface such as a display screen to display a list of human-readable key PTO-related parameter values from which the user may select utilizing conventional methods in order to effect integration of a particular one of the listed key PTO-related parameter values into the PTO-monitoring/control logic. Such conventional methods through which the user may be enabled to select a displayed key PTO-related parameter value include, but are not limited to, touching the portion of the display screen on which a particular key PTO-related parameter value is displayed, using a mouse or track ball to move a cursor to the portion of the display screen on which the key PTO-related parameter value is displayed and selecting the key PTO-related parameter value, and toggling through a displayed list of key PTO-related parameter values using up-arrow and down-arrow keys and subsequently actuating an enter key.

The parameter-value-translating elements of the PTO-logic-configuration software for the communication of key PTO-related parameter values from the user to the PTO-monitoring/control computer 11 include software elements that are functional to, when the user executes the prescribed method of utilizing them to communicate a particular key PTO-related parameter value, cause the storage, in computer memory of the PTO-monitoring/control computer 11, of data that will serve to identify, for the PTO-monitoring/control computer 11, the appropriate signal and value thereof from the vehicle-monitoring/network. For example, the key PTO-related parameter value that is "park-brake status=set" to the user may be understandable to the PTO-monitoring/control computer 11 as a logic high signal that is received through input terminal number 4 of the PTO-monitoring/control computer 11. In such a case, the parameter-value-translating elements of the PTO-logic-configuration software for communication of the "park-brake status=set" key PTO-related parameter value from the user to the PTO-monitoring/control computer 11 would be software elements that respond to the user executing a prescribed method of communicating the "park-brake status=set" key PTO-related parameter value by causing the storage, in computer memory of the PTO-monitoring/ control computer 11, of data that identifies, for the PTO-monitoring/control computer 11 a logic high signal from input terminal number 4 of the PTO-monitoring/control computer 11. It is anticipated that a person of ordinary skill in the art who has reviewed this disclosure and associated drawings would be enabled to utilize well-known information-system construction techniques to engineer myriad different combinations of prescribed methods of a user communicating a key PTO-related parameter value and cooperating software elements of the PTO-logic-configuration software that respond by causing the storage, in computer memory of the PTO-monitoring/control computer 11, of data that identifies for the PTO-monitoring/ control computer 11 a signal and value thereof received from the vehicle-monitoring network that corresponds to the key PTO-related parameter value communicated by the user. Accordingly, exhaustive discussion of the construction of software elements of PTO-logic-configuration software that constitute parameter-value-translating elements for communication of key PTO-related parameter values and corresponding prescribed methods of utilizing those software elements will not be provided in this disclosure.

In addition to there existing PTO-related parameters and key PTO-related parameter values, the existence or absence of which have significant effects upon appropriate monitoring/control of a PTO unit 12 and the vehicle 17 of which it is a part, there exist key PTO-related events the occurrence of which commonly affects appropriate monitoring/control of a PTO unit 12 and the vehicle 17 of which it is a part. FIG. 2c lists a number of key PTO-related events that have an effect on the monitoring/control of many common constructions of vehicles 17 and PTO units 12 thereof. A user may wish to integrate one or more key PTO-related events into the PTO-monitoring/control logic so that various actions of the PTO-monitoring/control computer 11 will be triggered by the occurrence of those key PTO-related events. In order to integrate a key PTO-related event into the PTO-monitoring/control logic, the user must communicate that key PTO-related event to the PTO-monitoring/control computer 11 as an element of the PTO-monitoring/control logic. The PTO-monitoring/control computer 11 and the user have a different understanding of what a given PTO-related of the vehicle 17 is, however. For instance a PTO-related parameter value that is "Transmission Is Taken Out Of Neutral" to the user is, to the PTO-monitoring/control computer 11, a particular pattern of signals received from its vehicle monitoring network over time. Ultimately, a user must communicate any key PTO-related events that are to be elements of the PTO-monitoring/control logic in terms that will be corresponded by the PTO-monitoring/control computer 11 to a correct combination of changes in the signals received from its vehicle-monitoring network. In some embodiments, the PTO-logic-configuration system of the present invention includes a predetermined list of key PTO-related events and special provisions for the communication of those key PTO-related events from the user to the PTO-monitoring/ control computer 11 as elements of the PTO-monitoring/ control logic. In such embodiments, the special provisions for the communication of the key PTO-related events to the PTO-monitoring/control computer 11 as elements of the PTO-monitoring/control logic include event-identifier-translating elements in the PTO-logic-configuration software for communication of those key PTO-related events from the user of the PTO-logic-configuration system to the PTO-monitoring/control computer 11 as elements of the PTO-monitoring/control logic. In these embodiments, the special provisions for the communication of the key PTO-related events to the PTO-monitoring/control computer 11 as elements of the PTO-monitoring/control logic also include prescribed methods of utilizing the PTO-logic-configuration software to communicate key PTO-related events to the PTO-monitoring/control computer 11 as elements of the PTO-monitoring/control logic. Additionally, in these embodiments, the operating instructions of the PTO-logic-configuration system comprise a listing of the predetermined list of key PTO-related events and an explicit or inherent explanation of the prescribed methods of utilizing the PTO-logic-configuration software to communicate the key PTO-related events to the PTO-monitoring/control computer 11 as elements of the PTO-monitoring/control logic. It should be understood that the special provisions and corresponding prescribed methods that a PTO-logic-configuration system according to the present invention may have for the communication of key PTO-related events to the PTO-monitoring/control computer 11 as part of the PTO-monitoring/control logic may include the communication of the key PTO-related events to an off-board computer which subsequently transmits the key PTO-related events to the PTO-monitoring/control computer 11 in a form appropriate for use by the PTO-monitoring/control computer 11.

The special provisions for communicating key PTO-related events to the PTO-monitoring/control computer 11 as elements of PTO-monitoring/control logic may take many different forms. In some embodiments of the present invention, the operating instructions for the PTO-logic-configuration system will include a listing of a human understandable identifier for a key PTO-related event correlated with a computer code and instructions that, if the user wants to communicate that key PTO-related event to the PTO-monitoring/control computer 11 as part of the PTO-monitoring/control logic, they should enter the correlated computer code at a certain stage of operation of the PTO-logic-configuration system. In other embodiments of the invention the configuration of the PTO-logic-configuration software may be such that the operating instructions for the user's communication of key PTO-related events to the PTO-monitoring/control computer 11 as elements of the PTO-monitoring/control logic are inherent to the configuration process. For instance, the PTO-logic-configuration software may, during the configuration process, cause a man/machine interface such as a display screen to display a list of human-readable key PTO-related events from which the user may select utilizing conventional methods in order to effect integration of a particular one of the listed key PTO-related events into the PTO-monitoring/control logic. Such conventional methods through which the user may be enabled to select a displayed key PTO-related event include, but are not limited to, touching the portion of the display screen on which a particular key PTO-related event is displayed, using a mouse or track ball to move a cursor to the portion of the display screen on which the key PTO-related event is displayed and selecting the key PTO-related event, and toggling through a displayed list of key PTO-related events using up-arrow and down-arrow keys and subsequently actuating an enter key.

The event-identifier-translating-elements of the PTO-logic-configuration software for the communication of key PTO-related events from the user to the PTO-monitoring/ control computer 11 include software elements that are functional to, when the user executes the prescribed method of utilizing the PTO-logic-configuration software to communicate a particular key PTO-related event, cause storage, in computer memory of the PTO-monitoring/control computer 11, of data that will serve to identify, for the PTO-monitoring/control computer 11, the appropriate combination signal receipts from the vehicle-monitoring/network. For example, the key PTO-related event that is "transmission is taken out of neutral" to the user may be understandable to the PTO-monitoring/control computer 11 as a change of the signal received from input terminal number 5 of the PTO-monitoring/control computer 11 from a logic high value to a logic low value. In such a case, the event-identifier-translating-elements of the PTO-logic-configuration software for communication of the "transmission is taken out of neutral" key PTO-related event from the user to the PTO-monitoring/control computer 11 would be software elements that respond to the user executing a prescribed method of communicating the "transmission is taken out of neutral" key PTO-related event by causing the storage, in computer memory of the PTO-monitoring/control computer 11, of data that identifies, for the PTO-monitoring/control computer 11 a change in the signal received from input terminal number 5 of the PTO-monitoring/control computer 11 from a logic high value to a logic low value. It is anticipated that a person of ordinary skill in the art who has reviewed this disclosure and associated drawings would be enabled to utilize well-known information-system construction techniques to engineer myriad different combinations of prescribed methods of a user communicating a key PTO-related event and cooperating software elements of the PTO-logic-configuration software that respond by causing the storage, in computer memory of the PTO-monitoring/control computer 11, of data that identifies for the PTO-monitoring/control computer 11 a combination of signals over time received from the vehicle-monitoring network that corresponds to the key PTO-related event communicated by the user. Accordingly, exhaustive discussion of the construction of software elements of PTO-logic-configuration software that constitute event-identifier-translating-elements for communication of key PTO-related events and corresponding prescribed methods of utilizing those event-identifier-translating-elements will not be provided in this disclosure.

There are a variety of functions that a PTO-monitoring/control computer 11 may perform when monitoring and/or controlling a PTO unit 12. A PTO-monitoring/control computer 11 may function to effect engagement of the PTO unit 12. In some cases the PTO-monitoring/control computer 11 will operate according to PTO-monitoring/control logic that causes it to engage the PTO unit 12 anytime an operator of the vehicle 17 requests engagement of the PTO unit 12. In other cases the PTO-monitoring/control computer 11 will operate according to PTO-monitoring/control logic that is configured in such a manner that the PTO-monitoring/control computer 11 will only enable or effect engagement of the PTO unit 12 if certain conditions, in addition to a request for PTO engagement, exist. A PTO-monitoring/control computer 11 may function to effect disengagement of the PTO unit 12. In some cases the PTO-monitoring/control computer 11 will operate according to PTO-monitoring/control logic that causes it to disengage the PTO unit 12 only when an operator of the vehicle 17 requests disengagement of the PTO unit 12. In other cases the PTO-monitoring/control logic according to which the PTO-monitoring/control computer 11 operates will include automatic PTO-disengagement logic that will cause the PTO-monitoring/control computer 11 to automatically effect disengagement of the PTO unit 12 at the existence of certain circumstances deemed to be potentially hazardous to the PTO unit 12, other systems of the vehicle 17, and/or operators of the vehicle 17. In some cases the PTO-monitoring/control logic according to which the PTO-monitoring/control computer 11 operates may include, in addition to automatic PTO-disengagement logic, automatic PTO-reengagement logic that will cause the PTO-monitoring/control computer 11 to, after having automatically effected disengagement of the PTO unit 12, at the occurrence of a PTO-reengagement compeller automatically effect reengagement of the PTO unit 12. Yet another function that a PTO-monitoring/control computer 11 may perform is the production of a PTO-alarm signal when the operating conditions of the PTO unit 12 and the other systems of the vehicle 17 are conducive to component damage or operator injury. In such cases the PTO-monitoring/control logic according to which the PTO-monitoring/control computer 11 operates includes PTO-alarm logic upon which the production of a PTO-alarm signal by the PTO-monitoring/control computer 11 is conditional.

In cases where a PTO-monitoring/control computer 11 functions to enable or effect engagement of the PTO unit 12 only when certain conditions in addition to a request from an operator for PTO engagement exist, the PTO-monitoring/control logic according to which the PTO-monitoring/control computer 11 operates includes PTO-engagement logic. The PTO-engagement logic of such a configuration of PTO-monitoring/control logic defines what conditions must exist in addition to a request for PTO-engagement before the PTO-monitoring/control computer 11 will enable or effect engagement of the PTO unit 12. The PTO-engagement logic of such a configuration of PTO-monitoring/control logic includes a PTO-engagement-requirement combination and/or a list of PTO-engagement inhibitors. A PTO-engagement requirement combination is a group of conditions, all of which must exist before the PTO-monitoring/control computer 11 will enable or effect engagement of the PTO unit 12. Each PTO-engagement requirement is typically a particular value or range of values of an operating parameter of the vehicle 17. For instance, PTO-engagement requirements that might, as a group, constitute a PTO-engagement-requirement combination could be "Ignition Switch Status=Run", "Park Brake Status=Set", "Engine Speed<2500 RPM", and "Transmission Gear Selection=Neutral". In such a case, the ignition switch of the vehicle 17 must have a "run" operational state, the park brake must be set, the engine speed must be below 2500 RPM, and the transmission gear selected must be neutral before the PTO-monitoring/control computer 11 will enable or effect engagement of the PTO unit 12. A list of PTO-engagement inhibitors is a group of conditions all of which must be non-existent before the PTO-monitoring/control computer 11 will enable or effect engagement of the PTO unit 12. Each PTO-engagement inhibitor is typically a particular value or range of values of an operating parameter of the vehicle 17. For instance, PTO-monitoring/control logic may have a list of PTO-engagement inhibitors that include "Ignition Switch Status=Off" and "Compressed-air-system pressure<minimum engagement-appropriate air pressure". In such a case if the ignition switch is off and/or the compressed-air-system pressure is below the minimum engagement-appropriate air pressure, the PTO-monitoring/control computer 11 will not enable or effect engagement of the PTO unit 12. Some embodiments of the PTO-logic-configuration system of the present invention include engagement-logic-configuration tools for enabling the user to quickly and easily configure or reconfigure PTO-engagement logic of the PTO-monitoring/control logic. In such embodiments, the engagement-logic-configuration tools enable the user to configure or reconfigure a PTO-engagement-requirement combination in PTO-engagement logic of the PTO-monitoring/control logic and/or to configure or reconfigure a list of PTO-engagement inhibitors in PTO-engagement logic of the PTO-monitoring/control logic. In embodiments of the present invention that comprise engagement-logic-configuration tools for enabling the user to configure or reconfigure a PTO-engagement-requirement combination those engagement-logic-configuration tools include software elements of the PTO-logic-configuration software and corresponding prescribed methods for utilizing those software elements to add/subtract PTO-engagement requirements to/from the PTO-engagement-requirement combination. In such embodiments of the present invention the operating instructions of the PTO-logic-configuration system include explicit or inherent explanation of the prescribed methods of adding/subtracting PTO-engagement requirements to/from the PTO-engagement-requirement combination. In those embodiments of the present invention in which the PTO-logic-configuration system comprises engagement-logic-configuration tools for enabling the user to configure/reconfigure a list of PTO-engagement inhibitors in the PTO-monitoring/control logic, those engagement-logic-configuration tools include software elements of the PTO-logic-configuration software and corresponding prescribed methods of utilizing those software elements to add/subtract PTO-engagement-inhibitors to/from the PTO-monitoring/control logic. In such embodiments, the operating instructions of the PTO-logic-configuration system also includeexplicit or inherent explanation of the prescribed methods of adding/subtracting PTO-engagement inhibitors to/from the PTO-engagement logic portion of the PTO-monitoring/control logic.

Figure 3A:
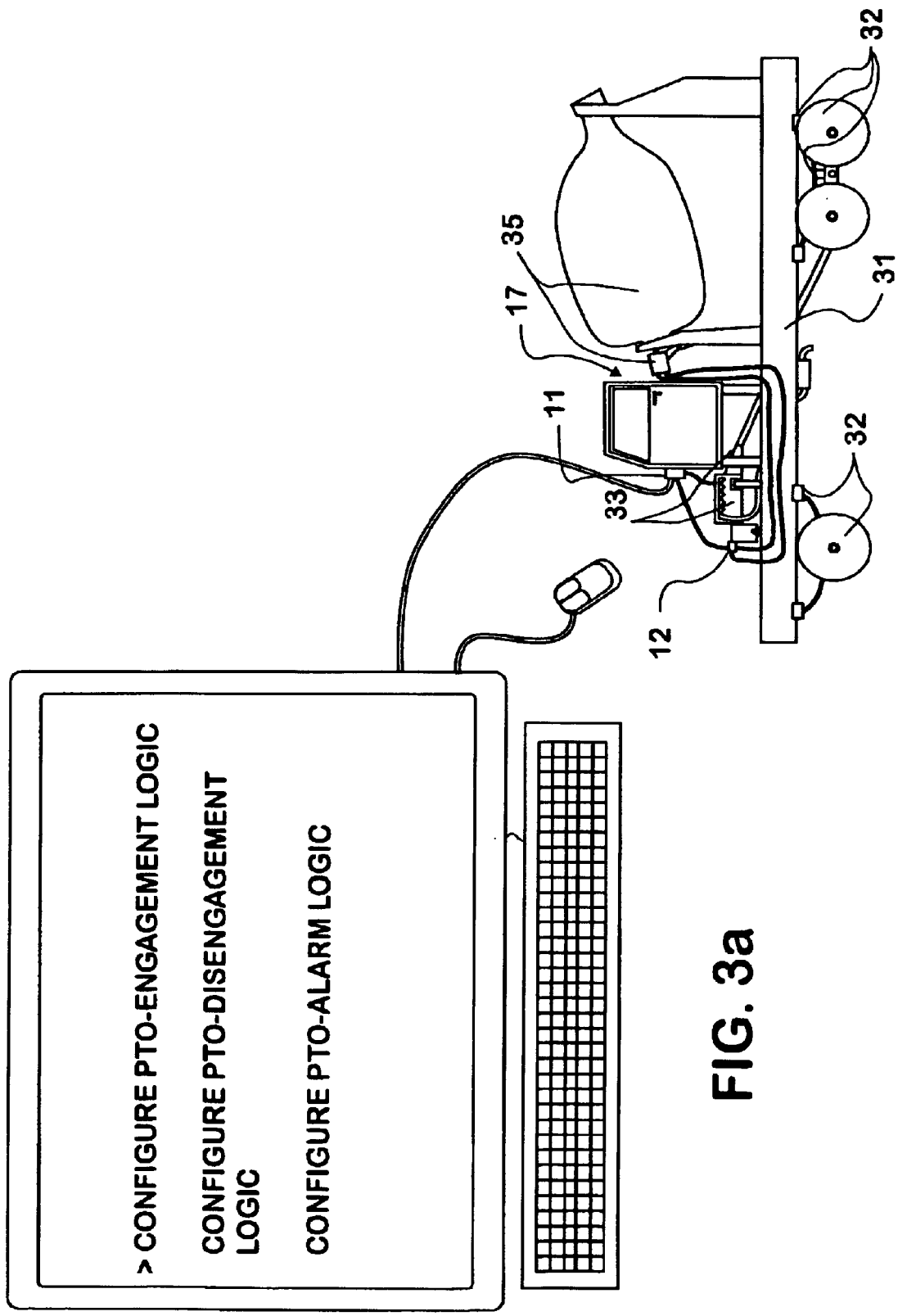
FIG. 3a is an illustration of a stage of operation of a first embodiment of a PTO-logic-configuration system at which the user is presented with the option to navigate to different stages of operation at which the user will be enabled to configure different elements of the PTO-monitoring/control logic.
Figure 3B:
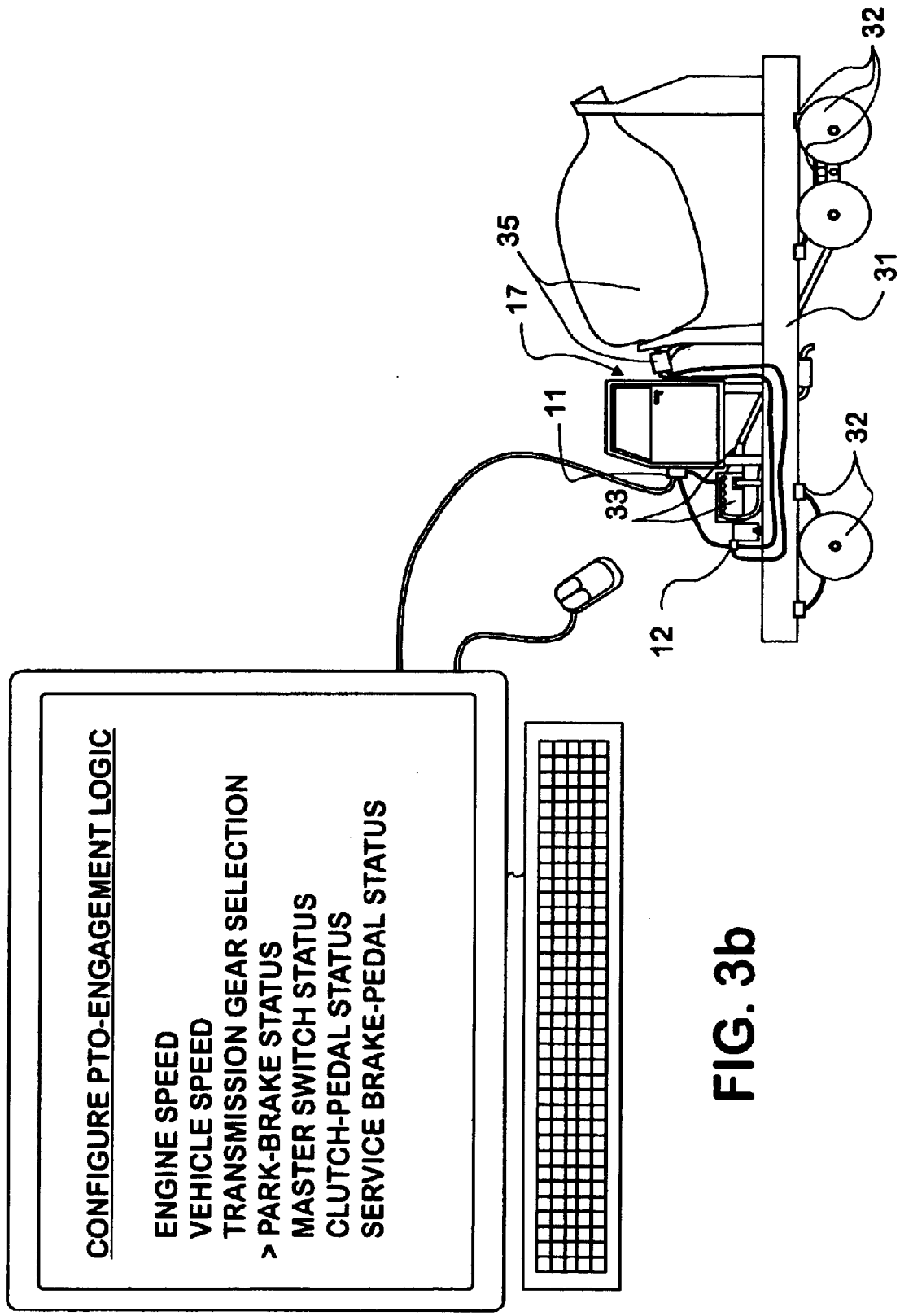
Figure 3C:
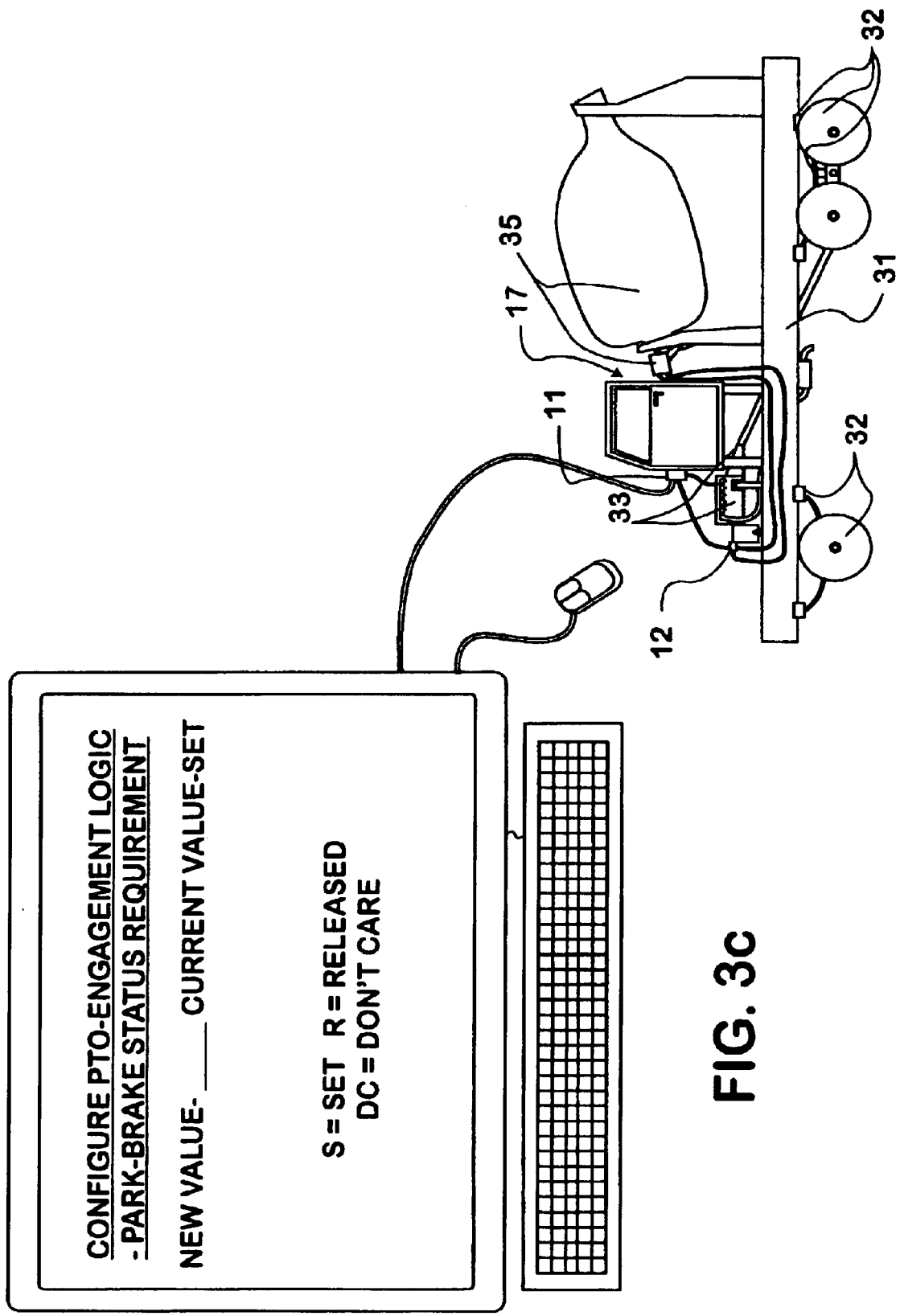
FIG. 3c is an illustration of a stage of operation of the embodiment of the PTO-logic-configuration system, the operation of which is illustrated in FIGS. 3a and 3b, at which the user may set the value of the Park-Brake Status type PTO-engagement requirement of the PTO-monitoring/control logic.

Software elements that PTO-logic-configuration software may have for enabling the addition/subtraction of PTO-engagement-requirements to/from a PTO-engagement-requirement combination of PTO-engagement logic may have many different forms. Accordingly, any corresponding prescribed methods for utilizing the PTO-logic-configuration software to add/subtract PTO-engagement requirements to/from a PTO-engagement-requirement combination of PTO-engagement logic may have many different forms. In some embodiments of the present invention the PTO-logic-configuration software may have a configuration tailored for use in the configuration or reconfiguration of PTO-monitoring/control logic that includes a PTO-engagement-requirement combination with a set group of PTO-engagement requirement types. For example it may be prescribed that a PTO-engagement requirement combination is to always comprise four PTO-engagement requirements types consisting of "Park Brake Status", "Engine Speed Range", "Ignition Switch Status", and "Transmission Gear Selection". In such a case the PTO-engagement-requirement combination will always include some operating state of the park brake, some range of engine speeds, some operating state of the ignition switch, and some transmission gear selection, all of which must exist before the PTO-monitoring/control computer 11 will enable and/or effect engagement of the PTO unit 12. In embodiments of the PTO-logic-configuration system according to the present invention adapted for use in configuring or reconfiguring a PTO-engagement-requirement combination that includes a set group of PTO-engagement requirement types the only way for a user to add a PTO-engagement requirement to an existing PTO-engagement-requirement combination is to overwrite the value of one of the PTO-engagement requirements with one of the same type. For purposes of this disclosure, overwriting the value of a PTO-engagement requirement of such a PTO-engagement-requirement combination in such a manner is to be considered to be the simultaneous addition of a new PTO-engagement requirement and subtraction of the old PTO-engagement requirement that is overwritten. In embodiments in which the PTO-logic-configuration system of the present invention is adapted for configuring or reconfiguring a PTO-engagement-requirement combination that has a set group of PTO-engagement-requirement types, the operating instructions of the PTO-logic-configuration system include an explanation of the set group of PTO-engagement-requirement types. In many such embodiments of the present invention, unless the user desires one or more of the set group of PTO-engagement-requirement types to be a default PTO-engagement requirement value thereof that is in the initial configuration of the PTO-engagement-requirement combination, the user must utilize the PTO-logic-configuration system of the present invention to overwrite each of the default values of the PTO-engagement requirements with a PTO-engagement requirement of the user's choice. Take for example the above-mentioned hypothetical situation in which the PTO-logic-configuration system of the present invention is adapted for configuring or reconfiguring a PTO-engagement-requirement combination that has a set group of PTO-engagement-requirement types consisting of "Park Brake Status", "Engine Speed Range", "Ignition Switch Status", and "Transmission Gear Selection". In such a case the user might utilize the PTO-logic-configuration system to overwrite the default values of the "Park Brake Status" PTO-engagement requirement, the "Ignition Switch Status" PTO-engagement requirement and the "Engine Speed Range" PTO-engagement requirement with "Park Brake Status=Set", "Ignition Switch Status= Run", and "Engine Speed Range<2500 RPM" respectively, but leave the default value of the "Transmission Gear Selection" PTO-engagement requirement unmodified. As was discussed above, if the user performs such a configuration of PTO-monitoring/control logic, the PTO-monitoring/control computer 11 will, thereafter, effect or enable engagement of the PTO unit 12 only if the park brake is set, the ignition switch is has a "run" operational state, the engine has a speed of less than 2500 RPM, and the value of the "Transmission Gear Selection" of the vehicle's operating state is equal to the default value of the "Transmission Gear Selection" PTO-engagement requirement. Of course, in some embodiments of the present invention in which the PTO-logic-configuration system is adapted for utilization by the user to configure or reconfigure a PTO-engagement-requirement combination that includes a set group of PTO-engagement requirement types, the engagement-logic-configuration tools are constructed in such a manner to enable the user to make the value of the PTO-engagement requirement of one or more of the PTO-engagement requirement types a "don't care" value. If such a "don't care" value is set as the PTO-engagement requirement value for a PTO-engagement requirement type that PTO-engagement requirement type is effectively eliminated from the PTO-engagement-requirement combination since any value of that PTO-engagement requirement type is considered to be acceptable. In some cases a PTO-logic-configuration system according to the present invention will enable a user to set a "don't care" value for any of the set types of PTO-requirements of a PTO-engagement-requirement combination. In such cases the user is effectively enabled to compile a PTO-engagement-requirement combination with an indefinite number of PTO-engagement requirements through the free form addition/subtraction of PTO-engagement-requirements to/from the PTO-engagement-requirement combination. In many cases "don't care" will be the default value of one or more of the PTO-engagement requirements of a PTO-engagement-requirement combination that has a set group of PTO-engagement requirement types. In some cases a PTO-engagement-requirement combination with a set group of PTO-engagement-requirement types will have default values of its PTO-engagement requirements that are all "don't care". In embodiments of the invention wherein the PTO-logic-configuration system is adapted for configuring a PTO-engagement-requirement combination that has a set group of PTO-engagement-requirement types, the software elements of the PTO-logic-configuration software for enabling the addition/subtraction of PTO-engagement requirements to/from the PTO-engagement-requirement combination and the corresponding prescribed methods for utilizing the PTO-logic-configuration software to add/subtract PTO-engagement requirements to/from PTO-monitoring/control logic may have any of a number of different forms. In some such embodiments of the present invention the PTO-logic-configuration software enables the operation of a menu system at a man/machine interface such as a display screen and a keyboard and the operator can utilize the man/machine interface and the menu system to navigate to stages of operation of the PTO-logic-configuration system at which it is ready to receive a value of a particular one of the set types of PTO-engagement-requirements for addition to the PTO-engagement-requirement combination. In order to provide an understanding of the general principals of how a PTO-logic-configuration system according to the present invention may be constructed with engagement-logic-configuration tools for enabling the user to add/subtract PTO-engagement requirements to/from the PTO-monitoring/control logic, an example of the steps of utilizing one such embodiment of a PTO-logic-configuration system to add a PTO-engagement requirement to a PTO-engagement-requirement combination is illustrated in FIGS. 3a–3c and discussed forthwith. FIG. 3a shows such a PTO-logic-configuration system at a stage of operation where the user is presented with the option (among others) to enter a stage of operation in which the user may configure the PTO-engagement logic of the PTO-monitoring/control logic by adding PTO-engagement requirements thereto. FIG. 3b shows the same PTO-logic-configuration system after the user has navigated to a general menu for selecting a type of PTO-engagement requirement that the user wishes to add to the PTO-engagement-requirement combination. At the stage of operation shown in FIG. 3b, the user may select a type of PTO-engagement requirement from the set group of PTO-engagement requirement types of the PTO-engagement-requirement combination in order to navigate to a stage of operation of the PTO-logic-configuration system at which the user may communicate the value that they wish the PTO-engagement requirement of that type to have. For example, if, at the stage of operation of the PTO-logic-configuration system illustrated in FIG. 3b, the user selects the "Park Brake Status" option, operation of the PTO-logic-configuration system would advance to the stage illustrated in FIG. 3c. At the stage of operation illustrated in FIG. 3c, the PTO-logic-configuration system is readied for receipt of a communication from the user of the value of the PTO-engagement requirement of the "Park Brake Status" type.

Once the user enters a value for the "Park Brake Status" type PTO-engagement requirement, the PTO-logic-configuration software in concert with any system software of the PTO-monitoring/control computer 11 and any off-board computer through which the user may be communicating with the PTO-monitoring/control computer 11 causes the addition of that PTO-engagement requirement to the PTO-monitoring/control logic. Of course, it is anticipated that a person of ordinary skill in the art will be enabled by this disclosure and the associated drawings to engineer innumerable different arrangements of well-known information-system building-blocks in order to form, in addition to those embodiments explicitly described and illustrated by this disclosure and the associated drawings, innumerable different embodiments of PTO-logic-configuration systems according to the present invention that have engagement-logic-configuration tools for the addition/subtraction of PTO-engagement requirements to/from a PTO-engagement-requirement combination that has a set group of PTO-engagement-requirement types.

Figure 4A:
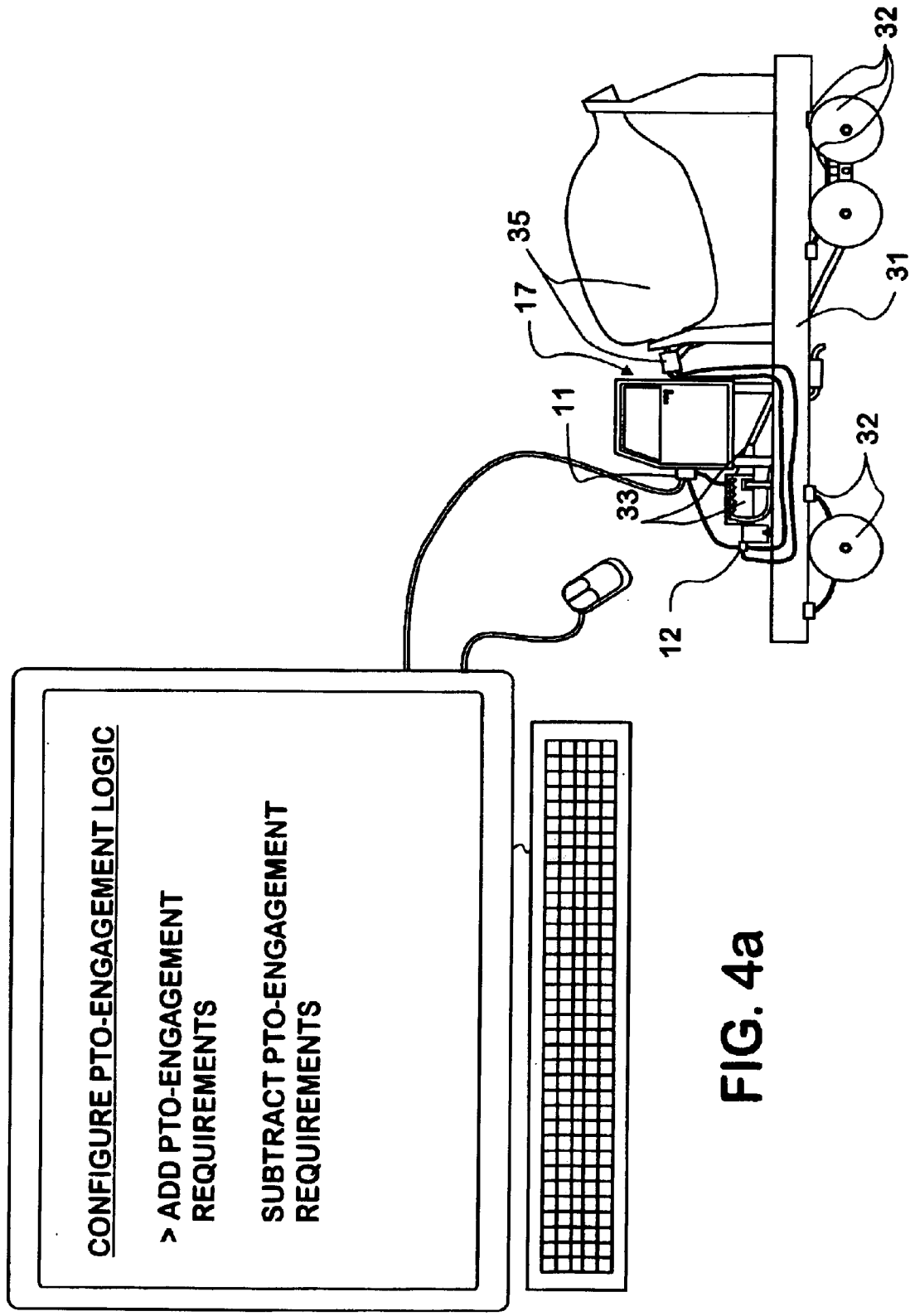
FIG. 4a is an illustration of a stage of operation of a second embodiment of a PTO-logic-configuration system at which the user is presented with the option to navigate the stage of operation of the PTO-logic-configuration system to different ones at which the user is enabled to add or subtract PTO-engagement requirements to or from the PTO-monitoring/control logic.
Figure 4B:
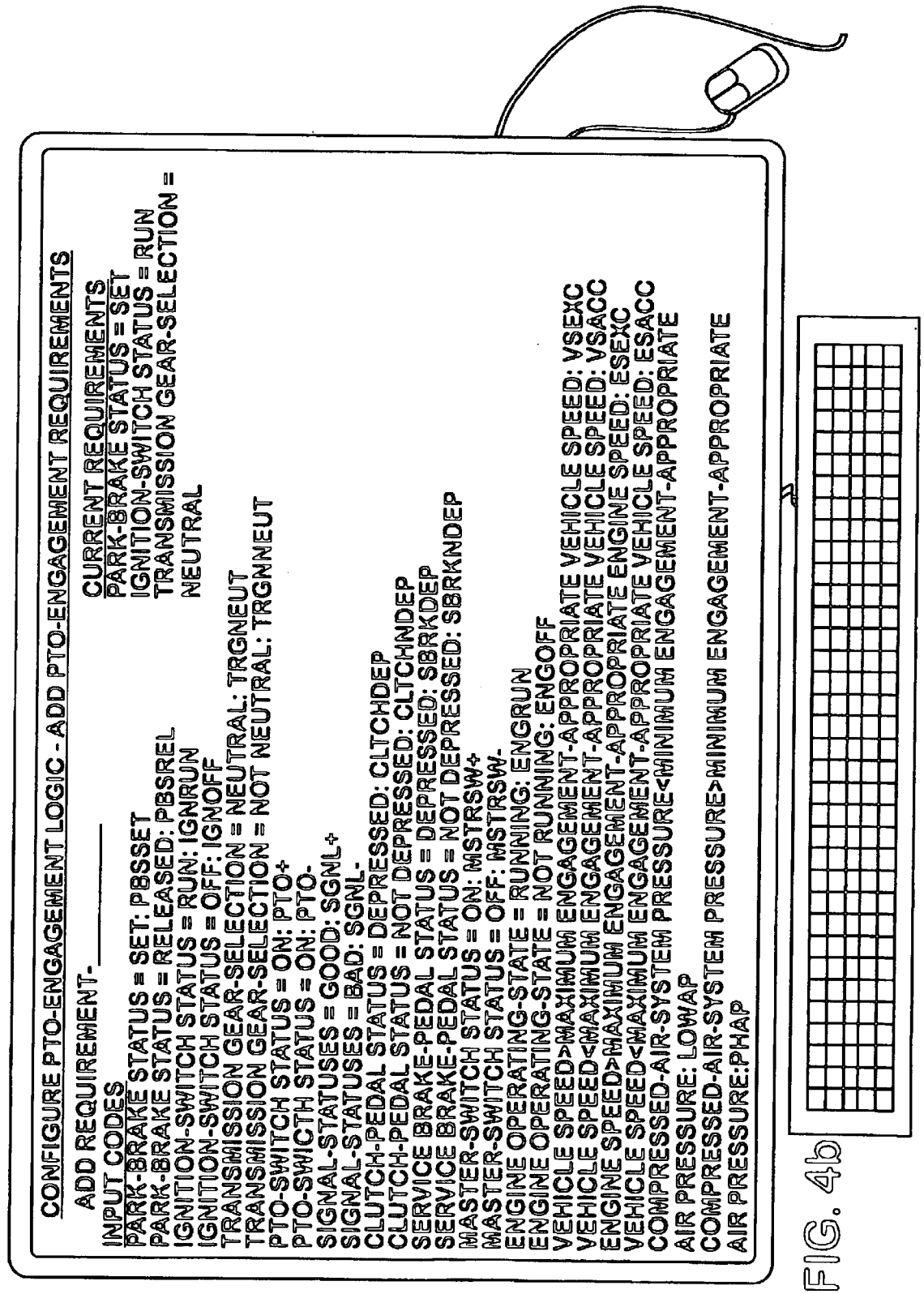
FIG. 4b is an illustration of a stage of operation of the PTO-logic-configuration system, the operation of which is illustrated in FIG. 4a, at which the user is enabled to add PTO-engagement requirements to the PTO-monitoring/control logic.
Figure 4C:
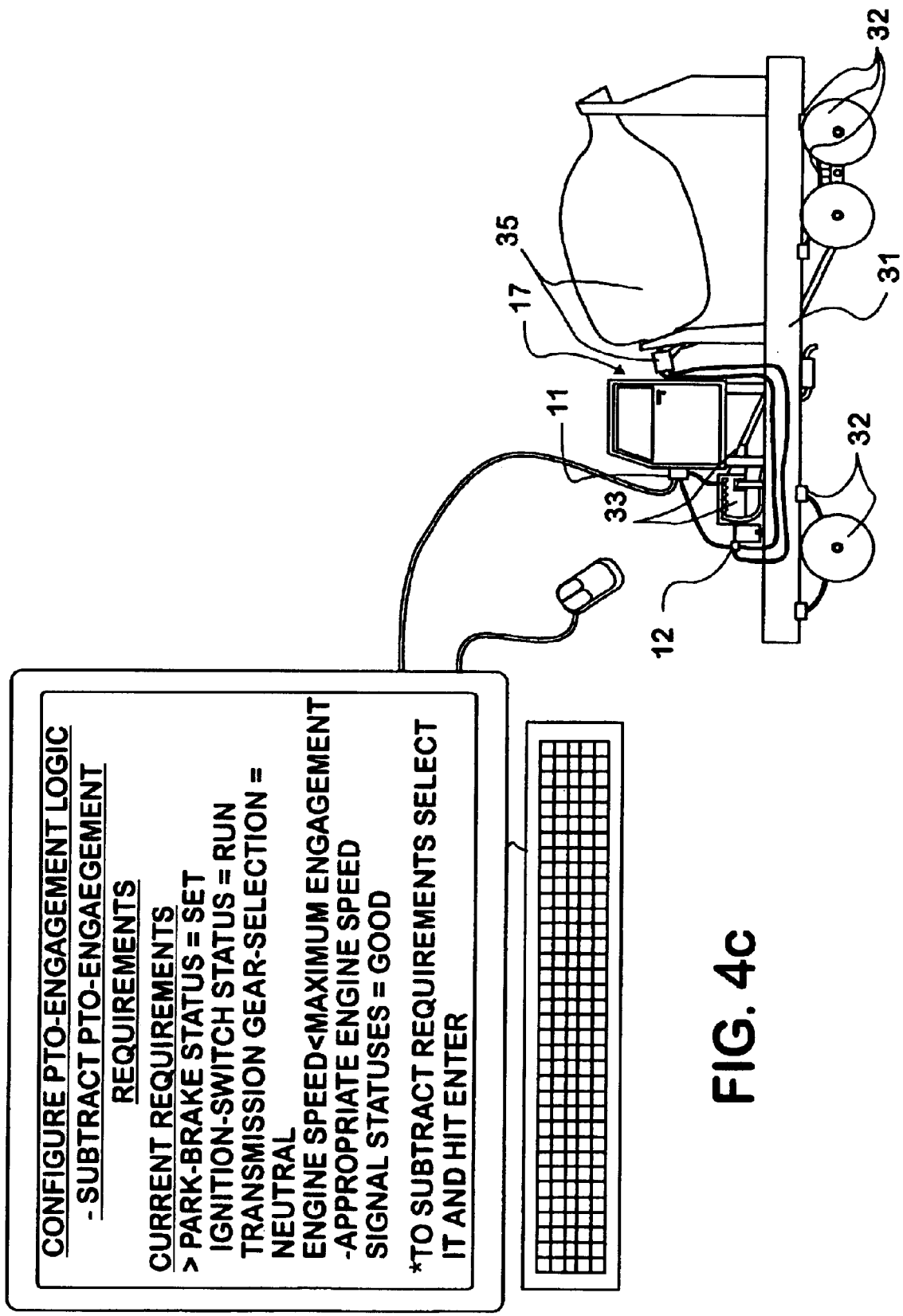
FIG. 4c is an illustration of a stage of operation of the PTO-logic-configuration system, the operation of which is illustrated in FIGS. 4a and 4b, at which the user is enabled to subtract PTO-engagement requirements from the PTO-monitoring/control logic.

In some embodiments, the PTO-logic-configuration system of the present invention is configured in such a manner that a PTO-engagement-requirement combination may be configured or reconfigured by the user through the addition/subtraction of an indefinite number of PTO-engagement requirements to/from the PTO-engagement requirement combination. In such embodiments of the present invention the prescribed methods through which the user may add/subtract PTO-engagement requirements to/from the PTO-monitoring/control logic may take on any of a number of different forms that utilize well-known types of information-system building-blocks. In order to provide an understanding of the general principals of how a PTO-logic-configuration system according to the present invention may be constructed with engagement-logic-configuration tools for enabling the user to add/subtract an indefinite number of PTO-engagement requirements to/from the PTO-monitoring/control logic, the operation of one such embodiment of the present invention is illustrated in FIGS. 4a–4c and discussed in detail forthwith. FIGS. 4a–4c illustrate operation of one particular embodiment of a PTO-logic-configuration system according to the present invention and various stages of the execution of the prescribed methods thereof for adding/subtracting an indefinite number of PTO-engagement requirements to/from a PTO-engagement-requirement combination of the PTO-monitoring/control logic. In the embodiment shown in FIGS. 4a–4c the PTO-logic-configuration system of the present invention and the PTO-logic-configuration software thereof is configured in such a manner to effect communication of portions of the operating instructions, including inherent communication of prescribed methods for navigating the stages of operation of the PTO-logic-configuration system and inherent communication of prescribed methods of communicating PTO-engagement requirements, to the user through display of data on a display screen. FIG. 4a illustrates a stage of operation of this embodiment of the invention at which the user is presented with the option to command the PTO-logic-configuration system to enter a stage of operation in which the PTO-logic-configuration system is readied for the addition of PTO-engagement requirements to a PTO-engagement requirement combination and also with the option to command the PTO-logic-configuration system to enter a stage of operation at which the PTO-logic-configuration system is readied for the subtraction of PTO-engagement requirements from the PTO-engagement requirement combination. At the stage of operation shown in FIG. 4a, commanding the PTO-logic-configuration system to proceed to the stage of operation at which the PTO-logic-configuration system is readied for the addition of PTO-engagement requirements to the PTO-engagement-requirement combination is effected by selecting the "Add PTO-Engagement-Requirements" option. FIG. 4b illustrates the stage of operation of this particular embodiment of the PTO-logic-configuration system of the present invention that results from the user selecting the "Add PTO-Engagement-Requirements" option and at which the PTO-logic-configuration system is readied for the addition of PTO-engagement requirements to the PTO-engagement-requirement combination. At this stage of operation of the embodiment of the PTO-logic-configuration system of the present invention shown in FIG. 4b, addition of a PTO-engagement requirement to the PTO-engagement-requirement combination is effected by the entry of one of a predetermined list of codes each of which corresponds to a particular key PTO-related parameter value that the user may select to be a PTO-engagement requirement of the PTO-engagement-requirement combination. At the stage of operation shown in FIG. 4b, once the user enters one of the codes associated with a key PTO-related parameter value the PTO-monitoring/control computer 11 and/or any off-board computer 46 through which the user is communicating therewith will utilize the PTO-logic-configuration software in concert with any system software to add that key PTO-related parameter value to the PTO-engagement-requirement combination of the PTO-monitoring/control logic. At the stage of operation shown in FIG. 4a, commanding the PTO-logic-configuration system to proceed to the stage of operation at which the PTO-logic-configuration system is readied for the subtraction of PTO-engagement requirements from the PTO-engagement-requirement combination is effected by selecting the "Subtract PTO-Engagement-Requirements" option. FIG. 4c illustrates the stage of operation of this particular embodiment of the PTO-logic-configuration system of the present invention that results from the selection of the "Subtract PTO-Engagement-Requirements" and at which the PTO-logic-configuration system is readied for the subtraction of PTO-engagement requirements from the PTO-engagement-requirement combination. At this stage of operation of the embodiment of the PTO-logic-configuration system of the present invention shown in FIGS. 4a–4c, subtraction of a PTO-engagement requirement from the PTO-engagement requirement combination is effected by selecting one of the PTO-engagement requirements of the PTO-engagement-requirement combination displayed on-screen and actuating the "ENTER" key of the off-board computer 46. At the stage of operation shown in FIG. 4c, once the user performs these actions, the PTO-monitoring/control computer 11 and/or an off-board computer 46 through which the user is communicating therewith will utilize the PTO-logic-configuration software in concert with any system software to subtract the PTO-engagement requirement combination that the user selected from the PTO-engagement requirement combination of the PTO-monitoring/control logic. Of course, it is anticipated that a person of ordinary skill in the art will be enabled by this disclosure and the associated drawings to engineer innumerable different arrangements of well-known information-system building-blocks in order to form, in addition to those embodiments explicitly described and illustrated by this disclosure and the associated drawings, innumerable different embodiments of PTO-logic-configuration systems according to the present invention that have engagement-logic-configuration tools for the addition/subtraction of an indefinite number of PTO-engagement requirements to/from a PTO-engagement-requirement combination.

Figure 5A:
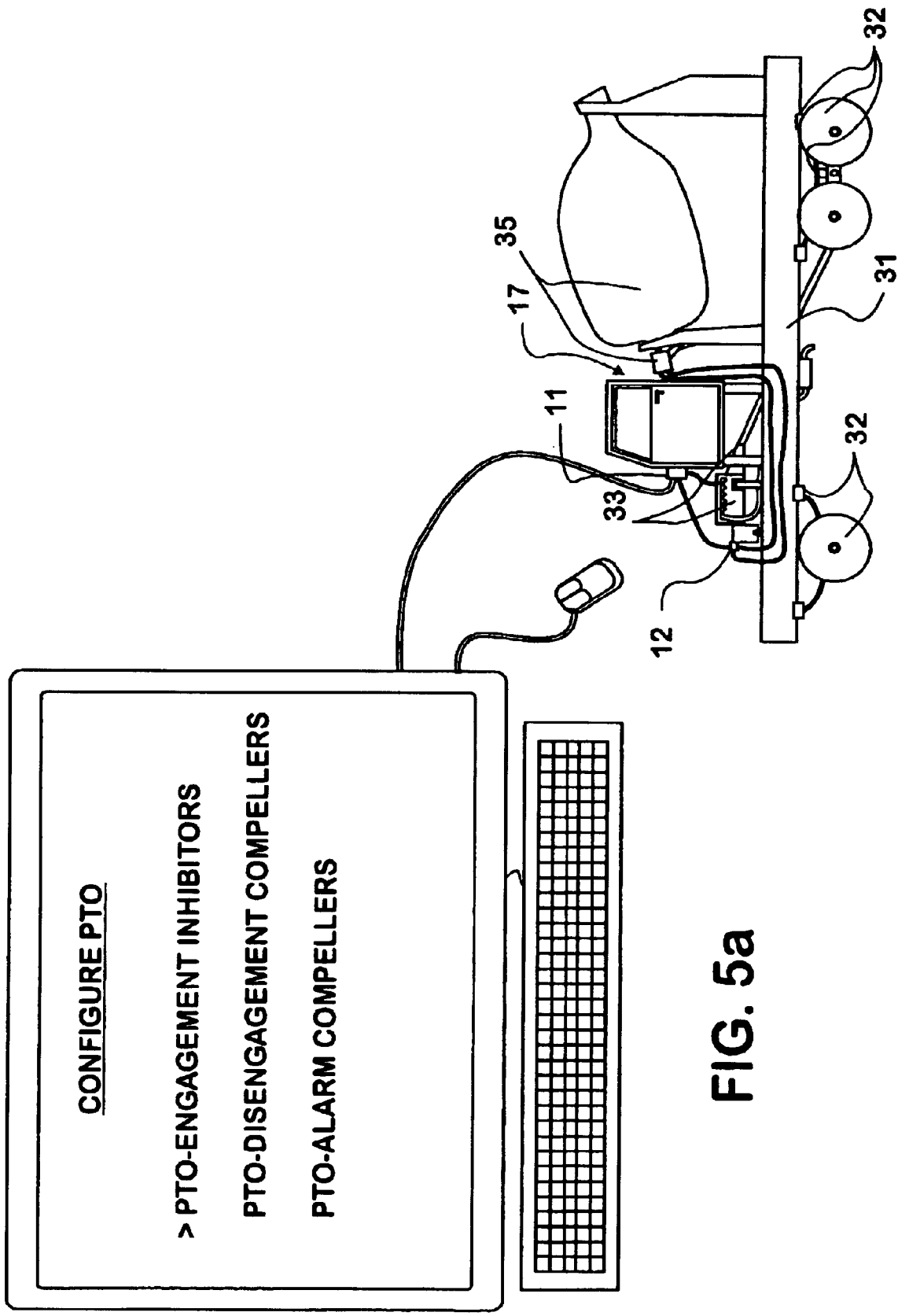
FIG. 5a is an illustration of a stage of operation of a third embodiment of a PTO-logic-configuration system according to the present invention at which the user is presented with the option to navigate to different stages of operation at which particular elements of the PTO-monitoring/control logic may be configured.
Figure 5B:
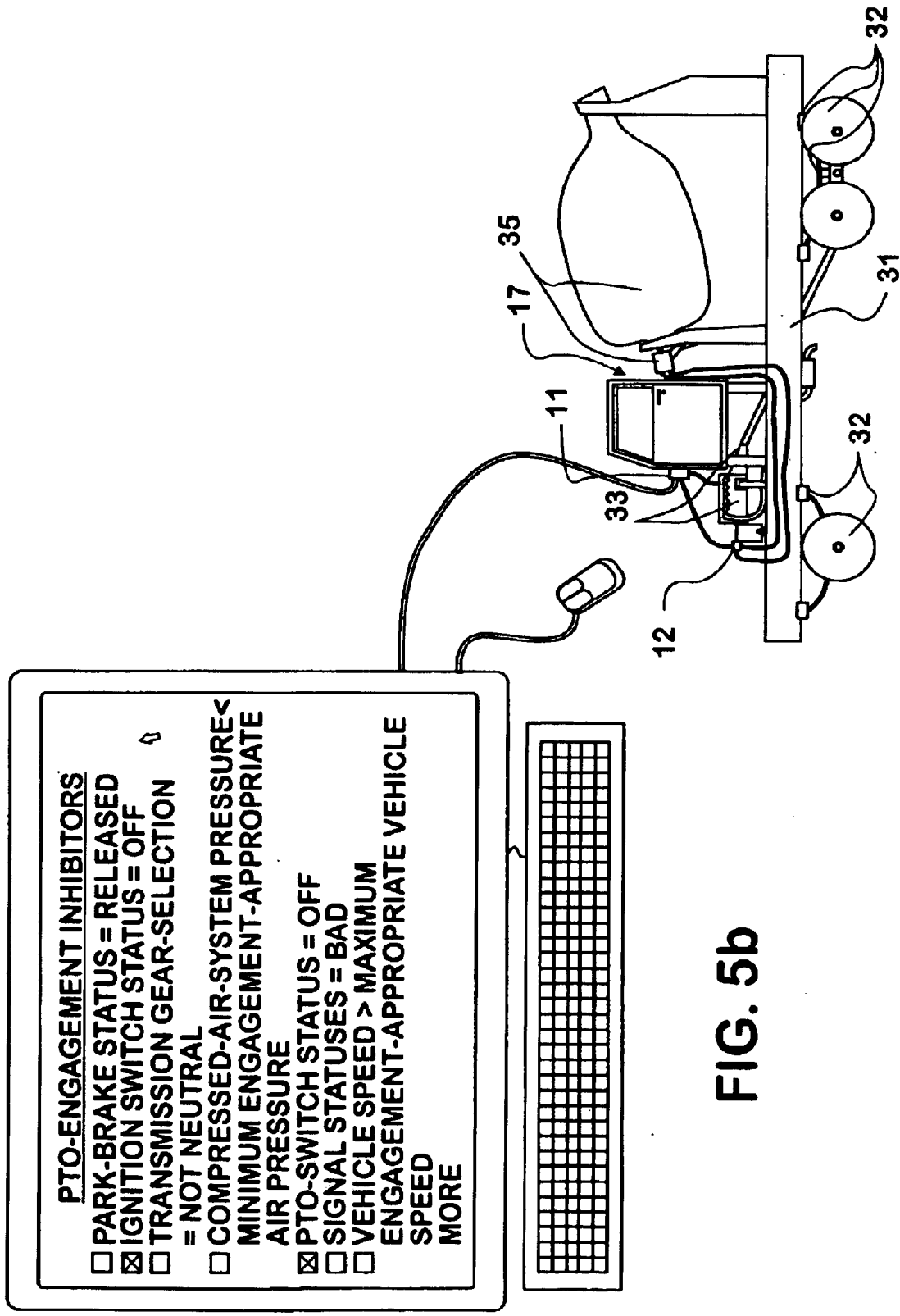
FIG. 5b is an illustration of a stage of operation of the PTO-logic-configuration system, the operation of which is illustrated in FIG. 5a, at which the user is enabled to add/subtract PTO-engagement inhibitors to/from the PTO-monitoring/control logic.

As was mentioned above, in some embodiments, a PTO-logic-configuration system according to the present invention may include engagement-logic-configuration tools for enabling the user to add/subtract PTO-engagement inhibitors to/from PTO-monitoring/control logic according to which the PTO-monitoring/control computer 11 will operate. A PTO-engagement inhibitor is a condition that must not exist before the PTO-monitoring/control computer 11 will enable or effect engagement of the PTO unit 12. A PTO-engagement inhibitor is typically a particular value or range of values of a PTO-related parameter of the vehicle 17, such as a key PTO-related parameter value. The engagement-logic-configuration tools that a PTO-logic-configuration system of the present invention may have for the addition/subtraction of PTO-engagement inhibitors to/from the PTO-monitoring/control logic would include software elements of the PTO-logic-configuration software that are configured for adding/subtracting PTO-engagement inhibitors to/from the PTO-monitoring/control logic. The engagement-logic-configuration tools of such a PTO-logic-configuration system of the present invention also include prescribed methods of utilizing the PTO-logic-configuration software to add/subtract PTO-engagement inhibitors to/from the PTO-monitoring/control logic. The operating instructions of such a PTO-logic-configuration system according to the present invention would further comprise an explicit or inherent explanation of the PTO-logic-configuration system's prescribed methods of utilizing the PTO-logic-configuration software to add/subtract PTO-engagement inhibitors to/from the PTO-monitoring/control logic. The engagement-logic-configuration tools that a PTO-logic-configuration system according to the present invention may have for enabling the user to add/subtract PTO-engagement inhibitors to/from the PTO-monitoring/control software may take on many different forms constructed from well-known types of information-system building-blocks. In order to provide an understanding of the general principals of how a PTO-logic-configuration system according to the present invention may be constructed with engagement-logci-configuration tools for enabling the user to add/subtract PTO-engagement inhibitors to/from the PTO-monitoring/control logic, the operation of one such embodiment of the present invention is illustrated in FIGS. 5a and 5b and discussed in detail forthwith. FIG. 5a illustrates a stage of operation of this embodiment of the invention at which the PTO-logic-configuration system allows the user to select the "PTO-engagement inhibitors" option and to, thereby, command the PTO-logic-configuration system to proceed to a stage of operation of the PTO-logic-configuration system at which the PTO-logic-configuration system is readied for the addition/subtraction of PTO-engagement inhibitors to/from the PTO-monitoring/control logic. FIG. 5b illustrates the stage of operation to which the PTO-logic-configuration system proceeds if, at the stage of operation illustrated in FIG. 5a, the user selects the "PTO-engagement inhibitors" option. At the stage of operation illustrated in FIG. 5b the user is presented with a list of possible PTO-engagement inhibitors. Adjacent a listing for each potential PTO-engagement inhibitor is a check box that is blank if the potential PTO-engagement inhibitor has been or will be subtracted from the PTO-monitoring/control logic and that is occupied by a check mark if the potential PTO-engagement inhibitor has been or will be added to the PTO-monitoring/control logic. In this embodiment of the present invention, if the user wanted to subtract a PTO-engagement inhibitor from the PTO-monitoring/control logic, they would manipulate the off-board computer's 46 mouse to maneuver the cursor over the corresponding check-mark-occupied check box and actuate the mouse-button to toggle the check box to an unchecked state. When a user so-toggles the state of one of the check boxes to be unchecked, the PTO-logic-configuration software in concert with any system software may immediately cause the subtraction of the corresponding PTO-engagement inhibitor from the PTO-monitoring/control logic. Alternatively, the user may be required to perform additional actions, such as the actuation of an "enter key" before the PTO-logic-configuration software in concert with any system software will cause the subtraction of the PTO-engagement-inhibitor from the PTO-monitoring/control logic. If, at the stage of operation illustrated in FIG. 5b, the user desires to add a PTO-engagement inhibitor to the PTO-monitoring/control logic, the user would manipulate the off-board computer's 46 mouse to navigate the cursor over a corresponding unoccupied check box and would then actuate the mouse's button to toggle the state of the check box to occupied. When a user so-toggles the state of one of the check boxes to be occupied, the PTO-logic-configuration software in concert with any system software may immediately cause the addition of the corresponding PTO-engagement inhibitor to the PTO-monitoring/control logic. Alternatively, the user may be required to perform additional actions, such as the actuation of an "enter key" before the PTO-logic-configuration software in concert with any system software will cause the addition of the PTO-engagement-inhibitor to the PTO-monitoring/control logic.

As was mentioned above, in some cases PTO-monitoring/control logic includes automatic PTO-disengagement logic that causes the PTO-monitoring/control computer 11 to automatically effect disengagement of the PTO unit 12 at the occurrence of circumstances that are potentially hazardous to components of the vehicle 17 and/or the operator. In such cases the automatic PTO-disengagement logic includes a list of one or more PTO-disengagement compellers and/or a list of one or more PTO-engagement-sustenance requirements. Each PTO-disengagement compeller is a parameter value or event at the detection of which the PTO-monitoring/control logic causes the PTO-monitoring/control computer 11 to automatically effect disengagement of the PTO unit 12. For instance, in some cases the dropping of a vehicle's compressed-air-system pressure below a predetermined minimum value will be a PTO-disengagement compeller that is included in the automatic PTO-disengagement logic of the PTO-monitoring/control logic. In such a case, when the PTO unit 12 has been engaged and is transmitting power from the vehicle's powertrain 33 to a utility system 35 and the compressed-air-system pressure drops below the predetermined minimum value, the automatic PTO-disengagement logic would cause the PTO-monitoring/control computer 11 to effect disengagement of the PTO unit 12. In some embodiments, a PTO-logic-configuration system according to the present invention comprises disengagement-logic-configuration tools for enabling a user to configure or reconfigure automatic PTO-disengagement logic of the PTO-monitoring/control logic by adding/subtracting PTO-disengagement compellers to/from the PTO-monitoring/control logic. The disengagement-logic-configuration tools that a PTO-logic-configuration system of the present invention may have for the addition/subtraction of PTO-disengagement compellers to/from the PTO-monitoring/control logic would include software elements of the PTO-logic-configuration software that are configured for adding/subtracting PTO-disengagement compellers to/from the PTO-monitoring/control logic. The disengagement-logic-configuration tools of such a PTO-logic-configuration system of the present invention also include prescribed methods of utilizing the PTO-logic-configuration software to add/subtract PTO-disengagement compellers to/from the PTO-monitoring/control logic. The operating instructions of such a PTO-logic-configuration system according to the present invention would further comprise explicit or inherent explanation of the PTO-logic-configuration system's prescribed methods of utilizing the PTO-logic-configuration software to add/subtract PTO-disengagement compellers to/from the PTO-monitoring/control logic. The disengagement-logic-configuration tools of a PTO-logic-configuration system according to the present invention for enabling the user to add/subtract PTO-disengagement compellers to/from the PTO-monitoring/control logic may have any of innumerable different forms constructed of well-known information-system building-blocks. In the interest of demonstrating the general principles of how a PTO-logic-configuration system according to the present invention may be constructed and operational to enable a user to add/subtract PTO-disengagement compellers to/from the PTO-monitoring/control logic the operation of one PTO-logic-configuration system which is so constructed and operational is illustrated in FIG. 6 and discussed forthwith. At the stage of operation illustrated in FIG. 6 the PTO-logic-configuration software in concert with any system software is causing the display on a display screen of a list of key PTO-related parameter values and PTO-related events that the user may choose to add/subtract to/from the PTO-monitoring/control logic as PTO-engagement requirements, PTO-disengagement compellers, PTO-alarm compellers (which will be discussed in detail below), and/or PTO-reengagement compellers (which will be discussed in detail below). At the stage of operation shown in FIG. 6, there is displayed beside each key PTO-related parameter value a row of check boxes that indicates which elements of the PTO-monitoring/control logic that key PTO-related-parameter value has been or will be added to. For instance, in the same row as each key PTO-related-parameter value there is shown a check box under the heading "Auto Disengage". Each of these "Auto Disengage" check boxes is indicative of whether or not the occurrence of the corresponding key PTO-related parameter value is a PTO-disengagement compeller that has been or will be included in automatic PTO-disengagement logic of the PTO-monitoring/control logic. If a given "Auto Disengage" check box has a checked state (is occupied by a check mark), it is indicative that the existence of the corresponding key PTO-related-parameter value or the occurrence of the corresponding PTO-related event is a PTO-disengagement compeller that has been or will be added to automatic PTO-disengagement logic of the PTO-monitoring/control logic. If a user of the PTO-logic-configuration system, the operation of which is illustrated in FIG. 6, desires to add the existence of a particular one of the displayed key PTO-related-parameter values to automatic PTO-disengagement logic as a PTO-disengagement compeller, the user would manipulate an operator interface to toggle that key PTO-related-parameter value's "Auto Disengage" check box to a checked state. For instance, one of the key PTO-related parameter values listed is "Vehicle Speed>Maximum Engagement-Appropriate Vehicle Speed". If the user wishes the occurrence of "Vehicle Speed>Maximum Engagement-Appropriate Vehicle Speed" to be a PTO-disengagement compeller the user would toggle the "Auto Disengagement" check box corresponding to "Vehicle Speed>Maximum Engagement-Appropriate Vehicle Speed" to a checked state.

Thus, if, as is the case in FIG. 6, the "Auto Disengagement" check box for "Vehicle Speed>Maximum Engagement-Appropriate Vehicle Speed" is toggled to a checked state, the occurrence of the vehicle speed exceeding the maximum engagement-appropriate vehicle speed will be a PTO-disengagement compeller that the PTO-logic-configuration system will add to the PTO-monitoring/control logic. Once the PTO-logic-configuration system has added this PTO-disengagement compeller to the PTO-monitoring/control logic, any time the PTO unit 12 has been engaged and is transmitting power from the vehicle's powertrain 33 to a utility system 35 and the vehicle speed exceeds whatever vehicle speed is equal to the maximum engagement-appropriate vehicle speed the automatic PTO-disengagement logic will cause the PTO-monitoring/control computer 11 to effect disengagement of the PTO unit 12. If the user wishes to subtract an existing PTO-disengagement compeller from the PTO-monitoring/control logic, the user would toggle the corresponding "Auto Disengagement" check box to an unchecked state. Of course, in addition to toggling a check box between a checked and unchecked state there may be other steps that a user has to undertake such as actuating an enter key before the corresponding key PTO-related parameter value will be added/subtracted to/from the PTO-monitoring/control logic as a PTO-disengagement compeller.

As was mentioned above, automatic PTO-disengagement logic of PTO-monitoring/control logic may include one or more PTO-engagement-sustenance requirements. Each PTO-engagement-sustenance requirement is a condition that must exist in order for sustained engagement of the PTO unit 12 to occur without risking undesirable consequences. Accordingly, upon the disappearance of a PTO-engagement-sustenance requirement of automatic PTO-disengagement logic of the PTO-monitoring/control logic, the PTO-monitoring/control computer 11 will automatically effect disengagement of the PTO unit 12. For instance in a particular application it may be necessary that the park brake of the vehicle 17 remain set for the PTO unit to remain engaged without risking undesirable consequences. In such a case, automatic PTO-disengagement logic of PTO-monitoring/control logic may include the PTO-engagement-sustenance requirement "park-brake status=set". In such a case, if the PTO unit 12 has been engaged and the vehicle's park brake is released the PTO-engagement-sustenance requirement "park-brake status=set" will have disappeared and the PTO-monitoring/control computer 11 will be caused by the automatic-PTO-disengagement logic to effect disengagement of the PTO-unit 12. In some embodiments, a PTO-logic-configuration system according to the present invention comprises disengagement-logic-configurations for enabling a user to configure or reconfigure automatic PTO-disengagement logic of PTO-monitoring/control logic through the addition/subtraction of PTO-engagement-sustenance requirements to/from the automatic PTO-disengagement logic. In such embodiments, the disengagement-logic-configuration tools of a PTO-logic-configuration system for enabling the addition/subtraction of PTO-engagement-sustenance requirements to/from the automatic PTO-disengagement logic would include software elements of the PTO-logic-configuration software for enabling the addition/subtraction of PTO-engagement-sustenance requirements to/from automatic PTO-disengagement logic. In such embodiments, the disengagement-logic-configuration tools of a PTO-logic-configuration system for enabling the addition/subtraction of PTO-engagement-sustenance requirements to/from the automatic PTO-disengagement logic would further include prescribed methods of utilizing the PTO-logic-configuration software to add/subtract PTO-engagement-sustenance requirements to/from automatic PTO-disengagement logic. In such embodiments the operating instructions of the PTO-logic-configuration system would include an explicit or inherent explanation of the prescribed methods for adding/subtracting PTO-engagement-sustenance requirements to/from automatic PTO-disengagement logic. The disengagement-logic-configuration tools of a PTO-logic-configuration system for enabling a user to add/subtract PTO-engagement-sustenance requirements to/from automatic PTO-disengagement logic may have innumerable different forms constructed utilizing well-known information-system construction methods. In the interest of demonstrating the general principles of how a PTO-logic-configuration system according to the present invention may be constructed and operational to enable a user to add/subtract PTO-engagement-sustenance requirements to/from the PTO-monitoring/control logic the operation of one such PTO-logic-configuration system is illustrated in FIGS. 7a–7d and discussed forthwith. At the stage of operation illustrated in FIG. 7a the user is presented with the option to command the PTO-logic-configuration system to proceed to a stage of operation at which the automatic PTO-disengagement logic may be configured by selecting the "Configure Disengagement Logic" option. FIG. 7b illustrates a stage of operation of the system that results from the user having selected the "Configure Disengagement Logic" option at the stage of operation illustrated in FIG. 7a. At the stage of operation illustrated in FIG. 7b, the user is presented with the option to, by selecting the "Add PTO-Engagement-Sustenance Requirements" option, command the PTO-logic-configuration system to proceed to a stage of operation at which the user may add PTO-engagement-sustenance requirements to the automatic PTO-disengagement logic. FIG. 7c illustrates the stage of operation that results if the user selects the "Add PTO-Engagement-Sustenance Requirements" at the stage of operation illustrated in FIG. 7b. At the stage of operation illustrated in FIG. 7c, the user may add PTO-engagement-sustenance requirements by entering a code that is correlated with one of a list of potential PTO-engagement-sustenance requirements displayed at the bottom of the display screen. At the stage of operation illustrated in FIG. 7b the user is also presented with the option to, by selecting the "Subtract PTO-engagement-sustenance requirements" option, command the PTO-logic-configuration system to proceed to a stage of operation at which the user can subtract PTO-engagement-sustenance requirements from the automatic PTO-disengagement logic. FIG. 7d illustrates a stage of operation of the PTO-logic-configuration system to which the PTO-logic-configuration system proceeds if the user selects the "Subtract PTO-engagement-sustenance requirements" at the stage of operation illustrated in FIG. 7b. At the stage of operation illustrated in FIG. 7d, the user may subtract a PTO-engagement-sustenance requirement by scrolling to that PTO-engagement-sustenance requirement and executing an authorizing action such as actuating an "enter" key.

As was mentioned above, in some cases PTO-monitoring/control logic includes automatic PTO-disengagement logic that causes the PTO-monitoring/control computer 11 to automatically effect disengagement of the PTO unit 12 at the occurrence of circumstances that are potentially hazardous to components of the vehicle 17 and/or the operator. As was also mentioned above, in some such cases the PTO-monitoring/control logic also includes automatic PTO-reengagement logic that causes the PTO-monitoring/control computer 11 to, after having automatically effected disengagement of the PTO unit 12, automatically reengage the PTO unit 12 at the occurrence of a PTO-reengagement compeller. Generally speaking, a PTO-reengagement compeller is the reversal of a PTO-disengagement compeller. For instance, in some cases the dropping of a vehicle's compressed-air-system pressure below a predetermined minimum value will be a PTO-disengagement compeller and the subsequent return of the vehicle's compressed-air-system pressure to levels above that predetermined minimum value will be a PTO-reengagement compeller. In such a case, when the PTO unit 12 has been engaged and is transmitting power from the vehicle's powertrain 33 to a utility system 35 and the compressed-air-system pressure drops below the predetermined minimum value, the PTO-monitoring/control computer 11 would automatically effect disengagement of the PTO unit 12. In such a case, assuming no other changes in circumstances, if the vehicle's compressed-air-system pressure subsequently returns to levels above the predetermined minimum value the PTO-monitoring/control computer 11 would automatically effect reengagement of the PTO unit 12. In some embodiments, a PTO-logic-configuration system according to the present invention comprises reengagement-logic-configuration tools for enabling a user to configure or reconfigure automatic PTO-reengagement logic of the PTO-monitoring/control logic by adding/subtracting PTO-reengagement compellers to/from the PTO-monitoring/control logic. The reengagement-logic-configuration tools that an embodiment of the present invention may have for the addition/subtraction of PTO-reengagement compellers to/from the PTO-monitoring/control logic would include software elements of the PTO-logic-configuration software that are configured for adding/subtracting PTO-reengagement compellers to/from the PTO-monitoring/control logic. The reengagement-logic-configuration tools of such an embodiment of the present invention also include prescribed methods of utilizing the PTO-logic-configuration software to add/subtract PTO-reengagement compellers to/from the PTO-monitoring/control logic. The operating instructions of such a PTO-logic-configuration system according to the present invention would further comprise an explicit or inherent explanation of the PTO-logic-configuration system's prescribed methods of utilizing the PTO-logic-configuration software to add/subtract PTO-reengagement compellers to/from the PTO-monitoring/control logic. The reengagement-logic-configuration tools of a PTO-logic-configuration system according to the present invention for enabling the user to add/subtract PTO-reengagement compellers to/from the PTO-monitoring/control logic may have any of innumerable different forms constructed of well-known information-system building-blocks. In the interest of demonstrating the general principles of how a PTO-logic-configuration system according to the present invention may be constructed and operational to enable a user to add/subtract PTO-reengagement compellers to/from the PTO-monitoring/control logic the operation of one PTO-logic-configuration system which is so constructed and operational is illustrated in FIG. 6 and discussed forthwith. At the stage of operation illustrated in FIG. 6 the PTO-logic-configuration software in concert with any system software is causing the display on a display screen of a list of key PTO-related parameter values and PTO-related events that the user may choose to add/subtract from the PTO-monitoring/control logic as PTO-engagement requirements, PTO-alarm compellers (which will be discussed in detail below), PTO-disengagement compellers, and/or PTO-reengagement compellers. At the stage of operation shown in FIG. 6 there is displayed, in a row beside each key PTO-related parameter value, a check box that indicates whether or not the key PTO-related parameter value has been or will be added as a PTO-engagement requirement, a check box that indicates whether or not the key PTO-related parameter value has been or will be added as a PTO-disengagement compeller, a check box that indicates whether or not the key PTO-related parameter value has been or will be added as a PTO-alarm compeller and a check box that indicates whether or not the disappearance of the key PTO-related parameter value has been or will be added to the PTO-monitoring/control logic as a PTO-reengagement compeller. In the embodiment illustrated in FIG. 6, if a particular key PTO-related-parameter-value's "Auto Reengagement" check box has a checked state, it is indicative that the event of the disappearance of that key PTO-related-parameter value has been or will be added to the PTO-monitoring/control computer 11 as a PTO-reengagement compeller. It is worth mentioning that this significance of the "Auto Reengagement" check box having a checked state in this particular embodiment would not necessarily be intuitively obvious to a person viewing the display illustrated in FIG. 6. Accordingly, the embodiment of a PTO-logic-configuration system, the operation of which is illustrated in FIG. 6, would include operating instructions encoded in one or more support items that would explain in detail to the user the significance of a particular key PTO-related-parameter value's "Auto Reengagement" check box having a checked state. In order to add the event of the disappearance of a particular one of the displayed key PTO-related parameter values to the PTO-monitoring/control logic as a PTO-reengagement compeller, a user of the PTO-logic-configuration system would manipulate the mouse of the off-board computer 46 to toggle that key PTO-related parameter value's "Auto Reengagement" check box to a checked state. For instance, one of the key PTO-related parameter values listed is "Vehicle Speed>Maximum Engagement-Appropriate Vehicle Speed". If the user wishes the disappearance of "Vehicle Speed>Maximum Engagement-Appropriate Vehicle Speed" to be a PTO-reengagement compeller the user would toggle the "Auto Reengagement" check box of the "Vehicle Speed>Maximum Engagement-Appropriate Vehicle Speed" to a checked state. Thus, if, as is the case in FIG. 6, the "Auto Reengagement" check box for the "Vehicle Speed>Maximum Engagement-Appropriate Vehicle Speed" is toggled to a checked state, a return of the vehicle speed to less than whatever speed the maximum engagement-appropriate vehicle speed is after an occurrence of the PTO-monitoring/control computer 11 automatically effecting disengagement of the PTO unit 12 because of the vehicle speed exceeding the maximum engagement-appropriate vehicle speed will be a PTO-reengagement compeller that the PTO-logic-configuration system will add to the PTO-monitoring/control logic. Once the PTO-logic-configuration system has added this PTO-reengagement compeller to the PTO-monitoring/control logic, any time the PTO unit 12 has been engaged and is transmitting power from the vehicle's powertrain 33 to a utility system 35 and the vehicle speed exceeds the maximum engagement-appropriate vehicle speed and subsequently returns to less than the maximum engagement-appropriate vehicle speed without the intervening occurrence of any other PTO-disengagement compellers, the PTO-monitoring/control computer 11 will automatically effect disengagement of the PTO unit 12 when the vehicle speed exceeds the maximum engagement-appropriate vehicle speed and will automatically effect reengagement of the PTO unit 12 when the vehicle speed subsequently returns to less than the maximum engagement-appropriate vehicle speed. If the user wishes to subtract an existing PTO-reengagement compeller from the PTO-monitoring/control logic, the user would toggle the corresponding "Auto Reengagement" check box to an unchecked state. Of course, in order for the disappearance of a key PTO-related parameter value to be a PTO-reengagement compeller, the appearance of the key PTO-related parameter value must first be a PTO-disengagement compeller. Accordingly, in the PTO-logic-configuration system the operation of which is shown in FIG. 6, toggling of a key PTO-related parameter value's "Auto Reengagement" check box to a checked state in order to add the corresponding PTO-reengagement compeller to the PTO-monitoring/control logic is only enabled once that key PTO-related parameter value's "Auto Disengage" check box is toggled to a checked state in order to add the corresponding PTO-disengagement compeller to the PTO-monitoring/control logic. Additionally, as is only logical, in the PTO-logic-configuration system shown in FIG. 6, if the "Auto Disengage" check box of a particular key PTO-related-parameter value is toggled to an unchecked state in order to subtract the corresponding PTO-disengagement compeller from the PTO-monitoring/control logic, the PTO-logic-configuration system automatically toggles that key PTO-related-parameter value's "Auto Reengagement" check box to an unchecked state and subtracts the corresponding PTO-reengagement compeller from the PTO-monitoring/control logic. Of course it is to be understood that there may be additional steps, such as actuating an "enter" key, that a user of the PTO-logic-configuration system has to execute before the desired change reflected by the toggling of the state of a key PTO-related parameter value's "Auto Reengagement" check box will actually be effected.

As was mentioned above, in some cases PTO-monitoring/control logic includes PTO-alarm logic that causes the PTO-monitoring/control computer 11 to generate a PTO-alarm signal at the occurrence of circumstances that are potentially hazardous to components of the vehicle 17 and/or the operator. In such cases the PTO-alarm logic includes a list of one or more PTO-alarm compellers and/or a list of one or more PTO-alarm-inhibition requirements. A PTO-alarm compeller is an event or parameter value at the occurrence of which the PTO-monitoring/control logic causes the PTO-monitoring/control computer 11 to generate a PTO alarm signal. For instance, in some cases the occurrence of the vehicle's transmission gear selection changing to one other than neutral will be a PTO-alarm compeller that is included in the PTO-alarm logic portion of the PTO-monitoring/control logic. In such a case, when the PTO unit 12 has been engaged and is transmitting power from the vehicle's powertrain 33 to a utility system 35 and the transmission gear selection of the vehicle is changed from neutral to some other gear, the PTO-monitoring/control computer 11 will generate a PTO-alarm signal. In some embodiments, a PTO-logic-configuration system according to the present invention comprises alarm-logic-configuration tools for enabling a user to configure or reconfigure PTO-alarm logic of the PTO-monitoring/control logic by adding/subtracting PTO-alarm compellers to/from the PTO-monitoring/control logic. The alarm-logic-configuration tools that a PTO-logic-configuration system of the present invention may have for the addition/subtraction of PTO-alarm compellers to/from the PTO-monitoring/control logic would include software elements of the PTO-logic-configuration software that are configured for adding/subtracting PTO-alarm compellers to/from the PTO-monitoring/control logic. The alarm-logic-configuration tools of such a PTO-logic-configuration system of the present invention also include prescribed methods of utilizing the PTO-logic-configuration software to add/subtract PTO-alarm compellers to/from the PTO-monitoring/control logic. The operating instructions of such a PTO-logic-configuration system according to the present invention would further comprise an explicit or inherent explanation of the PTO-logic-configuration system's prescribed methods of utilizing the PTO-logic-configuration software to add/subtract PTO-alarm compellers to/from the PTO-monitoring/control logic. The alarm-logic-configuration tools of a PTO-logic-configuration system according to the present invention for enabling the user to add/subtract PTO-alarm compellers to the PTO-monitoring/control logic may have any of innumerable different forms constructed of well-known information-system building-blocks. In the interest of demonstrating the general principles of how a PTO-logic-configuration system according to the present invention may be constructed and operational to enable a user to add/subtract PTO-alarm compellers to/from the PTO-monitoring/control logic, the operation of one PTO-logic-configuration system that is so-constructed and operational is illustrated in FIG. 6 and discussed forthwith. At the stage of operation illustrated in FIG. 6 the PTO-logic-configuration software in concert with any system software is causing the display on a display screen of a list of key PTO-related parameter values that the user may choose to add/subtract to/from the PTO-monitoring/control logic as PTO-engagement requirements, PTO-disengagement compellers, PTO-alarm compellers, and/or PTO-reengagement compellers. At the stage of operation shown in FIG. 6 there is displayed beside each key PTO-related parameter value a row of check boxes that indicates which elements of the PTO-monitoring/control logic that key PTO-related-parameter value has been or will be added to. For instance, in the same row as each key PTO-related-parameter value there is shown a check box under the heading "Alarm". Each of these "Alarm" check boxes is indicative of whether or not the occurrence of the key PTO-related parameter value of that row is a PTO-alarm compeller that has been or will be added to PTO-alarm logic of the PTO-monitoring/control logic. If a given "Alarm" check box has a checked state, it is indicative that the existence of the corresponding key PTO-related-parameter value is a PTO-alarm compeller that has been or will be added to PTO alarm logic of the PTO-monitoring/control logic. If a user of the PTO-logic-configuration system, the operation of which is illustrated in FIG. 6, desires to add the existence of a particular one of the key PTO-related-parameter values to PTO-alarm logic as a PTO-alarm compeller, the user would manipulate an man/machine interface to toggle that key PTO-related-parameter value's "Alarm" check box to a checked state. For instance, one of the key PTO-related parameter values listed is "Transmission Gear Selection=Not Neutral". If the user wishes the occurrence of "Transmission Gear Selection=Not Neutral" to be a PTO-alarm compeller the user would toggle the "Alarm" check box corresponding to "Transmission Gear Selection=Not Neutral" to a checked state. If, as is the case in FIG. 6, the "Alarm" check box for the "Transmission Gear Selection=Not Neutral" is toggled to a checked state, the occurrence of the vehicle's transmission gear selection becoming one other than neutral during a period when the PTO unit 12 has been engaged and is transmitting power from the vehicle's powertrain 33 to a utility system 35 will be a PTO-alarm compeller that the PTO-logic-configuration system will add to the PTO-monitoring/control logic. Once the PTO-logic-configuration system has added this PTO-alarm compeller to the PTO-monitoring/control logic, any time the PTO unit 12 has been engaged and is transmitting power from the vehicle's powertrain 33 to a utility system 35 and the vehicle's transmission gear selection becomes one other than neutral, the PTO-monitoring/control logic will cause the PTO-monitoring/control computer 11 to generate a PTO-alarm signal. If the user wishes to utilize the embodiment of a PTO-logic-configuration system, the operation of which is illustrated in FIG. 6, to subtract an existing PTO-alarm compeller from the PTO-monitoring/control logic, the user would toggle the corresponding "Alarm" check box to an unchecked state. Of course in addition to toggling check boxes between checked and unchecked states there may be other steps that a user has to undertake, such as actuating an enter key, before the logic pattern conveyed by the check boxes will actually be implemented into the PTO-monitoring/control logic.

As was mentioned above, automatic PTO-disengagement logic of PTO-monitoring/control logic may include one or more PTO-alarm-inhibition requirements. Each PTO-alarm-inhibition requirement is a condition that should exist during sustained engagement of the PTO unit 12 in order to avoid the risk of undesirable consequences of continuance of engagement of the PTO unit 12. Accordingly, upon the disappearance of a PTO-alarm-inhibition requirement of PTO-alarm logic of the PTO-monitoring/control logic, the PTO-monitoring/control computer 11 will generate a PTO-alarm signal. For instance in a particular application it may be necessary that the park brake of the vehicle 17 remain set for the PTO unit to remain engaged without risking undesirable consequences. In such a case, PTO-alarm logic of PTO-monitoring/control logic may include the PTO-alarm-inhibition requirement "park-brake status=set". In such a case, if the PTO unit 12 has been engaged and the vehicle's park brake is released the PTO-alarm-inhibition requirement "park-brake status=set" will have disappeared and the PTO-monitoring/control computer 11 will be caused by the PTO-alarm logic to generate a PTO-alarm signal. In some embodiments, a PTO-logic-configuration system according to the present invention comprises alarm-logic-configuration tools for enabling a user to configure or reconfigure PTO-alarm logic of PTO-monitoring/control logic through the addition/subtraction of PTO-alarm-inhibition requirements to/from the PTO-alarm logic. In such embodiments, the alarm-logic-configuration tools of a PTO-logic-configuration system for enabling the addition/subtraction of PTO-alarm-inhibition requirements to/from the PTO-alarm logic would include software elements of the PTO-logic-configuration software for enabling the addition/subtraction of PTO-alarm-inhibition requirements to/from PTO-alarm logic. In such embodiments, the alarm-logic-configuration tools of a PTO-logic-configuration system for enabling the addition/subtraction of PTO-alarm-inhibition requirements to/from the PTO-alarm logic would further include prescribed methods of utilizing the PTO-logic-configuration software to add/subtract PTO-alarm-inhibition requirements to/from PTO-alarm logic. In such embodiments the operating instructions of the PTO-logic-configuration system would include an explicit or inherent explanation of the prescribed methods for adding/subtracting PTO-alarm-inhibition requirements to/from PTO-alarm logic. The alarm-logic-configurations of a PTO-logic-configuration system for enabling a user to add/subtract PTO-alarm-inhibition requirements to/from PTO-alarm logic may have innumerable different forms constructed utilizing well-known information-system construction methods. In the interest of demonstrating the general principles of how a PTO-logic-configuration system according to the present invention may be constructed and operational to enable a user to add/subtract PTO-alarm-inhibition requirements to/from the PTO-monitoring/control logic the operation of one such PTO-logic-configuration system is illustrated in FIG. 8 and discussed forthwith. At the stage of operation illustrated in FIG. 8 the PTO-logic-configuration software in concert with any system software is causing the display on a display screen of a list of key PTO-related parameter values and PTO-related events that the user may choose to add/subtract from the PTO-monitoring/control logic as PTO-engagement-sustenance requirements and PTO-alarm-inhibition requirements. At the stage of operation shown in FIG. 8 there is displayed, in a row beside each key PTO-related parameter value, a check box that indicates whether or not the key PTO-related parameter value has been or will be added as a PTO-engagement-sustenance requirement and a check box that indicates whether or not the key PTO-related parameter value has been or will be added as a PTO-alarm-inhibition requirement. In the embodiment illustrated in FIG. 8, if a particular key PTO-related-parameter-value's "Alarm" check box has a checked state, it is indicative that that key PTO-related-parameter value has been or will be added to the PTO-monitoring/control computer 11 as a PTO-alarm-inhibition requirement. It is worth mentioning that this significance of the "Alarm" check box having a checked state in this particular embodiment would not necessarily be intuitively obvious to a person viewing the display illustrated in FIG. 8. Accordingly, the embodiment of a PTO-logic-configuration system, the operation of which is illustrated in FIG. 8, would include operating instructions encoded in one or more support items that would explain in detail to the user the significance of a particular key PTO-related-parameter value's "Alarm" check box having a checked state. In order to add a particular one of the displayed key PTO-related parameter values to the PTO-monitoring/control logic as a PTO-alarm-inhibition event, a user of the PTO-logic-configuration system would manipulate a user, interface to toggle that key PTO-related parameter value's "Alarm" check box to a checked state. For instance, one of the key PTO-related parameter values listed is "Park-Brake Status=Set". If the user wishes "Park-Brake Status=Set" to be a PTO-alarm-inhibition requirement, the user would toggle the "Alarm" check box of the "Park-Brake Status=Set" to a checked state. Thus, if, as is the case in FIG. 8, the "Alarm" check box for the "Park-Brake Status=Set" is toggled to a checked state, "Park-Brake Status=Set" is a PTO-alarm-inhibition requirement that will be added to the PTO-alarm logic. Once the PTO-alarm-inhibition requirement "Park-Brake Status=Set" is added to PTO-alarm logic, if the PTO unit 12 is engaged and the vehicle's park brake is released the PTO-alarm logic will cause the PTO-monitoring/control computer 11 to generate a PTO-alarm signal. If the user wishes to utilize the embodiment of a PTO-logic-configuration system, the operation of which is illustrated in FIG. 8, to subtract a PTO-alarm-inhibition requirement from PTO-alarm logic, they can do so by utilizing the operator interface to toggle, to an unchecked state, the "Alarm" check box for the PTO-related parameter value that they no longer wish to be a PTO-alarm-inhibition requirement. Of course it is to be understood that there may be additional steps, such as actuating an "enter" key, that a user of the PTO-logic-configuration system has to execute before the desired change reflected by the toggling of the state of a key PTO-related parameter value's "Alarm" check box will actually be effected.

In some embodiments of the present invention the PTO-monitoring/control logic-configuration software comprises a plurality of application-specific PTO-monitoring/control algorithm elements. An application-specific PTO-monitoring/control algorithm element is a piece of PTO-monitoring/control logic that is specially tailored for use with a particular application or group of applications of a PTO unit 12 and a vehicle 17. There are a number of elements that characterize a particular application of a PTO unit 12 and vehicle 17. Those elements that characterize a particular application of a PTO unit 12 and vehicle 17 include, but are not limited to the type of PTO unit, the type of engine of the vehicle, the type of transmission of the vehicle, the drive configuration of the vehicle, the type of utility system that the PTO unit powers, and the vocation in which the PTO unit and vehicle will be used. Each application-specific PTO-monitoring/control algorithm element is tailored for use with a particular type of at least one of the elements that characterize applications of a PTO unit and a vehicle. For instance an application-specific PTO-monitoring/control algorithm element might be tailored for use with a particular type of PTO unit, a particular type of engine, a particular type of transmission a particular drive configuration of the vehicle, a particular type of utility system that is powered by the PTO unit, and/or a particular vocation in which the PTO unit and vehicle are employed. The ways in which proper monitoring and control of PTO units 12 and vehicle 17 of which they are a part are affected by each of the various elements and combinations thereof that characterize applications of PTO units and vehicles are somewhat involved, but are well known by those of ordinary skill in the art of constructing vehicles 17 that have PTO units 17 for selectively tapping power from a powertrain 33 of the vehicle 17 to power a utility system 35 of the vehicle. Accordingly, this disclosure will not attempt to discuss the details of every one or even a significant portion of the possible application-specific PTO-monitoring/control algorithm elements that could be included as part of PTO-monitoring/control logic-configuration software of a PTO-monitoring/control logic-configuration system according to the present invention. In the interest of demonstrating some of the general principles of how application-specific PTO-monitoring/control algorithm elements may be properly constructed and utilized the succeeding discussion will, however, delve into the details of some exemplary constructions of application-specific PTO-monitoring/control algorithm elements and parts thereof. The succeeding discussion focuses particularly on how various aspects of an application-specific PTO-monitoring/control algorithm element may be tailored for use with particular types of PTO units. It is anticipated that a person of ordinary skill in the art, having read this disclosure, could readily apply the principles conveyed herein of the construction and utilization of application-specific PTO-monitoring/control algorithm elements to construct and utilize application-specific PTO-monitoring/control algorithm elements that are, in addition to or instead of being tailored for use with a particular type of PTO unit are tailored for particular types of one or more other characterizing elements, such as engine type, transmission type, utility system type, and drive configuration type, and vocational usage, of applications of PTO units and vehicles.

Embodiments of a PTO-monitoring/control logic-configuration system that comprise a plurality of application-specific PTO-monitoring/control algorithm elements also include a prescribed method for integrating each of the application-specific PTO-monitoring/control algorithm elements into the PTO-monitoring/control logic that the PTO-monitoring/control computer 11 will execute. In such embodiments of a PTO-logic-configuration system, the operating instructions of the PTO-logic-configuration system further comprise an explicit or inherent explanation of what application-specific PTO-monitoring/control algorithm elements the PTO-logic-configuration software includes and what application and aspect of PTO-monitoring/control each application-specific PTO-monitoring/control algorithm element is adapted for. The operating instructions for such an embodiment of a PTO-logic-configuration system also includes an explicit or inherent explanation of each prescribed method for effecting the integration of a particular one of the application-specific PTO-monitoring/control algorithm elements into the PTO-monitoring/control logic.

It should be mentioned that an embodiment of a PTO-logic-configuration system that comprises one or more applicationspecific PTO-monitoring/control algorithm elements may have two or more application-specific PTO-monitoring/control algorithm elements that are tailored for use with the same particular type of a same characterizing element of an application of a PTO unit 12 and a vehicle 17. For instance, PTO-monitoring/control logic-configuration software according to the present invention may comprise two distinct PTO-monitoring/control algorithm elements that are both tailored specifically for use with an electric-over-hydraulic clutched-engagement type PTO unit 12. There are a number of reasons that such may be the case. One reason is that two or more application-specific PTO-monitoring/control algorithm elements that are configured for use with the same type of a particular characterizing element of an application of a PTO unit and vehicle may include algorithms of varying scope. In other words one application-specific PTO-monitoring/control algorithm element may comprise logic for performing an extensive portion of the monitoring/control of the PTO unit 12 whereas the other may include logic for performing only a relatively small fraction of the monitoring/control of the PTO unit 12. Additionally, two application-specific PTO-monitoring/control algorithm elements that are tailored for use with the same type of a particular characterizing element of a an application for a PTO unit and a vehicle may be tailored for different particular types of other characterizing elements of applications of a PTO unit and a vehicle. For example, a first application-specific PTO-monitoring/control algorithm element may be tailored for use with an electric-over-hydraulic type PTO unit in a cement mixer vocation and another application-specific PTO-monitoring/control algorithm element may be tailored for use with a an electric-over-hydraulic type PTO unit in a refuse packer application.

The prescribed methods for effecting integration of each application-specific PTO-monitoring/control algorithm element into the PTO-monitoring/control logic and the operating instructions for explaining those prescribed methods for effecting integration of each application-specific PTO-monitoring/control algorithm element into the PTO-monitoring/control logic may take on many different forms. In the interest of demonstrating the general principles of how a PTO-logic-configuration system according to the present invention may be configured to enable the user to effect integration of a particular application-specific PTO-monitoring/control algorithm element into the PTO-monitoring/control logic, one particular embodiment of a PTO-logic-configuration system according to the present invention that includes such a functionality will be described in detail now with reference to FIGS. 9a and 9b, which are illustrative of utilization of said one particular embodiment to effect integration of a particular application-specific PTO-monitoring/control algorithm element into the PTO-monitoring/control logic that the PTO-monitoring/control computer 11 will execute. FIG. 9a is illustrative of a stage of operation of the PTO-logic-configuration system at which the user is presented with the option to command the PTO-logic-configuration system to proceed to a stage of operation at which the user may effect integration of an application-specific PTO-monitoring/control algorithm element into the PTO-monitoring/control logic that the PTO-monitoring/control computer 11 will execute. In the embodiment of a PTO-logic-configuration system, the operation of which is illustrated in FIGS. 9a and 9b, each of the application-specific PTO-monitoring/control algorithm elements is particularly tailored for use with a certain type of PTO unit and commanding the PTO-logic-configuration system to proceed to a stage of operation at which the user may effect integration of an application-specific PTO-monitoring/control algorithm element into the PTO-monitoring/control logic would be accomplished by the user's selection of the "Set PTO Type" option at the stage of operation illustrated in FIG. 9a. If, at the stage of operation illustrated in FIG. 9a, the user selects the "Set PTO Type" option, the PTO-logic-configuration system proceeds to the stage of operation illustrated in FIG. 9b. At the stage of operation illustrated in FIG. 9b, the PTO-logic-configuration system presents the user with a list of PTO unit types each of which corresponds to an application-specific PTO-monitoring/control algorithm element that is tailored for use with that type of PTO unit 12 and that the PTO-logic-configuration software includes. At the stage of operation illustrated in FIG. 9b, the user may effect integration of an application-specific PTO-monitoring/control algorithm element that is tailored for use with a PTO unit type on the list presented to the user by selecting that PTO unit type. For instance, if at the stage of operation illustrated in FIG. 9b the user selects the "Single-Polarity Electric-Engagement-Mechanism" PTO unit type, the PTO-logic-configuration software, working in concert with any system software of the PTO-monitoring/control computer 11 and any off-board computer 46 through which the user may be communicating with the PTO-monitoring/control computer 11, will effect integration into the PTO-monitoring/control logic of the application-specific PTO-monitoring/control algorithm that is tailored for use with a "Single-Polarity Electric-Engagement-Mechanism" type PTO unit 12. Of course it will be understood that there may be, in addition to selecting a listed PTO unit type, other conventional actions such as the confirming action of actuating an "enter" key, that the user must execute before the PTO-logic-configuration system will effect integration of a particular application-specific PTO-monitoring/control algorithm element into the PTO-monitoring/control logic.

There are multiple elements of correct PTO-monitoring/control logic for a PTO unit 12 and a vehicle 17 of which it is a part that are dependent primarily upon what type the PTO unit 12 is. One such element of correct PTO-monitoring/control logic for a PTO unit 12 and the vehicle 17 of which it is a part that is dependent upon the type of PTO unit 12 is a PTO-engagement procedure. For purposes of this disclosure, a PTO-engagement procedure is to be understood to be the series of steps that the PTO-monitoring/control computer 11 must execute, after it has determined that engagement of the PTO unit 12 is appropriate, in order to effect engagement of the PTO unit 12. In some embodiments, the PTO-logic-configuration software of a PTO-logic-configuration system according to the present invention will have one or more application-specific PTO-monitoring/control algorithm elements that include a PTO-unit-type-specific PTO-engagement procedure. If the user of a PTO-logic-configuration system according to the present invention utilizes it to implement an application-specific PTO-monitoring/control algorithm element that includes a PTO-unit-type-specific PTO-engagement procedure into the PTO-monitoring/control logic, the PTO-monitoring/control computer 11 will thereafter execute the steps of the PTO-unit-type-specific PTO-engagement procedure when effecting engagement of the PTO unit 12. Of course it will be understood that some application-specific PTO-monitoring/control algorithm elements will not include PTO-unit-type-specific PTO-engagement procedures because the type of PTO unit 12 for which the application-specific PTO-monitoring/control algorithm element is tailored is not computer-controllable or for a number of other possible reasons that it was not desirable to the constructor to include a PTO-unit-type-specific PTO-engagement procedure.

The steps that make up an appropriate PTO-unit-type-specific PTO-engagement procedure for a given type of PTO unit 12 may vary considerably in complexity. In the first commercial implementation of the present invention, the PTO-logic-configuration software includes an application-specific PTO-monitoring/control algorithm element with a PTO-unit-type-specific PTO-engagement procedure for each of a single-polarity electric-engagement-mechanism type PTO unit, an electric-over-hydraulic clutched-engagement type PTO unit, an electric-over-air clutched-engagement type PTO unit, and an electric-over-air non-clutched-engagement type PTO unit. Another type of PTO unit for which PTO-logic-configuration software may include an application-specific PTO-monitoring/control algorithm element with a PTO-unit-type-specific PTO-engagement procedure is a dual-polarity electric-engagement-mechanism type PTO unit. The intricacies of appropriate monitoring and control of each of these and other types of PTO units 12 are well known to those of ordinary skill in the art and therefore a person of ordinary skill in the art would be enabled by reviewing this disclosure and the associated drawings to utilize well-known information-system construction methods to develop application-specific PTO-monitoring/control algorithm elements and PTO-unit-type-specific PTO-engagement procedures thereof for numerous different types of PTO units. Accordingly, the PTO-unit-type-specific PTO-engagement procedures for every one of these types of PTO units will not be discussed. However, in the interest of providing the reader with an understanding of the general scope of a PTO-unit-type-specific PTO-engagement procedure and an appreciation of how much difference there can be between one PTO-unit-type-specific PTO-engagement procedure and another, the PTO-unit-type-specific PTO-engagement procedures for an electric-over-hydraulic clutched-engagement type PTO unit and the PTO-unit-type-specific PTO-engagement procedures for a single-polarity electric-engagement-mechanism type PTO-unit will be discussed in detail forthwith. The PTO-unit-type-specific PTO-engagement procedure for an electric-over-hydraulic clutched-engagement type PTO unit is rather simple—the PTO-monitoring/control computer 11 communicates a PTO-engagement signal at an appropriate output channel of the PTO-monitoring/control computer 11 to which PTO-engagement signal downstream PTO-engagement circuitry/components respond by opening and/or closing hydraulic valves to direct pressurized hydraulic fluid to a hydraulically actuated PTO-engagement clutch which engages the PTO unit 12. By contrast, the PTO-unit-type-specific PTO-engagement procedure for a single-polarity electric-engagement-mechanism type PTO unit is relatively complex. FIGS. 13a and 13b, schematically illustrate the engagement mechanisms of a single-polarity electric-engagement-mechanism type PTO unit 12 and their operation during various stages of execution of the PTO-engagement procedure by the PTO-monitoring/control computer 11. The steps of the PTO-unit-type-specific PTO-engagement procedure for a single-polarity electric-engagement-mechanism type PTO unit are illustrated in the flow chart of FIG. 14. At step 101 the PTO-monitoring/control computer 11 utilizes the PTO-engagement logic to determine whether or not engagement of the PTO unit 12 is appropriate. If, at step 101 it is determined that engagement is appropriate, the PTO-monitoring/control computer 11 proceeds to step 102 where it determines if engagement is being requested by an operator through the actuation of a momentary PTO-engagement-request switch 67. If, at step 102 it is determined that engagement is being requested by the operator, the PTO-monitoring/control computer 11 proceeds to step 104 where it determines if a PTO-engagement-retention solenoid 66 is energized. If, at step 104 it is determined that the PTO-engagement-retention solenoid 66 is not energized, the PTO-monitoring/control computer 11 proceeds to step 106 where it energizes both a PTO-engagement solenoid 64 and the PTO-engagement-retention solenoid 66. When energized, the PTO-engagement solenoid 64 urges engagement components 63 of the PTO unit 12 toward a coupled relationship such as the one schematically illustrated in FIG. 13b. When energized, the PTO-engagement-retention solenoid 66 urges a retainer 65 toward an engagement-retention position at which the retainer locks the engagement components 63 in a coupled relationship, such as is schematically illustrated in FIG. 13b, until the PTO-engagement-retention solenoid 66 is de-energized. If, at step 104, the PTO-monitoring/control computer 11 determines that the PTO-engagement-retention solenoid 66 is already energized, the PTO-monitoring/control computer 11 proceeds to step 105 where it determines if the PTO-engagement solenoid 64 is energized. If, at step 105, the PTO-monitoring/control computer 11 determines that the PTO-engagement solenoid 64 is not already energized, the PTO-monitoring/control computer 11 proceeds to step 107 where it energizes the PTO-engagement solenoid 64. The PTO-engagement solenoid 64 draws much greater current than the PTO-engagement-retention solenoid 66 and can only be energized for a relatively short period of time before damage occurs to the PTO-engagement solenoid 64 and/or associated circuitry. Accordingly, after the PTO-monitoring/control computer 11 energizes the PTO-engagement solenoid 64 at step 106 or step 108 or if the PTO-monitoring/control computer 11 determines at step 105 that the PTO-engagement solenoid 64 is already energized, the PTO-monitoring/control computer 11 proceeds to step 108 where it determines whether or not the PTO-engagement solenoid 64 has been energized for the maximum allowable energization period of the PTO-engagement solenoid 64. If, at step 108, the PTO-monitoring/control computer 11 determines that the PTO-engagement solenoid 64 has been energized for its maximum allowable energization period, the PTO-monitoring/control computer 11 proceeds to step 110 where it de-energizes the PTO-engagement solenoid 64. Of course, if engagement is not being requested by an operator or circumstances are such that engagement of the PTO unit 12 is not appropriate it is undesirable for the PTO-engagement solenoid 64 to be energized. Accordingly, if the PTO-monitoring/control computer 11 determines at step 102 that engagement is not being requested or the PTO-monitoring/control computer 11 determines at step 101 that engagement of the PTO unit 12 is not appropriate, the PTO-monitoring/control computer 11 proceeds to step 109 where it determines if the PTO-engagement solenoid 64 is energized. If, at step 109, the PTO-monitoring/control computer 11 determines that the PTO-engagement solenoid 64 is energized, the PTO-monitoring/control computer 11 proceeds to step 110 where it de-energizes the PTO-engagement solenoid 64. After, at step 109, it is determined that the PTO-engagement solenoid 64 is not energized or, at step 108, it is determined that the PTO-engagement solenoid 64 has not been energized for its maximum allowable energization period, or, the PTO-monitoring/control computer 11 de-energizes the PTO-engagement solenoid 64 at step 110, the PTO-monitoring/control computer 11 returns to step 101.

Another element of correct monitoring/control logic for a PTO unit 12 and the vehicle 17 of which it is a part that is dependent upon the type of PTO unit 12 is a PTO-disengagement procedure. For purposes of this disclosure, a PTO-disengagement procedure is to be understood to be the series of steps that the PTO-monitoring/control computer 11 must execute, after it has determined that disengagement of the PTO unit 12 is appropriate, in order to effect disengagement of the PTO unit 12. In some embodiments, a PTO-logic-configuration system according to the present invention will have one or more application-specific PTO-monitoring/control algorithm elements that include PTO-unit-type-specific PTO-disengagement procedures tailored for a particular type of PTO unit 12. If the user of a PTO-logic-configuration system according to the present invention utilizes it to integrate an application-specific PTO-monitoring/control algorithm element that includes a PTO-unit-type-specific PTO-disengagement procedure into the PTO-monitoring/control logic, the PTO-monitoring/control computer 11 will execute the steps of the PTO-unit-type-specific PTO-disengagement procedure when effecting disengagement of the PTO unit 12. Of course it will be understood that some application-specific PTO-monitoring/control algorithm elements will not include PTO-unit-type-specific PTO-disengagement procedures because the type of PTO unit 12 for which the application-specific PTO-monitoring/control algorithm element is tailored is not computer-controllable or for a number of other possible reasons that it was not desirable to the constructor to include a PTO-unit-type-specific PTO-disengagement procedure.

As is the case with PTO-unit-type-specific PTO-engagement procedures for various types of PTO units 12, the intricacies of appropriate procedures for effecting disengagement of various types of PTO units 12 are well known to those of ordinary skill in the art and, as a result, a person of ordinary skill in the art would be enabled by reviewing this disclosure and the associated drawings to utilize well-known information-system construction methods to develop application-specific PTO-monitoring/control algorithm elements and PTO-unit-type-specific PTO-disengagement procedures thereof for numerous different types of PTO units. Accordingly, an exhaustive discussion of the numerous different constructs of PTO-unit-type-specific PTO-disengagement procedures that could be included in application-specific PTO-monitoring/control algorithm elements of PTO-logic-configuration software according to the present invention will not be provided. However, in the interest of providing an understanding of the general contents of a PTO-unit-type-specific PTO-disengagement procedure and illustrating how the different constructions of different types of PTO units 12 necessitate unique disengagement procedures, the PTO-unit-type-specific PTO-disengagement procedures for electric-over-hydraulic clutched-engagement type PTO units and also for dual-polarity electric-engagement-mechanism type PTO units will be discussed in some detail forthwith. When executing the PTO-unit-type-specific PTO-disengagement procedure for an electric-over-hydraulic clutch-engaged type PTO unit, the PTO-monitoring/control computer 11 delivers a PTO-disengage signal through an appropriate output channel of the PTO-monitoring/control computer 11 and downstream PTO-engagement circuitry/components respond by opening and/or closing hydraulic valves to interrupt communication of pressurized hydraulic fluid to a hydraulically-actuated PTO-engagement clutch which then disengages the PTO unit 12. When executing the PTO-unit-type-specific PTO-disengagement procedure for a dual-polarity electric-engagement-mechanism type PTO unit, the PTO-monitoring/control computer 11 must cause the application of a PTO-disengagement voltage to an electronically-powered PTO-engagement/disengagement actuator. The unique aspect of the PTO-unit-type-specific PTO-disengagement procedure for a dual-polarity electric-engagement-mechanism type PTO unit is that the PTO-disengagement voltage that is applied to the electronically-powered PTO-engagement/disengagement actuator must have an opposite polarity as compared to a PTO-engagement voltage that must be applied to the electronically-powered PTO-engagement/disengagement actuator in order to effect engagement of the PTO unit 12.

An element of appropriate monitoring/control of a PTO unit 12 and the vehicle 17 of which it is a part that is often highly dependent upon the application of PTO unit and vehicle is the PTO-engagement logic. For instance, electric-over-air clutched-engagement type PTO units require a supply of pressurized air at a critical minimum pressure level or greater in order to engage the PTO unit 12 properly. As a result, if a vehicle has an electric-over-air clutched-engagement type PTO unit 12, the vehicle's compressed-air-system pressure is a factor in the proper monitoring and control of the PTO unit 12 and the vehicle 17 of which it is a part. By contrast, in many cases where a PTO unit 12 is of a type other than electric-over-air clutched-engagement, the vehicle's compressed-air-system pressure is of little or no concern in the proper monitoring and control of the PTO unit 12 and the vehicle 17 of which it is a part. In order to facilitate expeditious configuration of the PTO-monitoring/control logic according to which a PTO-monitoring/control computer 11 will operate, in some embodiments, the PTO-logic-configuration software comprises one or more application-specific PTO-monitoring/control algorithm elements that include application-specific baseline PTO-engagement logic. Application-specific baseline PTO-engagement logic is a combination of PTO-engagement-requirements and/or PTO-engagement inhibitors that, generally speaking, is tailored for use with a particular application of PTO unit 12 and vehicle 17. Application-specific baseline PTO-engagement logic for an electric-over-air clutched-engagement type PTO unit would, for instance, likely include a PTO-engagement requirement of the vehicle's compressed-air-system pressure being at or above the critical minimum pressure required for proper engagement of the PTO unit or a PTO-engagement inhibitor of the vehicle's compressed-air-system pressure being below the critical minimum pressure for proper engagement. In contrast, application-specific baseline PTO-engagement logic tailored for use with PTO units 12 of types other than electric-over-air clutched-engagement would likely include no PTO-engagement requirements or PTO-engagement inhibitors related to the vehicle's compressed-air-system pressure. Once a user has utilized the prescribed methods of a PTO-logic-configuration system according to the present invention to effect integration into the PTO-monitoring/control logic of an application-specific PTO-monitoring/control algorithm element that comprises application-specific baseline PTO-engagement logic, unless the PTO-engagement logic has been subsequently modified, the PTO-monitoring/control computer 11 will enable and/or effect engagement of the PTO unit 12 in accordance with the application-specific baseline PTO-engagement logic. As was alluded to directly above, in some embodiments, a PTO-logic-configuration system according to the present invention may be configured in such a manner to allow the user to effect integration of application-specific baseline PTO-engagement logic into the PTO-monitoring/control logic and to thereafter, using whatever engagement-logic-configuration tools the PTO-logic-configuration system may have for the piecemeal adjustment of PTO-engagement logic, fine tune the PTO-monitoring/control logic by modifying only certain parts of the PTO-engagement logic. Such an embodiment of a PTO-logic-configuration system according to the present invention advantageously enables the user to quickly and easily configure the PTO-engagement logic by effecting the integration of appropriate application-specific baseline PTO-engagement logic and thereafter modifying only certain elements of its constitution that are not perfectly tailored for the user's application. In order to illustrate the general contents of application-specific PTO-engagement logic and how it may differ for one application of a PTO unit 12 and a vehicle 17 as compared to another, FIG. 15 includes listings of the PTO-engagement requirements and/or PTO-engagement inhibitors of various exemples of application-specific baseline PTO-engagement logic identified by the PTO unit type for which they are tailored. It should be mentioned that some aspects of the examples of the application-specific PTO-engagement logic set forth by FIG. 15 are influenced by elements of the application for which they are tailored other than the PTO unit type. Accordingly, it will be understood that application-specific baseline PTO-engagement logic for the types of PTO units listed in FIG. 15 may differ in some regards from the application-specific baseline PTO-engagement logic set forth in FIG. 15. Of course it will also be understood that some application-specific PTO-monitoring/control algorithm elements will not include application-specific baseline PTO-engagement logic because the type of PTO unit 12 for which the application-specific PTO-monitoring/control algorithm element is tailored is not computer-controllable or for other reasons that the constructors did not desire to include application-specific baseline PTO-engagement logic.

Another element of appropriate monitoring/control of a PTO unit 12 and the vehicle 17 of which it is a part that is often highly dependent upon the application of PTO unit 12 and vehicle 17 is automatic PTO-disengagement logic. For instance, electric-over-air clutched-engagement type PTO units require a supply of pressurized air at a critical minimum pressure level or greater in order to remain properly engaged. As a result, if a vehicle has an electric-over-air clutched-engagement type PTO unit 12, the vehicle's compressed-air-system pressure is a factor in the proper monitoring and control of the PTO unit 12 and the vehicle 17 of which it is a part. By contrast, in many cases where a PTO unit 12 is of a type other than electric-over-air clutched-engagement, the vehicle's compressed-air-system pressure is of little or no concern in the proper monitoring and control of the PTO unit 12 and the vehicle 17 of which it is a part. In order to facilitate expeditious configuration of the PTO-monitoring/control logic according to which a PTO-monitoring/control computer 11 will operate, in some embodiments, the PTO-logic-configuration software comprises one or more application-specific PTO-monitoring/control algorithm elements that include application-specific baseline automatic PTO-disengagement logic. Application-specific baseline automatic PTO-disengagement logic is a combination of PTO-disengagement-compellers and/or PTO-engagement-sustenance requirements that, generally speaking, is tailored for use with a particular application of PTO unit and vehicle application-specific baseline automatic PTO-disengagement logic for an electric-over-air clutched-engagement type PTO unit would, for instance, likely include a PTO-disengagement compeller of the vehicle's compressed-air-system pressure being below the critical minimum pressure required to maintain proper engagement of the PTO unit or a PTO-engagement-sustenance requirement of the vehicle's compressed-air-system pressure being at or above the critical minimum pressure for maintenance of proper engagement. In contrast, application-specific baseline automatic PTO-disengagement logic tailored for use with PTO units 12 of types other than electric-over-air clutched-engagement would likely include no PTO-disengagement compellers or PTO-engagement-sustenance requirements related to the vehicle's compressed-air-system pressure. Once a user has utilized the prescribed methods of a PTO-logic-configuration system according to the present invention to effect integration into the PTO-monitoring/control logic of an application-specific PTO-monitoring/control algorithm element that comprises application-specific baseline automatic PTO-disengagement logic, unless the automatic PTO-disengagement logic has been subsequently modified, the PTO-monitoring/control computer 11 will effect disengagement of the PTO unit 12 in accordance with the application-specific baseline automatic PTO-disengagement logic. As was alluded to directly above, in some embodiments, a PTO-logic-configuration system according to the present invention may be configured in such a manner to allow the user to effect integration of application-specific baseline automatic PTO-disengagement logic into the PTO-monitoring/control logic and to thereafter, using whatever disengagement-logic-configuration tools the PTO-logic-configuration system may have for the piecemeal adjustment of automatic PTO-disengagement logic, fine tune the PTO-monitoring/control logic by modifying only certain parts of the automatic PTO-disengagement logic. Such an embodiment of a PTO-logic-configuration system according to the present invention advantageously enables the user to quickly and easily configure the automatic PTO-disengagement logic by effecting the integration of appropriate application-specific baseline automatic PTO-disengagement logic and thereafter modifying only certain elements of its constitution that are not perfectly tailored for the user's application. In order to illustrate the general contents of application-specific automatic PTO-disengagement logic and how it may differ for one application of PTO unit and vehicle as compared to another, FIG. 16 includes listings of the PTO-disengagement compellers and/or PTO-engagement-sustenance require-ments of various exemples of application-specific baseline automatic PTO-disengagement logic identified by the type of PTO unit 12 for that each is tailored for use with. It should be mentioned that some aspects of the examples of the application-specific PTO-engagement logic set forth by FIG. 16 are influenced by elements of the application for which they are tailored other than the PTO unit type. Accordingly, it will be understood that application-specific baseline automatic PTO-disengagement logic for the types of PTO units listed in FIG. 16 may differ in some regards from the application-specific baseline automatic PTO-disengagement logic set forth in FIG. 16. Of course it will also be understood that some application-specific PTO-monitoring/control algorithm elements will not include application-specific baseline automatic PTO-disengagement logic because the type of PTO unit 12 for which the application-specific PTO-monitoring/control algorithm element is tailored is not computer-controllable or for other reasons that the constructors did not desire to include application-specific baseline PTO-engagement logic.

Another element of appropriate monitoring/control of a PTO unit 12 and the vehicle 17 of which it is a part that is often dependent upon the application of PTO unit and vehicle is the PTO-alarm logic. For instance, electric-over-air clutched-engagement type PTO units require a supply of pressurized air at a critical minimum pressure level or greater in order to properly maintain engagement of the PTO unit 12. As a result, if a vehicle has an electric-over-air clutched-engagement type PTO unit 12, the vehicle's compressed-air-system pressure is a factor in the proper monitoring and control of the PTO unit 12 and the vehicle 17 of which it is a part. By contrast, in many cases where a PTO unit 12 is of a type other than electric-over-air clutched-engagement, the vehicle's compressed-air-system pressure is of little or no concern in the proper monitoring and control of the PTO unit 12 and the vehicle 17 of which it is a part. In order to facilitate expeditious configuration of the PTO-monitoring/control logic according to which a PTO-monitoring/control computer 11 will operate, in some embodiments, the PTO-logic-configuration software comprises one or more application-specific PTO-monitoring/control algorithm elements that include application-specific baseline PTO-alarm logic. Application-specific baseline PTO-alarm logic is a combination of PTO-alarm compellers and/or PTO-alarm inhibition requirements that, generally speaking, is tailored for use with a particular application of PTO unit and vehicle. Application-specific baseline PTO-alarm logic for an electric-over-air clutched-engagement type PTO unit would, for instance, likely include a PTO-alarm compeller of the vehicle's compressed-air-system pressure being below the critical minimum pressure required for properly maintaining engagement of the PTO unit or a PTO-alarm-inhibition requirement of the vehicle's compressed-air-system pressure being at or above the critical minimum pressure for properly maintaining engagement of the PTO unit. In contrast, application-specific baseline PTO-alarm logic for PTO units 12 of types other than electric-over-air clutched-engagement would likely include no PTO-alarm compellers or PTO-alarm-inhibition requirements related to the vehicle's compressed-air-system pressure. Once a user has utilized the prescribed methods of a PTO-logic-configuration system according to the present invention to effect integration into the PTO-monitoring/control logic of an application-specific PTO-monitoring/control algorithm element that comprises application-specific baseline PTO-alarm logic, unless the PTO-alarm logic has been subsequently modified, the PTO-monitoring/ control computer 11 will generate PTO-alarm signals in accordance with the application-specific baseline PTO-alarm logic. As was alluded to directly above, in some embodiments, a PTO-logic-configuration system according to the present invention may be configured in such a manner to allow the user to effect integration of application-specific baseline PTO-alarm logic into the PTO-monitoring/control logic and to thereafter, using whatever alarm-logic-configuration tools the PTO-logic-configuration system may have for the piecemeal adjustment of PTO-alarm logic, fine tune the PTO-monitoring/control logic by modifying only certain parts of the PTO-alarm logic. Such an embodiment of a PTO-logic-configuration system according to the present invention advantageously enables the user to quickly and easily configure the PTO-alarm logic by effecting the integration of appropriate application-specific baseline PTO-alarm logic and thereafter modifying only certain elements of its constitution that are not perfectly tailored for the user's application. Of course it will also be understood that some application-specific PTO-monitoring/control algorithm elements will not include application-specific baseline PTO-alarm logic for various reasons that it is not desirable or appropriate to include application-specific baseline PTO-alarm logic.

The scope of an application-specific PTO-monitoring/control algorithm element may vary considerably. An application-specific PTO-monitoring/control algorithm element may comprise extensive PTO-monitoring/control logic. For instance, a given application-specific PTO-monitoring/control algorithm element may comprise a PTO-unit-type-specific PTO-engagement procedure, a PTO-unit-type-specific PTO-disengagement procedure, application-specific baseline PTO-engagement logic, application-specific baseline automatic PTO-disengagement logic, application-specific baseline automatic PTO-reengagement logic, and application-specific baseline PTO-alarm logic. By contrast, an application-specific PTO-monitoring/control algorithm element may include only a relatively small portion of PTO-monitoring/control logic. For instance, an application-specific PTO-monitoring/control algorithm element may consist entirely of a PTO-unit-type-specific PTO-engagement procedure. Additionally, a given embodiment of PTO-logic-configuration software may comprise a number of different application-specific PTO-monitoring/control algorithm elements of varying scope and type for use in configuring the PTO-monitoring/control logic according to which the PTO-monitoring/control computer 11 will operate. Relatively comprehensive application-specific PTO-monitoring/control algorithm elements advantageously enable the user to quickly and easily configure the PTO-monitoring/control logic while relatively less extensive application-specific PTO-monitoring/control algorithm elements advantageously offer the user a considerable amount of flexibility in the configuration of the PTO-monitoring/control logic.

The tools of a PTO-logic-configuration system according to the present invention for the communication of PTO-related parameters and values thereof for integration into the PTO-monitoring/control logic may be configured to accommodate any of a wide range of levels of structure in the manner in which PTO-related parameters and values thereof are identified and communicated. As was described above, in some embodiments of the present invention the tools for the communication of PTO-related parameters and particular values thereof include one or more software elements of the PTO-logic-configuration software, prescribed methods, protocols, and/or identifiers that is/are associated with one and only one key PTO-related parameter value, which obviously identifies both the parameter and the value. Embodiments of the present invention that have tools for identifying and communicating parameter/value combinations in a relatively structured way advantageously enable relatively easy configuration of the PTO-monitoring/control logic. In some embodiments a PTO-logic-configuration system according to the present invention may include, in addition to or as an alternative to tools for communicating parameter/value combinations, tools for identifying PTO-related parameters and values thereof in a significantly less structured manner. For instance, a PTO-logic-configuration system according to the present invention may include one or more software elements of the PTO-logic-configuration software, prescribed methods, protocols, and/or identifiers that is/are associated with one and only one PTO-related parameter, but not necessarily any particular value of that parameter. Such an embodiment of a PTO-logic-configuration system may further comprise software elements of the PTO-logic-configuration software, prescribed methods, protocols, and/or identifiers for facilitating the communication of a particular value, such as "off", "on", logic "high", logic "low", "2500 RPM", or any value, in a manner not necessarily associated with any particular parameter. Such an embodiment of a PTO-logic-configuration system may further comprise software elements of the PTO-logic-configuration software, prescribed methods, protocols, and/or identifiers for linking a communicated PTO-related parameter and an independently-communicated value in order to effect a communication of a PTO-related parameter/value combination. Embodiments of the present invention that include tools for relatively less structured methods of identification and communication of parameters and values advantageously provide the user with flexibility in the way that they configure the PTO-monitoring/control logic according to which the PTO-monitoring/control computer 11 will operate.

The tools that a PTO-logic-configuration system according to the present invention has for identifying and communicating PTO-related parameters and their values may vary not only by the level of structure they accommodate in identifying and communicating PTO-related parameters and their values, but also by the type of structure that they accommodate in identifying and communicating PTO-related parameters and their values. In some embodiments of the present invention, such as most of the ones explicitly described above, the structure for identifying and communicating PTO-related parameters and their values is based upon a vehicle-system-centric perspective of the information that is monitored by the PTO-monitoring/control computer 11. In many such embodiments of the present invention all the user has to do is communicate a PTO-related parameter and associated value and the PTO-logic-configuration software, working in concert with any system software, will configure the PTO-monitoring/control logic in such a manner that, during execution of the PTO-monitoring/control logic the appropriate input data from the vehicle-monitoring network will be referenced in order to determine if the value of the PTO-related parameter that the user communicated exists. Such a construction of the PTO-logic-configuration system of the present invention advantageously provides ease of configuration of the PTO-monitoring/control logic for a user that is knowledgeable about how the various aspects of operation of the vehicle 17 and the PTO unit 12 thereof should be interacted, but that is not particularly knowledgeable about the manner in which the PTO-monitoring/control computer 11 of a vehicle 17 will go about monitoring and exerting control over various aspects of the operation of the vehicle 17 and the PTO unit 12 thereof. Of course, in order for a PTO-logic-configuration system according to the present invention to be constructed in such a manner that the user is enabled to communicate PTO-related parameters and their valuesin terms that are commensurate with a vehicle-system-centric perspective, when adding/subtracting them to/from PTO-monitoring/control logic, without knowing how the PTO-monitoring/control computer 11 will receive and transmit data, those that configure the PTO-logic-configuration software and accompanying support items must have a knowledge about how and in what form the PTO-monitoring/control computer 11 will receive and transmit data that affects monitoring/control of the PTO unit 12 and the vehicle 17. Consider, for example, a case in which a user wants to communicate a PTO-engagement requirement of "Park Brake Status=Set" for inclusion in the PTO-monitoring/control logic of a PTO-monitoring/control computer 11 that is connected through input terminal number 8 to a sensor that gives a logic high signal when the "Park Brake Status=Set". In order to enable the user to integrate "Park Brake Status=Set" as a PTO-engagement requirement in a PTO-engagement-requirement combination of the PTO-monitoring/control logic without requiring the user to know how the PTO-monitoring/control computer will identify whether or not it has received a signal that is indicative that the "Park Brake Status=Set", those that construct the PTO-logic-configuration software and accompanying support items must know that the "Park Brake Status" signal is received at input terminal number 8 and that a logic high signal corresponds to a "Set" value. Of course there are many circumstances in which the constructors of PTO-logic-configuration software and any accompanying support items will have such fore-knowledge of the constructs of one or more known configurations of PTO-monitoring/control computers 11 and their associated vehicle-monitoring networks. In such circumstances the constructors of a PTO-logic-configuration system according to the present invention can readily construct the PTO-logic-configuration software and any accompanying support items in such a manner that, for each of the known configurations of PTO-monitoring/control computers 11 and their associated vehicle-monitoring network, there exists tools that make it possible for the user of the PTO-logic-configuration system to simply communicate a PTO-related parameter and associated value to the PTO-monitoring/control computer 11 in vehicle-system-centric terms and that PTO-related parameter and associated value will be correlated with the correct signal and value from the PTO-monitoring/control computer's 11 vehicle-monitoring network. There will, however, always be configurations of PTO-monitoring/control computers 11, their associated vehicle-monitoring networks, and the channels and protocols through which they communicate that will be unknown to the constructors of the PTO-logic-configuration software and accompanying support items of a PTO-logic-configuration system according to the present invention. Nonetheless, in some embodiments, a PTO-logic-configuration system according to the present invention will be constructed with special tools for enabling a user to configure the PTO-monitoring/control logic for PTO-monitoring/control computers 11, associated vehicle-monitoring networks, and/or communication channels and protocols the particular configurations of which are unknown to the constructors of the PTO-logic-configuration software and any accompanying support items of the PTO-logic-configuration system according to the present invention. Such functionality of a PTO-logic-configuration system according to the present invention may be effected through construction of the PTO-logic-configuration software and any accompanying support items with tools for the identification and communication of PTO-related parameters and associated values in manners commensurate with a communications-system-centric perspective tools for the identification and communication of PTO-related parameters in a manner commensurate with a communications-system-centric perspective would include special tools for the communication to the PTO-monitoring/control computer 11 of communication-system-type signal-identifiers. Communication-system-type signal-identifiers include but are not limited to communication-channel identifiers and signal-type identifiers. A communication-channel identifier would be an identifier for a particular communication channel through which the PTO-monitoring/control computer 11 receives information about the operational state of the vehicle 17 from the sensors and/or control circuits of the PTO-monitoring/control computer's 11 vehicle-monitoring network. As is well-known a particular communication channel may be distinguished from other communication channels as a result of being separated in space (such as different physical input terminals of the PTO-monitoring/control computer 11 are), as a result of being separated in time (as are the communication channels of many types of multiplexing systems), or as a result of the signals communicated thereon having particular distinguishing characteristics (as is the case with RF communication and many types of multiplexing systems). A signal-type identifier is an identifier that is associated with a signal that has a unique attribute that enables recognition of the source of the signal (which types of signals are commonly utilized in multiplexing systems to enable processing of signals by only the appropriate ones of multiple devices that all communicate through the same physical communication medium). Tools for the identification and communication of the value of a PTO-related parameter in a manner commensurate with a communication-system-centric perspective would include tools for the communication to the PTO-monitoring/control computer 11 of basic signal-value identifiers. A basic signal-value identifier is one that is constructed in terms of the actual aspect of its constitution that makes its value distinguishable to the PTO-monitoring/control computer 11 from that of other signals that are of the same signal type and are communicated through the same channels. For instance, in a case where a particular sensor sends an analog voltage signal, the voltage of which is dependent upon the value of the parameter it senses, to the PTO-monitoring/control computer 11 the basic signal-value identifier for each of the possible signal values that could be sent to the PTO-monitoring/control computer 11 would be a voltage value since the voltage of a given signal is the aspect of that signal that makes its value distinguishable to the PTO-monitoring/control computer 11 from the value of other signals sent by the sensor. In embodiments in which a PTO-logic-configuration system according to the present invention has tools for the identification and communication of PTO-related parameters and values thereof in manners commensurate with a communications-system-centric perspective, the PTO-logic-configuration system comprises a list of predetermined communication-system-type signal identifiers and basic signal-value identifiers. In such an embodiment, a PTO-logic-configuration system according to the present invention also includes special tools in the PTO-logic-configuration software for the communication by the user of each of the predetermined communicationsystem-type signal identifiers and basic signal-value identifiers. In such an embodiment, a PTO-logic-configuration system according to the present invention further comprises prescribed methods of utilizing the tools of the PTO-logic-configuration software to communicate the predetermined communication-system-type signal identifiers and basic signal-value identifiers to the PTO-monitoring/control computer 11. In such an embodiment, a PTO-logic-configuration system according to the present invention is also configured in such a manner that the operating instructions include an explicit or inherent explanation of each of the predetermined communication-system-type signal identifiers and basic signal-value identifiers for the identification and communication of which the PTO-logic-configuration system includes tools. In such an embodiment the operating instructions of the PTO-logic-configuration system also include an explicit or inherent explanation of the prescribed methods of utilizing the PTO-logic-configuration system to communicate communication-system-type signal identifiers and basic signal-value identifiers. In order to understand the principles and use of such aspects of a PTO-logic-configuration system according to the present invention consider an example in which the user of the PTO-logic-configuration system wishes to communicate to the PTO-monitoring/control computer 11 that "Park Brake Status=Set" is to be a PTO-engagement requirement. Further suppose that the signal that corresponds to the existence of "Park Brake Status=Set" is communicated to the PTO-monitoring/control computer 11 through input terminal number 6 of the PTO-monitoring/control computer 11 and has a logic high value and the PTO-logic-configuration system has no tools for the communication of PTO-related parameters and their values in manners commensurate with a vehicle-system centric perspective for such a configuration in which "Park Brake Status=Set" is communicated as a logic high value to input terminal 6 of the PTO-monitoring/control computer 11. If the PTO-logic-configuration system does have tools for communicating PTO-related parameters and their values in manners commensurate with a communication-system-centric perspective including a predetermined list of communication-system-type signal identifiers including "input terminal number 6" and a predetermined list of basic signal-value identifiers including "logic high", the user can effectively implement "Park Brake Status=Set" as a PTO-engagement requirement by utilizing the prescribed methods of the PTO-logic-configuration system to add the linked combination of "input terminal number 6" and "logic high" as a PTO-engagement requirement. FIG. 10 illustrates operation of a PTO-logic-configuration system according to the present invention that has tools for the identification and communication of PTO-related parameters and their values in manners commensurate with a communications-system-centric perspective. At the stage of operation illustrated in FIG. 10, the user is utilizing communication-system-centric codes to add the PTO-engagement requirement that the signal received from input terminal number 1 must have a logic high value.

The organization and interrelationship of the various stages of operation and functions of a PTO-logic-configuration system according to the present invention may take on many different forms commensurate with many different understandings of the configuration of a vehicle 17, a PTO unit 12, and the associated PTO-monitoring/control logic. The majority of the preceding discussion and the majority of the drawings are exemplary of embodiments of the present invention in which the various stages of operation and the various functions are organized in a manner commensurate with a perspective that focuses on the logical subsets, such as PTO-engagement logic, automatic PTO-disengagement logic, automatic PTO-reengagement logic, and PTO-alarm logic, of the PTO-monitoring/control logic. For example, in at least one of the embodiments specifically described above there is a stage of operation of the PTO-logic-configuration system that is targeted specifically for and at which all configuration of PTO-engagement logic may be executed. There are, however, innumerable different ways in which the operating stages and functions of PTO-logic-configuration system according to the present invention could be organized other than according to logical subgroups of the PTO-monitoring/control logic. In the first commercial implementation of the present invention, for instance, the stages of operation and functions of the PTO-logic-configuration system are organized in a manner that is in accordance with the vehicle's existence as a collection of sales features that a customer may select from to configure the vehicle. As a result, the tools for the configuration of each logical subset, such as a PTO-engagement logic, of the PTO-monitoring/control logic are distributed between a number of different stages of operation of the PTO-logic-configuration system and various stages of operation of the PTO-logic-configuration system enable configuration of some aspect of each of multiple ones of the logical subsets of the PTO-monitoring/control logic. FIG. 11, illustrates a stage of operation of an embodiment of the present invention that is very similar to the first commercial implementation of a PTO-logic-configuration system according to the present invention. It can be seen that, at the stage of operation illustrated in FIG. 11, the user has the option to affect the configuration of the PTO-engagement logic by adding/subtracting the PTO-engagement inhibitor "PTO_Eng_Inhibit_Ign_Switch_Status=Off", which would cause the PTO-monitoring/control computer 11 to inhibit engagement of the PTO unit 12 when the ignition switch of the vehicle 17 is off, to/from the PTO-monitoring/control logic. It can be seen that, at the stage of operation illustrated in FIG. 11, the user also has the option to affect the configuration of the PTO-alarm logic by adding/subtracting "PTO_Alrm_Trnsmsn_Gr_Select=Not_Neutral", which would cause the PTO-monitoring/control computer 11 to generate a PTO-alarm signal when the transmission gear selection is changed from neutral, to/from the PTO-monitoring/control logic. A person of ordinary skill in the art could readily construct innumerable variations of the present invention that have the various functions of the PTO-logic-configuration system distributed between various stages of operation thereof in innumerable different ways.

It should also be understood that a PTO-logic-configuration system according to the present invention may be constructed according to the general teachings of this disclosure with many different forms of communicating the various elements of PTO-monitoring/control logic that the PTO-logic-configuration system includes tools for the configuration of. In most of the exemplary embodiments discussed in this disclosure the PTO-logic-configuration system is configured to handle the conditionals of PTO-monitoring/control logic, such as PTO-engagement requirements, PTO-engagement inhibitors, PTO-disengagement compellers, PTO-reengagement compellers, and PTO-alarm compellers, in their most integrated forms when adding/subtracting them to/from the PTO-monitoring/control logic. In some embodiments, including the first commercial implementation of the present invention, some of the tools of a PTO-logic-configuration system according to the present invention will be for handling the conditionals of PTO-monitoring/control logic in a more distributed form when adding/subtracting them to/from the PTO-monitoring/control logic. For instance, a PTO-engagement requirement may be communicated as a single value such as "Engine Speed<2500 RPM" at a particular stage of operation of the system. Such a case would be an example of a very integrated handling of a conditional of the PTO-monitoring/control logic. Alternatively, the same PTO-engagement requirement could be communicated through the communication of "Engine Speed<Maximum Engagement-Appropriate Engine Speed" at one stage of operation of the PTO-logic-configuration system and another communication of "Max Engine Speed=2500 RPM" at another stage of operation of the system. While distributed between different stages of operation, these actions together would constitute the communication of the PTO-engagement requirement "Engine Speed<2500 RPM" and accordingly the distributed tools for making the two separate communications of a PTO-engagement requirement "Engine Speed<Maximum Engagement-Appropriate Engine Speed" and "Max Engine Speed=2500 RPM" constitute engagement-logic-configuration tools for adding "Engine Speed<2500 RPM" as a PTO-engagement requirement. Another way that a PTO-logic-configuration system according to the present invention may handle the addition/subtraction of logical elements to the PTO-monitoring/control logic that is different from, yet logically equivalent to that of most of the embodiments discussed in detail above is through the addition/subtraction of conditioned actions to the PTO-monitoring/control computer's repertoire. Operation of one such embodiment of the present invention that has such a functionality is illustrated in FIG. 12. It can be seen in FIG. 12, that the user is presented with a list of conditioned actions that can be added to the PTO-monitoring/control logic. One of these conditioned actions is "Disengage PTO Unit When Engine Speed>Maximum Engagement-Appropriate Engine Speed". If the user utilizes the embodiment of the PTO-logic-configuration system, the operation of which is illustrated in FIG. 12, to add the conditioned action "Disengage PTO Unit When Engine Speed>Maximum Engagement-Appropriate Engine Speed" to the PTO-monitoring/control computer's repertoire, so-adding this conditioned action to the PTO-monitoring/control computer's repertoire would be considered to be the addition of a PTO-disengagement compeller—engine speed exceeds maximum engagement-appropriate engine speed—to automatic PTO-disengagement logic of the PTO-monitoring/control logic. Accordingly, the tool of this PTO-logic-configuration system for adding the conditioned action "Disengage PTO Unit When Engine Speed>Maximum Engagement-Appropriate Engine Speed" is a disengagement-logic-configuration tool according to the present invention for enabling the addition of the PTO-disengagement compeller "engine speed exceeds maximum engagement-appropriate engine speed" to the PTO-monitoring/control logic in a manner that is different from, but logically equivalent to the manner that is enabled by the disengagement-logic-configuration tools of most of the embodiments discussed in detail above. It is contemplated that a person of ordinary skill in the art could, without undue experimentation, engineer innumerable different constructions of tools of a PTO-logic-configuration system according to the present invention for adding/subtracting PTO-engagement requirements, PTO-disengagement compellers, PTO-reengagement compellers, and PTO-alarm compellers to/from PTO-monitoring/control logic in different, but logically equivalent ways to those explicitly set forth in this disclosure. The foregoing discussion includes a number of specific examples of how general information-handling techniques are implemented to enable the user to configure or reconfigure various elements of PTO-monitoring/control logic. It is worth mentioning that each general information-handling technique, from which an above-described particular embodiment of an element of a PTO-logic-configuration system is constructed, may also be utilized to construct each of the other elements of a PTO-logic-configuration system. For instance, a general information-handling technique, such as a particular type of menu structure, from which an above-described particular embodiment of engagement-logic-configuration tools may also be utilized to construct, disengagement-logic-configuration tools, alarm-logic-configuration tools, and reengagement-logic-configuration tools even though particular embodiments of these other types of PTO-logic-configuration tools constructed utilizing that general information-handling technique have not been discussed in detail above. Also, many elements of the specific embodiments of PTO-logic-configuration systems according to the present invention are discussed only in terms of steps of operation of those PTO-logic-configuration systems without exhaustive discussion of how those steps of operation are caused. In general it is to be understood that any particular action that a PTO-monitoring/control computer 11, an off-board computer 46, and/or a man/machine interface executes in accordance with the teachings of this disclosure is to be caused by the PTO-logic-configuration software in concert with any system software. It is anticipated that a person of ordinary skill in the art is easily capable of understanding how to construct PTO-logic-configuration software in order to work in concert with any system software to effect the described actions that a PTO-logic-configuration system according to the present invention may execute.

Those skilled in the art will appreciate that modifications could be made to the invention as described and in some instances some features of the invention will be employed without a corresponding use of other features without departing from the spirit and scope of the invention and thus the scope of the invention is limited only by the following claims.

We claim:

1. A PTO-logic-configuration system for enabling the user thereof to quickly and easily configure at least a portion of PTO-monitoring/control logic according to which a PTO-monitoring/control computer, which monitors performance of a vehicle and a PTO unit thereof through a vehicle-monitoring network, will operate, comprising:

(a) PTO-logic-configuration software that is embodied in computer useable medium and that comprises a plurality of application-specific PTO-monitoring/control algorithm elements;

(b) operating instructions for enabling communication to a user of said PTO-logic-configuration system a list of said application-specific PTO-monitoring/control algorithm elements and both what application each is tailored for and what aspect of PTO-monitoring/control each is adapted for;

(c) for each one of said application-specific PTO-monitoring/control algorithm elements, a prescribed method of integrating said one of said application-specific PTO-monitoring/control algorithm elements into the PTO-monitoring/control logic;

(d) for each said prescribed method for integrating said one of said application-specific PTO-monitoring/ control algorithm elements into the PTO-monitoring/ control logic, operating instructions for enabling communication to the user of said prescribed method for integrating said one of said application-specific PTO-monitoring/control algorithm elements into the PTO-monitoring/control logic.

2. The PTO-logic-configuration system of claim 1, wherein:
(a) said PTO-logic-configuration software includes software elements for enabling the user to configure or reconfigure PTO-engagement logic of the PTO-monitoring/control logic through the use of prescribed methods of utilizing said PTO-logic-configuration software to add/subtract PTO-engagement-requirements to/from the PTO-monitoring/control logic and/or prescribed methods of utilizing said PTO-logic-configuration software to add/subtract PTO-engagement inhibitors to/from the PTO-monitoring/control logic;
(b) said PTO-logic-configuration system comprises operating instructions for enabling communication to the user of any prescribed methods that said PTO-logic-configuration system comprises for utilizing said PTO-logic-configuration software to add/subtract PTO-engagement requirements to/from the PTO-monitoring/control logic; and
(c) said PTO-logic-configuration system comprises operating instructions for enabling communication to the user of any prescribed methods that said PTO-logic-configuration system comprises for utilizing said PTO-logic-configuration software to add/subtract PTO-engagement inhibitors to/from the PTO-monitoring/control logic.

3. The PTO-logic-configuration system of claim 2, wherein:
(a) said PTO-logic-configuration software includes software elements for enabling the user to configure or reconfigure automatic PTO-disengagement logic of the PTO-monitoring/control logic through the use of prescribed methods of utilizing said PTO-logic-configuration software to add/subtract PTO-disengagement-compellers to/from the PTO-monitoring/control logic and/or through prescribed methods of utilizing said PTO-logic-configuration software to add/subtract PTO-engagement-sustenance requirements to/from the PTO-monitoring/control logic;
(b) said PTO-logic-configuration system comprises operating instructions for enabling communication to the user of any prescribed methods that said PTO-logic-configuration system comprises for utilizing said PTO-logic-configuration software to add/subtract PTO-disengagement-compellers to/from the PTO-monitoring/control logic; and
(c) said PTO-logic-configuration system comprises operating instructionss for enabling communication to the user of any prescribed methods that said PTO-logic-configuration system comprises for utilizing said PTO-logic-configuration software to add/subtract PTO-engagement-sustenance requirements to/from the PTO-monitoring/control logic.

4. The PTO-logic-configuration system of claim 3, wherein:
(a) said PTO-logic-configuration software includes software elements for enabling the user to configure or reconfigure PTO-alarm logic through prescribed methods of utilizing said PTO-logic-configuration software to add/subtract PTO-alarm compellers to/from said PTO-alarm logic of the PTO-monitoring/control logic and/or prescribed methods of utilizing said PTO-logic-configuration software to add/subtract PTO-alarm-inhibition requirements to/from said PTO-alarm logic of the PTO-monitoring/control logic;
(b) said PTO-logic-configuration system comprises operating instructions for enabling communication to the user of any prescribed methods that said PTO-logic-configuration system includes for utilizing said PTO-logic-configuration software to add/subtract PTO-alarm compellers to/from said PTO-alarm logic of the PTO-monitoring/control logic; and
(c) said PTO-logic-configuration system comprises operating instructions for enabling communication to the user of any prescribed methods that said PTO-logic-configuration system includes for utilizing said PTO-logic-configuration software to add/subtract PTO-alarm-inhibition requirements to/from said PTO-alarm logic of the PTO-monitoring/control logic.

5. The PTO-logic-configuration system of claim 4, wherein:
(a) said PTO-logic-configuration software includes software elements for enabling the user to configure or reconfigure automatic PTO-reengagement logic of the PTO-monitoring/control logic through prescribed methods of utilizing said PTO-monitoring/control logic to add/subtract PTO-reengagement compellers to/from said automatic PTO-reengagement logic of the PTO-monitoring/control logic;
(b) said PTO-logic-configuration system comprises operating instructionss for enabling communication to the user of said prescribed methods of utilizing said PTO-logic-configuration software to add/subtract said PTO-reengagement compellersto/from said PTO-monitoring/control logic.

6. The PTO-logic-configuration system of claim 5, wherein:
(a) said PTO-logic-configuration system and said PTO-logic-configuration software are configured to enable the user to ultimately cause storage of the PTO-monitoring/control logic in reconfigurable memory of the PTO-monitoring/control computer and, as a result, there is no limit to the number of times that the PTO-monitoring/control logic according to which the PTO-monitoring/control computer operates can be reconfigured through the addition/subtraction of PTO-engagement requirements, PTO-engagement inhibitors, PTO-disengagement compeller, PTO-engagement-sustenance requirements, PTO-alarm compellers, and/or PTO-alarm-inhibition requirements to/from the PTO-monitoring/control logic.

7. The PTO-logic-configuration system of claim 6, wherein:
(a) said PTO-logic-configuration software and said prescribed methods of utilizing said PTO-logic-configuration software to add/subtract PTO-engagement-requirements to/from the PTO-monitoring/control logic are constructed such that the user is enabled to add/subtract an indefinite number of PTO-engagement requirements to/from said PTO-engagement logic of the PTO-monitoring/control logic.

8. The PTO-logic-configuration system of claim 7, further comprising:
(a) a predetermined list of key PTO-related parameter values upon the existence or absence of which it is commonly desirable to condition the control of PTO units;

(b) operating instructions for enabling communication to the user of said PTO-logic-configuration system said predetermined list of key PTO-related-parameter values, (c) parameter-value-translating elements in said PTO-logic-configuration software for communicating said key PTO-related parameter values of said predetermined list thereof from the user to the PTO-monitoring/control computer as elements of the PTO-monitoring/control logic;

(d) prescribed methods of utilizing said parameter-value-translating elements of said PTO-logic-configuration software for communicating said key PTO-related parameter values to the PTO-monitoring/control computer as elements of the PTO-monitoring/control logic;

(e) operating instructions for enabling communication to the user of said prescribed methods of utilizing said parameter-value-translating elements of said PTO-logic-configuration software for communicating said key PTO-related-parameter values to the PTO-monitoring/control computer as elements of the PTO-monitoring/control logic; and (f) wherein said parameter-value-translating elements in said PTO-logic-configuration software for communicating said key PTO-related parameter values to the PTO-monitoring/control computer as elements of the PTO-monitoring/control logic and said prescribed methods of utilizing said parameter-value-translating elements in said PTO-logic-configuration software for communicating said key PTO-related parameter values to the PTO-monitoring/control computer as elements of the PTO-monitoring/control logic are constructed in such a manner that, when the user executes one of said prescribed methods for utilizing said parameter-value-translating elements of said PTO-logic-configuration software for communicating one of said key PTO-related parameter values to the PTO-monitoring/control computer as an element of the PTO-monitoring/control logic, said PTO-logic-configuration software responds by causing storage, in computer memory of the PTO-monitoring/control computer, of data that will serve to identify, for the PTO-monitoring/control computer, an appropriate signal and value thereof received from the vehicle-monitoring network.

9. The PTO-logic-configuration system of claim 8, wherein:

(a) said parameter-value-translating elements of said PTO-logic-configuration software for communicating said key PTO-related parameter values of said predetermined list thereof from the user to the PTO-monitoring/control computer and said prescribed methods of utilizing said PTO-logic-configuration software to communicate said key PTO-related parameter values of said predetermined list thereof to the PTO-monitoring/control computer are teamed up with said software elements of said PTO-logic-configuration software for enabling the user to configure or reconfigure PTO-engagement logic, said software elements of said PTO-logic-configuration software for enabling the user to configure or reconfigure automatic PTO-disengagement logic, said software elements of said PTO-logic-configuration software for enabling the user to configure or reconfigure PTO-alarm logic, and/or said software elements of said PTO-logic-configuration software for enabling the user to configure or reconfigure automatic PTO-reengagement logic in order to enable the addition of said key PTO-related parameter values of said predetermined list thereof to said PTO-monitoring/control logic as PTO-engagement requirements, PTO-engagement inhibitors, PTO-disengagement compellers, PTO-engagement-sustenance requirements, PTO-reengagement compellers, PTO-alarm compellers, and/or PTO-alarm-inhibition requirements.

10. The PTO-logic-configuration system of claim 9, wherein:

(a) said predetermined list of key PTO-related parameter values comprises two or more of—park-brake status=set, park-brake status=released, ignition-switch status=run, ignition-switch status=off, transmission gear-selection=neutral, transmission gear-selection=not neutral, compressed-air-system pressure<minimum engagement-appropriate air pressure, compressed-air-system pressure>minimum engagement-appropriate air pressure, PTO-switch status=off, PTO-switch status=on, signal statuses=good, signal statuses=bad, vehicle speed>maximum engagement-appropriate vehicle speed, vehicle speed<maximum engagement-appropriate vehicle speed, engine speed>maximum engagement-appropriate engine speed, engine speed<maximum engagement-appropriate engine speed, clutch-pedal status=depressed, clutch-pedal status=not depressed, service brake-pedal status=depressed, service brake-pedal status=not depressed, master-switch status=on, master-switch status=off, engine operating-state=running, and engine operating-state=off.

11. The PTO-logic-configuration system of claim 10, wherein:

(a) one or more of said application-specific PTO-monitoring/control algorithm elements comprises one or more of application-specific baseline PTO-engagement logic, application-specific baseline automatic PTO-disengagement logic, and application-specific baseline PTO-alarm logic.

12. The PTO-logic-configuration system of claim 11, wherein:

(a) one or more of said application-specific PTO-monitoring/control algorithm elements comprises a PTO-unit-type-specific PTO-engagement procedure and/or a PTO-unit-type-specific PTO-disengagement procedure.

13. The PTO-logic-configuration system of claim 12, wherein:

(a) said application-specific PTO-monitoring/control algorithm elements of said PTO-logic-configuration software include two or more application of an application-specific PTO-monitoring/control algorithm element tailored for use with single-polarity electrical-engagement-mechanism type PTO units, an application-specific PTO-monitoring/control algorithm element tailored for use with electric-over-hydraulic clutched-engagement type PTO units, an application-specific PTO-monitoring/control algorithm element tailored for use with electric-over-air clutched-engagement type PTO units, an application-specific PTO-monitoring/control algorithm element tailored for use with electric-over-air non-clutched engagement type PTO units, and an application-specific PTO-monitoring/control algorithm element tailored for use with dual-polarity electric-engagement-mechanism type PTO units.

14. The PTO-logic-configuration system of claim 2, wherein:

(a) one or more of said application-specific PTO-monitoring/control algorithm elements comprises one or more of application-specific baseline PTO-engagement logic, application-specific baseline automatic PTO-disengagement logic, and application-specific baseline PTO-alarm logic.

15. The PTO-logic-configuration system of claim 14, wherein:

(a) one or more of said application-specific PTO-monitoring/control algorithm elements comprises a PTO-unit-type-specific PTO-engagement procedure and/or a PTO-unit-type-specific PTO-disengagement procedure.

16. The PTO-logic-configuration system of claim 15, wherein:

(a) said application-specific PTO-monitoring/control algorithm elements of said PTO-logic-configuration software include two or more of an application-specific PTO-monitoring/control algorithm element tailored for use with single-polarity electrical-engagement-mechanism type PTO units, an application-specific PTO-monitoring/control algorithm element tailored for use with electric-over-hydraulic clutched-engagement type PTO units, an application-specific PTO-monitoring/control algorithm element tailored for use with electric-over-air clutched-engagement type PTO units, an application-specific PTO-monitoring/control algorithm element tailored for use with electric-over-air non-clutched engagement type PTO units, and an application-specific PTO-monitoring/control algorithm element tailored for use with dual-polarity electric-engagement-mechanism type PTO units.

17. The PTO-logic-configuration system of claim 1, wherein:

(a) one or more of said application-specific PTO-monitoring/control algorithm elements comprises one or more of application-specific baseline PTO-engagement logic, application-specific baseline automatic PTO-disengagement logic, and application-specific baseline PTO-alarm logic.

18. The PTO-logic-configuration system of claim 17, wherein:

(a) one or more of said application-specific PTO-monitoring/control algorithm elements comprises a PTO-unit-type-specific PTO-engagement procedure and/or a PTO-unit-type-specific PTO-disengagement procedure.

19. The PTO-logic-configuration system of claim 18, wherein:

(a) said application-specific PTO-monitoring/control algorithm elements of said PTO-logic-configuration software include two or more of an application-specific PTO-monitoring/control algorithm element tailored for use with single-polarity electrical-engagement-mechanism type PTO units, an application-specific PTO-monitoring/control algorithm element tailored for use with electric-over-hydraulic clutched-engagement type PTO units, an application-specific PTO-monitoring/control algorithm element tailored for use with electric-over-air clutched-engagement type PTO units, an application-specific PTO-monitoring/control algorithm element tailored for use with electric-over-air non-clutched engagement type PTO units, and an application-specific PTO-monitoring/control algorithm element tailored for use with dual-polarity electric-engagement-mechanism type PTO units.

20. The PTO-logic-configuration system of claim 1, wherein:

(a) one or more of said application-specific PTO-monitoring/control algorithm elements comprises a PTO-unit-type-specific PTO-engagement procedure and/or a PTO-unit-type-specific PTO-disengagement procedure.

21. The PTO-logic-configuration system of claim 20, wherein:

(a) said application-specific PTO-monitoring/control algorithm elements of said PTO-logic-configuration software include two or more of an application-specific PTO-monitoring/control algorithm element tailored for use with single-polarity electrical-engagement-mechanism type PTO units, an application-specific PTO-monitoring/control algorithm element tailored for use with electric-over-hydraulic clutched-engagement type PTO units, an application-specific PTO-monitoring/control algorithm element tailored for use with electric-over-air clutched-engagement type PTO units, an application-specific PTO-monitoring/control algorithm element tailored for use with electric-over-air non-clutched engagement type PTO units, and an application-specific PTO-monitoring/control algorithm element tailored for use with dual-polarity electric-engagement-mechanism type PTO units.

22. A PTO-logic-configuration system for enabling the user thereof to quickly and easily configure PTO-monitoring/control logic according to which a PTO-monitoring/control computer, which monitors performance of a vehicle and a PTO unit thereof through a vehicle-monitoring network, will operate, comprising:

(a) PTO-logic-configuration software;

(b) wherein said PTO-logic-configuration software includes software elements for enabling the user to configure or reconfigure PTO-engagement logic of the PTO-monitoring/control logic through the use of prescribed methods of utilizing said PTO-logic-configuration software to add/subtract PTO-engagement-requirements to/from the PTO-monitoring/control logic and/or prescribed methods of utilizing said PTO-logic-configuration software to add/subtract PTO-engagement inhibitors to/from the PTO-monitoring/control logic;

(c) wherein said PTO-logic-configuration system comprises operating instructions for enabling communication to the user of any prescribed methods that said PTO-logic-configuration system comprises for utilizing said PTO-logic-configuration software to add/subtract PTO-engagement requirements to/from the PTO-monitoring/control logic; and (d) said PTO-logic-configuration system comprises operating instructions for enabling communication to the user of any prescribed methods that said PTO-logic-configuration system comprises for utilizing said PTO-logic-configuration software to add/subtract PTO-engagement inhibitors to/from the PTO-monitoring/control logic.

23. The PTO-logic-configuration system of claim 22, wherein:

(a) said PTO-logic-configuration software includes software elements for enabling the user to configure or reconfigure automatic PTO-disengagement logic of the PTO-monitoring/control logic through the use of prescribed methods of utilizing said PTO-logic-configuration software to add/subtract PTO-disengagement compellers to/from the PTO-monitoring/control logic and/or through prescribed methods of utilizing said PTO-logic-configuration software to add/subtract PTO-engagement-sustenance requirements to/from the PTO-monitoring/control logic;

(b) said PTO-logic-configuration system comprises operating instructions for enabling communication to the user of any prescribed methods that said PTO-logic-configuration system comprises for utilizing said PTO-logic-configuration software to add/subtract PTO-disengagement compellers to/from the PTO-monitoring/control logic; and (c) said PTO-logic-configuration system comprises operating instructionss for enabling communication to the user of any prescribed methods that said PTO-logic-configuration system comprises for utilizing said PTO-logic-configuration software to add/subtract PTO-engagement-sustenance requirements to/from the PTO-monitoring/control logic.

24. The PTO-logic-configuration system of claim 23, wherein:

(a) said PTO-logic-configuration software includes software elements for enabling the user to configure or reconfigure PTO-alarm logic through prescribed methods of utilizing said PTO-logic-configuration software to add/subtract PTO-alarm compellers to/from said PTO-alarm logic of the PTO-monitoring/control logic and/or prescribed methods of utilizing said PTO-logic-configuration software to add/subtract PTO-alarm-inhibition requirements to/from said PTO-alarm logic of the PTO-monitoring/control logic;

(b) said PTO-logic-configuration system comprises operating instructions for enabling communication to the user of any prescribed methods that said PTO-logic-configuration system includes for utilizing said PTO-logic-configuration software to add/subtract PTO-alarm compellers to/from said PTO-alarm logic of the PTO-monitoring/control logic; and (c) said PTO-logic-configuration system comprises operating instructions for enabling communication to the user of any prescribed methods that said PTO-logic-configuration system includes for utilizing said PTO-logic-configuration software to add/subtract PTO-alarm-inhibition requirements to/from said PTO-alarm logic of the PTO-monitoring/control logic.

25. The PTO-logic-configuration system of claim 24, further comprising:

(a) a predetermined list of key PTO-related parameter values upon the existence or absence of which it is commonly desirable to condition the control of PTO units;

(b) operating instructions for enabling communication to the user of said PTO-logic-configuration system said predetermined list of key PTO-related-parameter values, (c) parameter-value-translating elements in said PTO-logic-configuration software for communicating said key PTO-related parameter values of said predetermined list thereof from the user to the PTO-monitoring/control computer as elements of the PTO-monitoring/control logic;

(d) prescribed methods of utilizing said PTO-logic-configuration software for communicating said key PTO-related parameter values to the PTO-monitoring/control computer as elements of the PTO-monitoring/control logic;

(e) operating instructions for enabling communication to the user of said prescribed methods of utilizing said special parameter-value-translating elements of said PTO-logic-configuration software for communicating said key PTO-related-parameter values to the PTO-monitoring/control computer as elements of the PTO-monitoring/control logic; and (f) wherein said special parameter-value-translating elements in said PTO-logic-configuration software for communicating said key PTO-related parameter values to the PTO-monitoring/control computer as elements of the PTO-monitoring/control logic and said prescribed methods of utilizing said PTO-logic-configuration software for communicating said key PTO-related parameter values to the PTO-monitoring/control computer as elements of the PTO-monitoring/control logic are constructed in such a manner that, when the user executes one of said prescribed methods for utilizing said PTO-logic-configuration software for communicating one of said key PTO-related parameter values to the PTO-monitoring/control computer as an element of the PTO-monitoring/control logic, said PTO-logic-configuration software responds by causing storage, in computer memory of the PTO-monitoring/control computer, of data that will serve to identify, for the PTO-monitoring/control computer, an appropriate signal and value thereof received from the vehicle-monitoring network.

26. The PTO-logic-configuration system of claim 25, wherein:

(a) said parameter-value-translating elements of said PTO-logic-configuration software for communicating said key PTO-related parameter values of said predetermined list thereof from the user to the PTO-monitoring/control computer and said prescribed methods of utilizing said PTO-logic-configuration software to communicate said key PTO-related parameter values of said predetermined list thereof to the PTO-monitoring/control computer are teamed up with said software elements of said PTO-logic-configuration software for enabling the user to configure or reconfigure PTO-engagement logic, said software elements of said PTO-logic-configuration software for enabling the user to configure or reconfigure automatic PTO-disengagement logic, said software elements of said PTO-logic-configuration software for enabling the user to configure or reconfigure PTO-alarm logic, and/or said software elements of said PTO-logic-configuration software for enabling the user to configure or reconfigure automatic PTO-reengagement logic in order to enable the addition of said key PTO-related parameter values of said predetermined list thereof to said PTO-monitoring/control logic as PTO-engagement requirements, PTO-engagement inhibitors, PTO-disengagement compellers, PTO-engagement-sustenance requirements, PTO-reengagement compellers, PTO-alarm compellers, and/or PTO-alarm-inhibition requirements.

27. The PTO-logic-configuration system of claim 26, wherein:

(a) said predetermined list of key PTO-related parameter values comprises two or more of—park-brake status=set, park-brake status=released, ignition-switch status=run, ignition-switch status=off, transmission gear-selection=neutral, transmission gear-selection=not neutral, compressed-air-system pressure<minimum engagement-appropriate air pressure, compressed-air-system pressure>minimum engagement-appropriate air pressure, PTO-switch status=off, PTO-switch status=on, signal statuses=good, signal statuses=bad, vehicle speed>maximum engagement-appropriate vehicle speed, vehicle speed<maximum engagement-appropriate vehicle speed, engine speed>maximum engagement-appropriate engine speed, engine speed<maximum engagement-appropriate engine speed, clutch-pedal status=depressed, clutch-pedal status=not depressed, service brake-pedal status=depressed, service brake-pedal status=not depressed, master-switch status=on, master-switch status=off, engine operating-state=running, and engine operating-state=off.

28. The PTO-logic-configuration system of claim 22, wherein:

(a) a predetermined list of key PTO-related parameter values upon the existence or absence of which it is commonly desirable to condition the control of PTO units;

(b) operating instructions for enabling communication to the user of said PTO-logic-configuration system said predetermined list of key PTO-related-parameter values, (c) parameter-value-translating elements in said PTO-logic-configuration software for communicating said key PTO-related parameter values of said predetermined list thereof from the user to the PTO-monitoring/control computer as elements of the PTO-monitoring/control logic;

(d) prescribed methods of utilizing said PTO-logic-configuration software for communicating said key PTO-related parameter values to the PTO-monitoring/control computer as elements of the PTO-monitoring/control logic;

(e) operating instructions for enabling communication to the user of said prescribed methods of utilizing said PTO-logic-configuration software for communicating said key PTO-related-parameter values to the PTO-monitoring/control computer as elements of the PTO-monitoring/control logic; and (f) wherein said special parameter-value-translating elements in said PTO-logic-configuration software for communicating said key PTO-related parameter values to the PTO-monitoring/control computer as elements of the PTO-monitoring/control logic and said prescribed methods of utilizing said parameter-value-translating elements in said PTO-logic-configuration software for communicating said key PTO-related parameter values to the PTO-monitoring/control computer as elements of the PTO-monitoring/control logic are constructed in such a manner that, when the user executes one of said prescribed methods for utilizing said PTO-logic-configuration software for communicating one of said key PTO-related parameter values to the PTO-monitoring/control computer as an element of the PTO-monitoring/control logic, said PTO-logic-configuration software responds by causing storage, in computer memory of the PTO-monitoring/control computer, of data that will serve to identify, for the PTO-monitoring/control computer, an appropriate signal and value thereof received from the vehicle-monitoring network.

29. The PTO-logic-configuration system of claim 28, wherein:

(a) said parameter-value-translating elements of said PTO-logic-configuration software for communicating said key PTO-related parameter values of said predetermined list thereof from the user to the PTO-monitoring/control computer and said prescribed methods of utilizing said PTO-logic-configuration software to communicate said key PTO-related parameter values of said predetermined list thereof to the PTO-monitoring/control computer are teamed up with said software elements of said PTO-logic-configuration software for enabling the user to configure or reconfigure PTO-engagement logic in order to enable the addition of said key PTO-related parameter values of said predetermined list thereof to said PTO-monitoring/control logic as PTO-engagement requirements and/or PTO-engagement inhibitors.

30. A PTO-logic-configuration system for enabling the user thereof to quickly and easily configure PTO-monitoring/control logic according to which a PTO-monitoring/control computer, which monitors performance of a vehicle and a PTO unit thereof through various sensors of the vehicle, will operate, comprising:

(a) PTO-logic-configuration software;

(b) wherein said PTO-logic-configuration software includes software elements for enabling the user to configure or reconfigure automatic PTO-disengagement logic of the PTO-monitoring/control logic through the use of prescribed methods of utilizing said PTO-logic-configuration software to add/subtract PTO-disengagement compellers to/from the PTO-monitoring/control logic and/or through prescribed methods of utilizing said PTO-logic-configuration software to add/subtract PTO-engagement-sustenance requirements to/from the PTO-monitoring/control logic;

(c) said PTO-logic-configuration system comprises operating instructions for enabling communication to the user of any prescribed methods that said PTO-logic-configuration system comprises for utilizing said PTO-logic-configuration software to add/subtract PTO-disengagement compellers to/from the PTO-monitoring/control logic; and (d) said PTO-logic-configuration system comprises operating instructionss for enabling communication to the user of any prescribed methods that said PTO-logic-configuration system comprises for utilizing said PTO-logic-configuration software to add/subtract PTO-engagement-sustenance requirements to/from the PTO-monitoring/control logic.

31. The PTO-logic-configuration system of claim 30, further comprising:

(a) a predetermined list of key PTO-related parameter values upon the existence or absence of which it is commonly desirable to condition the control of PTO units;

(b) operating instructions for enabling communication to the user of said PTO-logic-configuration system said predetermined list of key PTO-related-parameter values, (c) parameter-value-translating elements in said PTO-logic-configuration software for communicating said key PTO-related parameter values of said predetermined list thereof from the user to the PTO-monitoring/control computer as elements of the PTO-monitoring/control logic;

(d) prescribed methods of utilizing said PTO-logic-configuration software for communicating said key PTO-related parameter values to the PTO-monitoring/control computer as elements of the PTO-monitoring/control logic;

(e) operating instructions for enabling communication to the user of said prescribed methods of utilizingsaid PTO-logic-configuration software for communicating said key PTO-related-parameter values to the PTO-monitoring/control computer as elements of the PTO-monitoring/control logic; and (f) wherein said special parameter-value-translating elements in said PTO-logic-configuration software for communicating said key PTO-related parameter values to the PTO-monitoring/control computer as elements of the PTO-monitoring/control logic and said prescribed methods of utilizing said PTO-logic-configuration software for communicating said key PTO-related parameter values to the PTO-monitoring/control computer as elements of the PTO-monitoring/control logic are constructed in such a manner that, when the user executes one of said prescribed methods for utilizing said PTO-logic-configuration software for communicating one of said key PTO-related parameter values to the PTO-monitoring/control computer as an element of the PTO-monitoring/control logic, said PTO-logic-configuration software responds by causing storage, in computer memory of the PTO-monitoring/control computer, of data that will serve to identify, for the PTO-monitoring/control computer, an appropriate signal and value thereof received from the vehicle-monitoring network.

32. The PTO-logic-configuration system of claim 31, wherein:

(a) said parameter-value-translating elements of said PTO-logic-configuration software for communicating said key PTO-related parameter values of said predetermined list thereof from the user to the PTO-monitoring/control computer and said prescribed methods of utilizing said PTO-logic-configuration software to communicate said key PTO-related parameter values of said predetermined list thereof to the PTO-monitoring/control computer are teamed up with said software elements of said PTO-logic-configuration software for enabling the user to configure or reconfigure automatic PTO-disengagement logic in order to enable the addition of said key PTO-related parameter values of said predetermined list thereof to said PTO-monitoring/control logic as PTO-disengagement compellers and/or PTO-engagement-sustenance requirements.

33. The PTO-logic-configuration system of claim 30, wherein:

(a) a predetermined list of key PTO-related events upon the occurrence of which it is commonly desirable to condition the control of PTO units;

(b) operating instructions for enabling communication to the user of said PTO-logic-configuration system said predetermined list of key PTO-related events, (c) event-identifier-translating elements in said PTO-logic-configuration software for communicating said key PTO-related events of said predetermined list thereof from the user to the PTO-monitoring/control computer as elements of the PTO-monitoring/control logic;

(d) prescribed methods of utilizing said PTO-logic-configuration software for communicating said key PTO-related events to the PTO-monitoring/control computer as elements of the PTO-monitoring/control logic;

(e) operating instructions for enabling communication to the user of said prescribed methods of utilizing said PTO-logic-configuration software for communicating said key PTO-related events to the PTO-monitoring/control computer as elements of the PTO-monitoring/control logic; and (f) wherein said event-identifier-translating elements in said PTO-logic-configuration software for communicating said key PTO-related events to the PTO-monitoring/control computer as elements of the PTO-monitoring/control logic and said prescribed methods of utilizing said PTO-logic-configuration software for communicating said key PTO-related events to the PTO-monitoring/control computer as elements of the PTO-monitoring/control logic are constructed in such a manner that, when the user executes one of said prescribed methods for utilizing said event-identifier-translating elements of said PTO-logic-configuration software for communicating one of said key PTO-related events to the PTO-monitoring/control computer as an element of the PTO-monitoring/control logic, said PTO-logic-configuration software responds by causing storage, in computer memory of the PTO-monitoring/control computer, of data that will serve to identify, for the PTO-monitoring/control computer, an appropriate combination of signal receipts over time from the vehicle-monitoring network.

34. The PTO-logic-configuration system of claim 33, wherein:

(a) said event-identifier-translating elements of said PTO-logic-configuration software for communicating said key PTO-related events of said predetermined list thereof from the user to the PTO-monitoring/control computer and said prescribed methods of utilizing said PTO-logic-configuration software to communicate said key PTO-related events of said predetermined list thereof to the PTO-monitoring/control computer are teamed up with said software elements of said PTO-logic-configuration software for enabling the user to configure or reconfigure automatic PTO-disengagement logic in order to enable the addition of said key PTO-related events of said predetermined list thereof to said PTO-monitoring/control logic as PTO-disengagement compellers.

35. A PTO-logic-configuration system for enabling the user thereof to quickly and easily configure PTO-monitoring/control logic according to which a PTO-monitoring/control computer, which monitors performance of a vehicle and a PTO unit thereof through various sensors of the vehicle, will operate, comprising:

(a) PTO-logic-configuration software;

(b) said PTO-logic-configuration software includes software elements for enabling the user to configure or reconfigure PTO-alarm logic through prescribed methods of utilizing said PTO-logic-configuration software to add/subtract PTO-alarm compellers to/from said PTO-alarm logic of the PTO-monitoring/control logic and/or prescribed methods of utilizing said PTO-logic-configuration software to add/subtract PTO-alarm-inhibition requirements to/from said PTO-alarm logic of the PTO-monitoring/control logic;

(c) said PTO-logic-configuration system comprises operating instructions for enabling communication to the user of any prescribed methods that said PTO-logic-configuration system includes for utilizing said PTO-logic-configuration software to add/subtract PTO-alarm compellers to/from said PTO-alarm logic of the PTO-monitoring/control logic; and (d) said PTO-logic-configuration system comprises operating instructions for enabling communication to the user of any prescribed methods that said PTO-logic-configuration system includes for utilizing said PTO-logic-configuration software to add/subtract PTO-alarm-inhibition requirements to/from said PTO-alarm logic of the PTO-monitoring/control logic.

36. The PTO-logic-configuration system of claim 35, wherein:

(a) a predetermined list of key PTO-related parameter values upon the existence or absence of which it is commonly desirable to condition the control of PTO units;

(b) operating instructions for enabling communication to the user of said PTO-logic-configuration system said predetermined list of key PTO-related-parameter values, (c) parameter-value-translating elements in said PTO-logic-configuration software for communicating said key PTO-related parameter values of said predetermined list thereof from the user to the PTO-monitoring/control computer as elements of the PTO-monitoring/control logic;

(d) prescribed methods of utilizing said PTO-logic-configuration software for communicating said key PTO-related parameter values to the PTO-monitoring/control computer as elements of the PTO-monitoring/control logic;

(e) operating instructions for enabling communication to the user of said prescribed methods of utilizing said PTO-logic-configuration software for communicating said key PTO-related-parameter values to the PTO-monitoring/control computer as elements of the PTO-monitoring/control logic; and (f) wherein said special parameter-value-translating elements in said PTO-logic-configuration software for communicating said key PTO-related parameter values to the PTO-monitoring/control computer as elements of the PTO-monitoring/control logic and said prescribed methods of utilizing said PTO-logic-configuration software for communicating said key PTO-related parameter values to the PTO-monitoring/control computer as elements of the PTO-monitoring/control logic are constructed in such a manner that, when the user executes one of said prescribed methods for utilizing said PTO-logic-configuration software for communicating one of said key PTO-related parameter values to the PTO-monitoring/control computer as an element of the PTO-monitoring/control logic, said PTO-logic-configuration software responds by causing storage, in computer memory of the PTO-monitoring/control computer, of data that will serve to identify, for the PTO-monitoring/control computer, an appropriate signal and value thereof received from the vehicle-monitoring network.

37. The PTO-logic-configuration system of claim 36, wherein:

(a) said special parameter-value-translating elements of said PTO-logic-configuration software for communicating said key PTO-related parameter values of said predetermined list thereof from the user to the PTO-monitoring/control computer and said prescribed methods of utilizing said PTO-logic-configuration software to communicate said key PTO-related parameter values of said predetermined list thereof to the PTO-monitoring/control computer are teamed up with said software elements of said PTO-logic-configuration software for enabling the user to configure or reconfigure PTO-alarm logic in order to enable the addition of said key PTO-related parameter values of said predetermined list thereof to said PTO-monitoring/control logic as PTO-alarm compellers.

38. The PTO-logic-configuration system of claim 35, wherein:

(a) a predetermined list of key PTO-related events upon the occurrence of which it is commonly desirable to condition the control of PTO units;

(b) operating instructions for enabling communication to the user of said PTO-logic-configuration system said predetermined list of key PTO-related events, (c) event-identifier-translating elements in said PTO-logic-configuration software for communicating said key PTO-related events of said predetermined list thereof from the user to the PTO-monitoring/control computer as elements of the PTO-monitoring/control logic;

(d) prescribed methods of utilizing said PTO-logic-configuration software for communicating said key PTO-related events to the PTO-monitoring/control computer as elements of the PTO-monitoring/control logic;

(e) operating instructions for enabling communication to the user of said prescribed methods of utilizing said PTO-logic-configuration software for communicating said key PTO-related events to the PTO-monitoring/control computer as elements of the PTO-monitoring/control logic; and (f) wherein said special event-identifier-translating elements in said PTO-logic-configuration software for communicating said key PTO-related events to the PTO-monitoring/control computer as elements of the PTO-monitoring/control logic and said prescribed methods of utilizing said PTO-logic-configuration software for communicating said key PTO-related events to the PTO-monitoring/control computer as elements of the PTO-monitoring/control logic are constructed in such a manner that, when the user executes one of said prescribed methods for utilizing said PTO-logic-configuration software for communicating one of said key PTO-related events to the PTO-monitoring/control computer as an element of the PTO-monitoring/control logic, said PTO-logic-configuration software responds by causing storage, in computer memory of the PTO-monitoring/control computer, of data that will serve to identify, for the PTO-monitoring/control computer, an appropriate combination of signal receipts over time from the vehicle-monitoring network.

39. The PTO-logic-configuration system of claim 38, wherein:

(a) said event-identifier-translating elements of said PTO-logic-configuration software for communicating said key PTO-related events of said predetermined list thereof from the user to the PTO-monitoring/control computer and said prescribed methods of utilizing said PTO-logic-configuration software to communicate said key PTO-related events of said predetermined list thereof to the PTO-monitoring/control computer are teamed up with said software elements of said PTO-logic-configuration software for enabling the user to configure or reconfigure PTO-alarm logic in order to enable the addition of said key PTO-related events of said predetermined list thereof to said PTO-monitoring/control logic as PTO-alarm compellers.

40. A PTO-logic-configuration system for enabling the user thereof to quickly and easily configure PTO-monitoring/control logic according to which a PTO-monitoring/control computer, which monitors performance of a vehicle and a PTO unit thereof through various sensors of the vehicle, will operate, comprising:
  (a) PTO-logic-configuration software;
  (b) a predetermined list of PTO-related parameter values upon the existence or absence of which it is commonly desirable to condition the control of PTO units;
  (c) operating instructions for enabling communication to the user of said PTO-logic-configuration system said predetermined list of key PTO-related-parameter values,
  (d) parameter-value-translating elements in said PTO-logic-configuration software for communicating said key PTO-related parameter values of said predetermined list thereof from the user to the PTO-monitoring/control computer as elements of the PTO-monitoring/control logic;
  (e) prescribed methods of utilizing said PTO-logic-configuration software for communicating said key PTO-related parameter values to the PTO-monitoring/control computer as elements of the PTO-monitoring/control logic;
  (f) operating instructions for enabling communication to the user of said prescribed methods of utilizing said PTO-logic-configuration software for communicating said key PTO-related-parameter values to the PTO-monitoring/control computer as elements of the PTO-monitoring/control logic;
  (g) wherein said parameter-value-translating elements in said PTO-logic-configuration software for communicating said key PTO-related parameter values to the PTO-monitoring/control computer as elements of the PTO-monitoring/control logic and said prescribed methods of utilizing said PTO-logic-configuration software for communicating said key PTO-related parameter values to the PTO-monitoring/control computer as elements of the PTO-monitoring/control logic are constructed in such a manner that, when the user executes one of said prescribed methods for utilizing said PTO-logic-configuration software for communicating one of said key PTO-related parameter values to the PTO-monitoring/control computer as an element of the PTO-monitoring/control logic, said PTO-logic-configuration software responds by causing storage, in computer memory of the PTO-monitoring/control computer, of data that will serve to identify, for the PTO-monitoring/control computer, an appropriate signal and value thereof received from the vehicle-monitoring network; and
  (h) said predetermined list of key PTO-related parameter values comprises two or more of—park-brake status=set, park-brake status=released, ignition-switch status=run, ignition-switch status=off, transmission gear-selection=neutral, transmission gear-selection=not neutral, compressed-air-system pressure<minimum engagement-appropriate air pressure, compressed-air-system pressure>minimum engagement-appropriate air pressure, PTO-switch status=off, PTO-switch status=on, signal statuses=good, signal statuses=bad, vehicle speed>maximum engagement-appropriate vehicle speed, vehicle speed<maximum engagement-appropriate vehicle speed, engine speed>maximum engagement-appropriate engine speed, engine speed<maximum engagement-appropriate engine speed, clutch-pedal status=depressed, clutch-pedal status=not depressed, service brake-pedal status=depressed, service brake-pedal status=not depressed, master-switch status=on, master-switch status=off, engine operating-state=running, and engine operating-state=off.

41. The PTO-logic-configuration system of claim 40, wherein:
  (a) a predetermined list of key PTO-related events upon the occurrence of which it is commonly desirable to condition the control of PTO units;
  (b) operating instructions for enabling communication to the user of said PTO-logic-configuration system said predetermined list of key PTO-related events,
  (c) event-identifier-translating elements in said PTO-logic-configuration software for communicating said key PTO-related events of said predetermined list thereof from the user to the PTO-monitoring/control computer as elements of the PTO-monitoring/control logic;
  (d) prescribed methods of utilizing said PTO-logic-configuration software for communicating said key PTO-related events to the PTO-monitoring/control computer as elements of the PTO-monitoring/control logic;
  (e) operating instructions for enabling communication to the user of said prescribed methods of utilizing said PTO-logic-configuration software for communicating said key PTO-related events to the PTO-monitoring/control computer as elements of the PTO-monitoring/control logic;
  (f) wherein said event-identifier-translating-elements in said PTO-logic-configuration software for communicating said key PTO-related events to the PTO-monitoring/control computer as elements of the PTO-monitoring/control logic and said prescribed methods of utilizing said PTO-logic-configuration software for communicating said key PTO-related events to the PTO-monitoring/control computer as elements of the PTO-monitoring/control logic are constructed in such a manner that, when the user executes one of said prescribed methods for utilizing said PTO-logic-configuration software for communicating one of said key PTO-related events to the PTO-monitoring/control computer as an element of the PTO-monitoring/control logic, said PTO-logic-configuration software responds by causing storage, in computer memory of the PTO-monitoring/control computer, of data that will serve to identify, for the PTO-monitoring/control computer, an appropriate combination of signal receipts over time from the vehicle-monitoring network; and
  (g) said predetermined list of key PTO-related events comprises two or more of—transmission is taken out of neutral, park-brake is released, engagement-transition time limit expires, engine is turned off, engine time limit expires, master switch is turned off.

42. A PTO-logic-configuration system for enabling the user thereof to quickly and easily configure PTO-monitoring/control logic according to which a PTO-monitoring/control computer, which monitors performance of a vehicle and a PTO unit thereof through various sensors of the vehicle, will operate, comprising:
  (a) PTO-logic-configuration software;
  (b) a predetermined list of key PTO-related events upon the occurrence of which it is commonly desirable to condition the control of PTO units;

(c) operating instructions for enabling communication to the user of said PTO-logic-configuration system said predetermined list of key PTO-related events,
(d) event-identifier-translating elements in said PTO-logic-configuration software for communicating said key PTO-related events of said predetermined list thereof from the user to the PTO-monitoring/control computer as elements of the PTO-monitoring/control logic;
(e) prescribed methods of utilizing said PTO-logic-configuration software for communicating said key PTO-related events to the PTO-monitoring/control computer as elements of the PTO-monitoring/control logic;
(f) operating instructions for enabling communication to the user of said prescribed methods of utilizing said PTO-logic-configuration software for communicating said key PTO-related events to the PTO-monitoring/control computer as elements of the PTO-monitoring/control logic;
(g) wherein said PTO-logic-configuration software for communicating said key PTO-related events to the PTO-monitoring/control computer as elements of the PTO-monitoring/control logic and said prescribed methods of utilizing said PTO-logic-configuration software for communicating said key PTO-related events to the PTO-monitoring/control computer as elements of the PTO-monitoring/control logic are constructed in such a manner that, when the user executes one of said prescribed methods for utilizing said PTO-logic-configuration software for communicating one of said key PTO-related events to the PTO-monitoring/control computer as an element of the PTO-monitoring/control logic, said PTO-logic-configuration software responds by causing storage, in computer memory of the PTO-monitoring/control computer, of data that will serve to identify, for the PTO-monitoring/control computer, an appropriate combination of signal receipts over time from the vehicle-monitoring network; and
(h) said predetermined list of key PTO-related events comprises two or more of—transmission is taken out of neutral, park-brake is released, engagement-transition time limit expires, engine is turned off, engine time limit expires, master switch is turned off.

* * * * *